(12) United States Patent
Taguchi et al.

(10) Patent No.: US 12,391,445 B2
(45) Date of Patent: Aug. 19, 2025

(54) BINDING TAPE, BINDING METHOD, TAPE WINDING BODY AND REEL

(71) Applicant: Max Co., Ltd., Tokyo (JP)

(72) Inventors: Satoshi Taguchi, Tokyo (JP); Mizuki Kataniwa, Tokyo (JP)

(73) Assignee: Max Co., Ltd., Tokyo (JP)

( * ) Notice: Subject to any disclaimer, the term of this patent is extended or adjusted under 35 U.S.C. 154(b) by 0 days.

(21) Appl. No.: 18/418,696

(22) Filed: Jan. 22, 2024

(65) Prior Publication Data

US 2024/0199294 A1  Jun. 20, 2024

Related U.S. Application Data

(62) Division of application No. 17/260,620, filed as application No. PCT/JP2019/028363 on Jul. 18, 2019.

(30) Foreign Application Priority Data

| Jul. 18, 2018 | (JP) | 2018-134750 |
| Mar. 1, 2019 | (JP) | 2019-037192 |
| Mar. 1, 2019 | (JP) | 2019-037411 |
| Jun. 18, 2019 | (JP) | 2019-112599 |

(51) Int. Cl.
| *B32B 3/00* | (2006.01) |
| *A01G 9/12* | (2006.01) |
| *B32B 5/02* | (2006.01) |
| *B32B 27/12* | (2006.01) |
| *B32B 27/30* | (2006.01) |
(Continued)

(52) U.S. Cl.
CPC ............ *B65D 63/14* (2013.01); *A01G 9/128* (2013.01); *B32B 5/024* (2013.01); *B32B 5/026* (2013.01); *B32B 27/12* (2013.01); *B32B 27/304* (2013.01); *B32B 27/32* (2013.01); *B65B 13/345* (2013.01); *B32B 2250/03* (2013.01);
(Continued)

(58) Field of Classification Search
CPC ......... B32B 27/12; B32B 5/024; B32B 5/026; B32B 5/028; B65D 63/00; B65D 63/10; B65D 63/14
See application file for complete search history.

(56) References Cited

U.S. PATENT DOCUMENTS

| 2,607,709 A | 8/1952 | Simpson et al. |
| 3,099,414 A | 7/1963 | Kuika |
(Continued)

FOREIGN PATENT DOCUMENTS

| CN | 201439461 U | 4/2010 |
| CN | 104684796 A | 6/2015 |
(Continued)

OTHER PUBLICATIONS

KR-20100010248-U (Year: 2010).*
(Continued)

*Primary Examiner* — Elizabeth E Mulvaney
(74) *Attorney, Agent, or Firm* — Banner & Witcoff, Ltd.

(57) ABSTRACT

A binding tape (10) includes an intermediate layer (11), and a first surface layer (16) covering one surface of the intermediate layer (11). The intermediate layer (11) has a plurality of first linear members (12) arranged side by side at an angle with respect to a longitudinal direction (D1) of the binding tape (10).

5 Claims, 57 Drawing Sheets

(51) Int. Cl.
    *B32B 27/32*     (2006.01)
    *B65B 13/34*     (2006.01)
    *B65D 63/14*     (2006.01)

(52) U.S. Cl.
    CPC ....... *B32B 2250/40* (2013.01); *B32B 2405/00* (2013.01); *B32B 2410/00* (2013.01); *C09J 2301/10* (2020.08)

(56) References Cited

U.S. PATENT DOCUMENTS

| | | | |
|---|---|---|---|
| 3,101,846 | A | 8/1963 | Eifrid |
| 3,587,840 | A | 6/1971 | Marshall |
| 3,700,099 | A | 10/1972 | Heroux |
| 4,770,490 | A * | 9/1988 | Gruenewald ........... B32B 27/36 385/115 |
| 5,171,397 | A | 12/1992 | Arnold |
| 5,698,067 | A | 12/1997 | Packard |
| 5,941,387 | A | 8/1999 | Rasel |
| 6,418,998 | B1 | 7/2002 | Tuoriniemi |
| 6,589,648 | B1 | 7/2003 | Schurig |
| D669,618 | S | 10/2012 | Ormsbee et al. |
| D669,619 | S | 10/2012 | Ormsbee et al. |
| 8,387,216 | B1 | 3/2013 | Martinson |
| D774,879 | S | 12/2016 | Martinson |
| 10,407,265 | B1 | 9/2019 | Liles |
| D863,945 | S | 10/2019 | Martinson |
| D863,946 | S | 10/2019 | Martinson |
| 2002/0145073 | A1 | 10/2002 | Swanson et al. |
| 2003/0029962 | A1 | 2/2003 | Sieber et al. |
| 2004/0226857 | A1 | 11/2004 | Wright et al. |
| 2008/0290201 | A1 | 11/2008 | Klick |
| 2009/0230233 | A1 | 9/2009 | Ochi et al. |
| 2009/0283167 | A1 | 11/2009 | Nakagawa et al. |
| 2009/0283625 | A1 | 11/2009 | Ochi et al. |
| 2011/0005688 | A1 | 1/2011 | Chang |
| 2011/0021100 | A1 | 1/2011 | Doi et al. |
| 2011/0286217 | A1 | 11/2011 | Martinson et al. |
| 2011/0300326 | A1 | 12/2011 | Tatsuzawa et al. |
| 2012/0015126 | A1 | 1/2012 | Tatsuzawa et al. |
| 2012/0055831 | A1 | 3/2012 | Vulpitta |
| 2013/0026316 | A1 | 1/2013 | Case et al. |
| 2013/0174382 | A1 | 7/2013 | Martinson |
| 2015/0197409 | A1 | 7/2015 | Caldieri |
| 2015/0284160 | A1 | 10/2015 | Case et al. |
| 2017/0275129 | A1 | 9/2017 | Takahashi |
| 2017/0361957 | A1 | 12/2017 | Takemura et al. |
| 2017/0361960 | A1 | 12/2017 | Taguchi et al. |
| 2021/0053705 | A1 | 2/2021 | Taguchi et al. |
| 2023/0339720 | A1 | 10/2023 | Hamazaki et al. |

FOREIGN PATENT DOCUMENTS

| | | |
|---|---|---|
| EP | 1430971 A1 | 6/2004 |
| EP | 2684828 A1 | 1/2014 |
| ES | 2536582 A1 | 5/2015 |
| JP | S48-040688 Y1 | 11/1973 |
| JP | S52-014673 A | 2/1977 |
| JP | S54-096760 U | 7/1979 |
| JP | S54-153140 A | 12/1979 |
| JP | S58-176936 U | 11/1983 |
| JP | S59-033867 U | 3/1984 |
| JP | H02-080669 U | 6/1990 |
| JP | H03-006931 U | 1/1991 |
| JP | H06-010169 A | 1/1994 |
| JP | 2002-046765 A | 2/2002 |
| JP | 2002-101766 A | 4/2002 |
| JP | 2004-203430 A | 7/2004 |
| JP | 2004-224412 A | 8/2004 |
| JP | 2005-176616 A | 7/2005 |
| JP | 2009-255983 A | 11/2009 |
| JP | 2011-026717 A | 2/2011 |
| JP | 2015-046293 A | 3/2015 |
| JP | 2017-222400 A | 12/2017 |
| KR | 20080103400 A | 11/2008 |
| PL | 188661 B1 | 3/2005 |
| TW | 201000365 A | 1/2010 |
| TW | 202122334 A | 6/2021 |
| WO | 9704358 A1 | 2/1997 |
| WO | 2012091061 A1 | 7/2012 |
| WO | 2013084797 A1 | 6/2013 |
| WO | 2014007114 A1 | 1/2014 |
| WO | 2018-061567 A1 | 4/2018 |

OTHER PUBLICATIONS

Dec. 6, 2024—(US) Final Office Action—U.S. Appl. No. 17/260,620.
Sep. 12, 2023—(NZ) Examination Report 2—App 771973.
Australian Office Action dated Mar. 24, 2023, issued by the Australian Patent Office in the corresponding Australian Patent Aplication No. 2019305815. (6 pages).
Japanese Office Action (Notice of Reasons for Refusal) dated Jan. 6, 2023, issued by the Japanese Patent Office in the corresponding Japanese Patent No. 2019-112599. (with English translation) (9 pages).
Extended European Search Report dated Jul. 6, 2022, issued by the European Patent Office in the corresponding European Patent Application No. 19838460.4 (12 pages).
Chinese Office Action for Chinese Application No. 201980047651.7 dated Mar. 3, 2022. (12 pages).
International Search Report issued in Application No. PCT/JP2019-028363 dated Oct. 8, 2019, 5 pages.
Jun. 6, 2024—(US)—Non-final Office Action—U.S. Appl. No. 17/260,620.
Apr. 22, 2025—(NZ) Examination Report 1—App 803791.
Apr. 1, 2025—(US) Notice of Allowance—U.S. Appl. No. 17/260,620.

* cited by examiner

BINDING TAPE, BINDING METHOD, TAPE WINDING BODY AND REEL

CROSS REFERENCE TO RELATED APPLICATIONS

This application is a divisional of U.S. patent application Ser. No. 17/260,620 filed Jan. 15, 2021 which claims priority to 35 U.S.C. 371 National Phase Entry Application from PCT/JP2019/028363, filed Jul. 18, 2019, which claims priority to Japanese Patent Application Nos. 2018-134750, filed Jul. 18, 2018, 2019-037192, filed Mar. 1, 2019, 2019-037411, filed Mar. 1, 2019, and 2019-112599 filed on Jun. 18, 2019, the disclosures of which are incorporated herein in their entirety by reference, and priority is claimed to each of the foregoing.

TECHNICAL FIELD

The present invention relates to a binding tape, a binding method, a tape winding body and a reel. For example, the present invention relates to a binding tape, a binding method, a tape winding body and a reel that can be used for a guiding/binding operation and the like in agricultural crop cultivation.

BACKGROUND ART

In the conventional art, a binding machine for gardening is used for a guiding/binding operation when cultivating agricultural crops. Specifically, for example, in agricultural crop cultivation of cucumbers, grapes, tomatoes and the like, a binding machine for gardening is used so as to bind plant vines and stems to stanchions, nets and the like.

For example, as disclosed in PTL 1, the binding machine for gardening includes a main handle having a tip end portion from which a tape can be pulled out, a clincher arm configured to be rotatable with respect to the main handle, and an operating handle for rotating the clincher arm. When the operating handle of the binding machine for gardening is softly gripped, the clincher arm rotates in a closing direction with respect to the main handle, so that a tape gripping device of a tip end of the clincher arm grips the tape pulled out from the tip end portion of the main handle. When the gripped state of the handle is released in this state, the clincher arm rotates in an opening direction with respect to the main handle, so that the tape is pulled out. When the tape is pulled out and is in a stretched state between the clincher arm and the main handle, agricultural crops and stanchions are pressed against the pulled-out tape, and the agricultural crops and stanchions are inserted between the clincher arm and the main handle. When the handle is again gripped in this state, the clincher arm rotates in the closing direction with respect to the main handle, so that a tape loop is formed. When the handle is further gripped, the tape loop is stitched in the vicinity of both end portions by a staple, and an end portion of the tape loop is cut by a cutter, so that binding is completed.

The binding tape that is used for the binding machine for gardening is generally made of resin such as polyvinyl chloride (PVC), polyethylene (PE) and the like. PTL 2 discloses that non-woven fabric is used as a material of the binding tape.

PTL 3 discloses technology of arranging thick papers arranged side by side to face side surfaces of an adhesive tape so as to prevent a so-called bamboo shoot phenomenon that a wound adhesive tape slides laterally in a winding axis direction to form a mortar shape due to residual stress generated when pulling out the adhesive tape or strain stress generated due to a change in temperature during storage. Since the thick papers are bonded only to end faces of a core body, on which the adhesive tape is wound, by paste and are not bonded to side surfaces of the adhesive tape, the thick papers do not apply resistance when pulling out the adhesive tape, and can prevent the adhesive tape from sliding laterally in the winding axis direction.

PTL 4 discloses a paper tube for winding a thread such as wool thereon. The paper tube is formed to have a conical shape so that the thread can be easily pulled out even though the thread is steamed and swollen.

PTL 5 discloses a taping reel for winding an electronic component band having an electronic component bonded thereto. The taping reel has such a configuration that two side plates made of plastic sheets are arranged to face each other and boss parts protruding from central portions of each of the side plates are abutted and bonded to each other to form an outer peripheral surface for winding the electronic component band.

CITATION LIST

Patent Literature

[PTL 1] JP-A-2004-224412
[PTL 2] JP-A-S54-153140
[PTL 3] Japanese Utility Model Examined Publication No. S48-40688
[PTL 4] Japanese Utility Model Unexamined Publication No. H02-80669
[PTL 5] Japanese Utility Model Unexamined Publication No. S59-33867

SUMMARY OF INVENTION

Technical Problem

However, according to the binding tapes of the conventional art as disclosed in PTL 1 and PTL 2, since the tape loop is easily torn when a force to spread the tape loop is applied thereto, the binding tape cannot be used in the guiding operation for agricultural crops having branches and stems having a high repulsive force.

For example, in a case of fixing branches to a fruit shelf in fruit tree cultivation such as pears and plums, when the branches are bound with the binding machine and the binding tape of the conventional art, the binding tape is stretched by the repulsive force of the branches. As a result, the binding tape is torn from holes formed upon fixing by a staple, so that the tape loop comes off.

For this reason, when fixing branches and the like having a high repulsive force, an operation of manually binding a string using a guiding string (a hemp string, a paper string, a plastic string, a rubber tube and the like) having high holding strength is performed. The manual operation is time consuming and requires intensive labor. Also, since the binding method is special, an unskilled operator cannot easily perform the method.

It is therefore an object of the present invention to implement binding using a binding machine for gardening even in a guiding operation for agricultural crops having a high repulsive force.

Unlike the adhesive tape disclosed in PTL 3, the binding tape has a feature that wound binding tapes are easily loosened from each other. For this reason, even though the technology disclosed in PTL 3 is applied to the binding tape, the binding tape is loosened toward a side perpendicular to a winding axis, i.e., in an outer diameter direction.

It is therefore an object of the present invention to provide a tape winding body where a binding tape for binding a to-be-bound object or a non-adhesive binding tape having no adhesive layer is difficult to loosen.

A reel may be used hooked on tree branches or stanchions (hereinbelow, referred to as "core rod") of diverse sizes. PTL 4 and PTL 5 do not disclose a reel that can be favorably supported on core rods of diverse diameters.

It is therefore an object of the present invention to provide a reel that can be favorably supported on core rods of diverse diameters.

Solution to Problem

The present invention has been made so as to solve the above problems, and provides a binding tape including an intermediate layer, and a first surface layer covering one surface of the intermediate layer, in which the intermediate layer has a plurality of first linear members arranged side by side at an angle with respect to a longitudinal direction of the binding tape.

The present invention as described above includes the intermediate layer, and the first surface layer covering one surface of the intermediate layer. The intermediate layer has the plurality of first linear members arranged side by side at an angle with respect to the longitudinal direction of the binding tape. According to this configuration, when a force to stretch the binding tape in the longitudinal direction is applied, the force to stretch the binding tape is also applied to the first linear members. Therefore, since strength of the binding tape is increased by the first linear members, it is possible to make it difficult for the binding tape to tear even though a staple is struck into the binding tape and binds the same. When the binding tape is used, it is possible to perform a binding operation by using a binding machine for gardening even in a guiding operation of crops having a high repulsive force.

The binding tape may further include a second surface layer covering the other surface of the intermediate layer. That is, the intermediate layer may be sandwiched between the first surface layer and the second surface layer.

The intermediate layer may also have a second linear member intersecting with the first linear members. According to this configuration, since intervals of the first linear members are suppressed from increasing by the second linear member, it is possible to suppress stretching of the binding tape. Therefore, even though the binding tape is stretched after a staple is struck into the binding tape and binds the same, holes pierced by the staple are difficult to expand, so that it is possible to provide the binding tape that is difficult to tear.

The first linear members may also be arranged orthogonal to the longitudinal direction of the binding tape, and the second linear member may extend in the longitudinal direction of the binding tape. According to this configuration, since the first linear members and the second linear member are arranged in a lattice shape, it is possible to increase the strength of the binding tape.

The intermediate layer may also be formed by weaving the first linear members and the second linear member each other. According to this configuration, since a surface of the intermediate layer has a flat sheet shape having less unevenness, the intermediate layer can be easily handled even before sandwiching the same between the first surface layer and the second surface layer, and the binding tape can be easily manufactured. Also, the first linear members and the second linear member are entangled with each other, so that the first linear members and the second linear member are difficult to relatively move and it is thus possible to effectively suppress stretching of the binding tape.

At least one of the first linear members and the second linear member may also be formed by bundling a fabric material. According to this configuration, even when the first linear members or the second linear member are thickened to increase the strength, a thickness of the intermediate layer can be prevented from increasing. That is, since the linear members formed by bundling the fabric material are flattened when sandwiching the intermediate layer between the first surface layer and the second surface layer, it is possible to reduce a thickness of the binding tape.

The first linear members may also be arranged side by side at intervals of 5 mm or smaller. According to this configuration, even when the binding tape is stretched and extended after the staple is struck for binding, leg portions of the staple collide with the first linear members until the binding tape is stretched by at least 5 mm. Therefore, further movement of the staple is hindered, so that it is possible to suppress the holes, which are formed upon fixing by the staple, from further expanding.

At least one of the first surface layer and the second surface layer may also be formed of a photodegradable or biodegradable material. According to this configuration, when the binding tape after bound is left outdoors, the binding tape can be naturally deteriorated. The surface layer is deteriorated in this way, so that the binding tape can be easily removed when harvesting agricultural crops, and even though the detached binding tape falls in the field, it can be made less noticeable.

Note that, the binding tape of the present invention can be used in a binding method of winding the binding tape around a to-be-bound object, overlapping both end portions of the binding tape, and striking a U-shaped staple into both the end portions to stitch and bind the vicinity of both the end portions each other. When the binding tape is used in the binding method, the leg portions of the staple are held by the first linear members, so that movement of the staple is suppressed. Thereby, the holes pierced by the staple are difficult to expand, so that the binding tape is difficult to tear.

The binding tape of the present invention can also be used in a binding method of winding the binding tape around a to-be-bound object by a binding machine having the binding tape mounted thereto, overlapping both end portions of the binding tape, and striking a U-shaped staple into both the end portions to stitch and bind the vicinity of both the end portions each other. When the binding tape is used in the binding method, the leg portions of the staple are held by the first linear members, so that movement of the staple is suppressed. Thereby, the holes pierced by the staple are difficult to expand, so that the binding tape is difficult to tear.

One end portion of the intermediate layer of the binding tape in a width direction may also be formed with a plurality of first cuts spaced in the longitudinal direction of the binding tape. The other end portion of the intermediate layer of the binding tape in the width direction may also be formed with a plurality of second cuts spaced in the longitudinal direction of the binding tape. At least one of the first cuts may also cut at least a portion of the second linear member. Positions in the longitudinal direction in which the plurality of first cuts are formed and positions in the longitudinal direction in which the plurality of second cuts are formed may be asymmetrical to each other with respect to a line passing through a center of the binding tape in the width direction. A position of the first surface layer or the second surface layer corresponding to at least one of the first cuts may also be formed with a cut cutting a portion of the first surface layer or the second surface layer. A position of the first surface layer or the second surface layer corresponding to at least one of the second cuts may also be formed with a cut cutting a portion of the first surface layer or the second surface layer. A position of the second surface layer corresponding to at least one of the first cuts may also be formed with a cut cutting a portion of the second surface layer. A position of the second surface layer corresponding to at least one of the second cuts may also be formed with a cut cutting a portion of the second surface layer. A length of at least one of the first cuts in the width direction with respect to a width of the binding tape may be 15% or less. The first cut may cut 60% or more of a length of the second linear member in the width direction.

In addition, there is provided a tape winding body including a cylindrical tube member, a binding tape wound on the tube member, and a first member positioned on a side surface of the wound binding tape and bonded to at least a part of the side surface. The first member may be flexible to be elastically deformed. The first member may also be formed with a hole communicating with a part surrounded by an inner wall of the tube member. An inner diameter of the tube member may also be larger than a diameter of the hole. The tube member may also have a cylindrical shape extending in a direction of a central axis passing through the part surrounded by the inner wall and the hole. A minimum distance (D2) between the tube member and the central axis may also be larger than a minimum distance (D1) between the first member and the central axis.

In the first member, the minimum distance (D2) between the tube member and the central axis may also be larger than the minimum distance (D1) between the first member and the central axis by 1 mm or greater. A part of the first member where the minimum distance (D2) between the tube member and the central axis is larger than the minimum distance (D1) between the first member and the central axis may also have a thickness (T) equal to or larger than 0.05 mm and equal to or smaller than 2 mm in a direction along the central axis. An adhesion area in which the first member and the side surface of the tape are bonded may also reduce from an outer periphery-side toward an inner periphery-side of the wound tape. The first member may also be provided with a region that reduces an adhesion area in which the first member and the side surface of the tape are bonded by an adhesive layer from the outer periphery-side toward the inner periphery-side of the wound tape, in which the adhesive layer is not exposed. At least a part of the first member may also be bonded to the tube member. In addition, the tape winding body may further include a second member having one surface facing parts of an end face of the tube member and the side surface of the tape and the other surface facing the first member and formed with a second hole communicating with the part surrounded by the tube member and the hole. The hole and the second hole may also have substantially the same diameters, and an inner diameter of the tube member may be larger than the diameters of the hole and the second hole. The first member may also be formed with a part communicating with the part surrounded by the inner wall of the tube member. The tube member may also have a cylindrical shape extending in a direction of a central axis passing through the part surrounded by the inner wall and the part communicating with the part. The minimum distance (D2) between the tube member and the central axis may also be larger than the minimum distance (D1) between the first member and the central axis. The minimum distance (D2) between the tube member and the central axis may also be larger than the minimum distance (D1) between the first member and the central axis by 1 mm or greater. A part of the first member where the minimum distance (D2) between the tube member and the central axis is larger than the minimum distance (D1) between the first member and the central axis may also have a thickness (T) equal to or larger than 0.05 mm and equal to or smaller than 2 mm.

An adhesion part between the binding tape and the first member may extend in a circumferential direction of the binding tape. The adhesion part between the binding tape and the first member may also extend in a radial direction of the binding tape. The adhesion part between the binding tape and the first member may be provided in plural with being spaced from each other. The adhesion part between the binding tape and the first member may also extend in a spiral shape extending in the circumferential direction and the radial direction of the binding tape.

In the tape winding body, the first member may also have a non-adhesion part that extends in the radial direction of the binding tape and is not bonded to the side surface of the binding tape. The first member may also have a first part including a portion that is bonded to the tube member, and a plurality of parts that are bonded to the side surface of the binding tape. The first member may also have a first part including a portion that is bonded to the tube member, and further have a first circular arc part that is bonded to the side surface of the binding tape and a second circular arc part that is not bonded to the side surface of the binding tape, on a virtual circle having an axis of the tube member as a center and including the first part therein.

In addition, there is provided a reel including a cylindrical tube member on which a binding tape can be wound, and a flexible protrusion protruding from an inner wall part of the tube member or one end face-side of the tube member toward an axis center of the tube member.

The protrusion may be provided within a range W of ±5.5 mm from a center position of the inner wall part in the axis center direction. One end face-side and the other end face-side of the tube member may communicate with each other, and a protruding amount P of the protrusion may be equal to or greater than 1 mm. A maximum thickness T of the protrusion in the axis center direction may be equal to or larger than 0.05 mm and equal to or smaller than 2 mm. The protrusion may be a film protruding from one end face-side of the tube member toward the axis center of the tube member. The film may have a two-layered structure. The protrusion may have at least one of water resistance and ductility.

In addition, there is provided a tape winding body including a binding tape, a reel including a cylindrical tube member on which the binding tape is wound and a flexible protrusion protruding from an inner wall part of the tube member or one end face-side of the tube member toward an axis center of the tube member, and a first member positioned on a side surface of the wound binding tape and bonded to at least a part of the side surface.

Here, an adhesion part between the binding tape and the first member may extend in a circumferential direction of the binding tape. The adhesion part between the binding tape and the first member may also extend in a radial direction of the binding tape. The adhesion part between the binding tape and the first member may be provided in plural with being spaced from each other. The adhesion part between the binding tape and the first member may also extend in a spiral shape extending in the circumferential direction and the radial direction of the binding tape.

In the tape winding body, the first member may also have a non-adhesion part that extends in the radial direction of the binding tape and is not bonded to the side surface of the binding tape. The first member may also have a first part including a portion that is bonded to the tube member, and a plurality of parts that are bonded to the side surface of the binding tape. The first member may also have a first part including a portion that is bonded to the tube member, and further have a first circular arc part that is bonded to the side surface of the binding tape and a second circular arc part that is not bonded to the side surface of the binding tape, on a virtual circle having an axis of the tube member as a center and including the first part therein.

The present disclosure also relates to a tape winding body. The tape winding body may include a cylindrical tube member, a tape that is wound on the tube member and can bind a to-be-bound object, and a first member positioned on a side surface of the wound tape, and the first member and at least a part of the side surface of the tape are bonded. Here, the first member may be flexible to be elastically deformed.

The first member may also be formed with a hole communicating with a part surrounded by an inner wall of the tube member. On the other hand, the first member may also be simply formed with a cut. A user or the like may push and expand the first member along the cut. The first member may not also be formed with a hole or a slit. A user or the like may tear a part of the first member.

An inner diameter of the tube member is preferably larger than a diameter of the hole. The tube member may also have a cylindrical shape extending in a direction of a central axis passing through the part surrounded by the inner wall and the hole. The hole is preferably formed so that a minimum distance (D2) between the inner wall surface of the tube member and the central axis is larger than a minimum distance (D1) between the first member and the central axis. The minimum distance (D2) between the inner wall surface of the tube member and the central axis is more preferably formed to be larger than the minimum distance (D1) between the first member and the central axis by 1 mm or greater.

A part of the first member where the minimum distance (D2) between the tube member and the central axis is larger than the minimum distance (D1) between the first member and the central axis has preferably a thickness (T) equal to or larger than 0.05 mm and equal to or smaller than 2 mm in a direction along the central axis.

An adhesion area in which the first member and the side surface of the tape are bonded may also reduce from an outer periphery-side toward an inner periphery-side of the wound tape. In addition, the tape winding body may further include a second member having one surface facing parts of a surface of the tube member and the side surface of the tape and the other surface facing the first member and formed with a second hole communicating with a space surrounded by the tube member and the hole. Here, the hole and the second hole may have substantially the same diameters, and an inner diameter of the tube member may be larger than the diameters of the hole and the second hole.

The present disclosure also relates to a tape winding body having a tape capable of binding two or more to-be-bound objects. The tape winding body includes a cylindrical tube member, a tape wound on the tube member and capable of binding the to-be-bound objects, and a first member bonded to a side surface of the wound tape and having a hole communicating with a part surrounded by an inner wall of the tube member. Note that, the first member may also be formed with a region that reduces an adhesion area in which the first member and the side surface of the tape are bonded by an adhesive layer from an outer periphery-side toward an inner periphery-side of the wound tape, in which the adhesive layer is not exposed.

The present disclosure also relates to a tape winding body having a tape capable of binding a to-be-bound object. The tape winding body includes a cylindrical tube member, a tape wound on the tube member, and a first member bonded to a side surface of the wound tape and having a hole communicating with a part surrounded by an inner wall of the tube member.

In the tape winding body, one end portion of an intermediate layer of the binding tape in a width direction may be formed with a plurality of first cuts spaced in a longitudinal direction of the binding tape. The other end portion of the intermediate layer of the binding tape in the width direction may also be formed with a plurality of second cuts spaced in the longitudinal direction of the binding tape. At least one of the first cuts may cut at least a portion of a second linear member. Positions in the longitudinal direction in which the plurality of first cuts are formed and positions in the longitudinal direction in which the plurality of second cuts are formed may be asymmetrical to each other with respect to a line passing through a center of the binding tape in the width direction. A position of the first surface layer or the second surface layer corresponding to at least one of the first cuts may also be formed with a cut cutting a portion of the first surface layer or the second surface layer. A position of the first surface layer or the second surface layer corresponding to at least one of the second cuts may also be formed with a cut cutting a portion of the first surface layer or the second surface layer. A position of the second surface layer corresponding to at least one of the first cuts may also be formed with a cut cutting a portion of the second surface layer. A position of the second surface layer corresponding to at least one of the second cuts may also be formed with a cut cutting a portion of the second surface layer. A length of at least one of the first cuts in the width direction with respect to a width of the binding tape may be 15% or less. The first cut may cut 60% or more of a length of the second linear member in the width direction.

In the tape winding body, the binding tape may include an intermediate layer, and a first surface layer covering one surface of the intermediate layer. The intermediate layer has a plurality of first linear members arranged side by side at an angle with respect to a longitudinal direction of the binding tape.

The present invention as described above includes the intermediate layer, and the first surface layer covering one surface of the intermediate layer. The intermediate layer has a plurality of first linear members arranged side by side at an angle with respect to the longitudinal direction of the binding tape. According to this configuration, when a force to stretch the binding tape in the longitudinal direction is applied, the force to stretch the binding tape is also applied to the first linear members. Therefore, since strength of the binding tape is increased by the first linear members, it is possible to make it difficult for the binding tape to tear even though a staple is struck into the binding tape and binds the same. When the binding tape is used, it is possible to perform a binding operation by using a binding machine for gardening even in a guiding operation of crops having a high repulsive force.

Note that, the binding tape may further include a second surface layer covering the other surface of the intermediate layer. That is, the intermediate layer may be sandwiched between the first surface layer and the second surface layer.

The intermediate layer may also have a second linear member intersecting with the first linear members. According to this configuration, since intervals of the first linear members are suppressed from increasing by the second linear member, it is possible to suppress stretching of the binding tape. Therefore, even though the binding tape is stretched after a staple is struck into the binding tape and binds the same, holes pierced by the staple are difficult to expand, so that it is possible to provide the binding tape that is difficult to tear.

The first linear members may also be arranged orthogonal to the longitudinal direction of the binding tape, and the second linear member may extend in the longitudinal direction of the binding tape. According to this configuration, since the first linear members and the second linear member are arranged in a lattice shape, it is possible to increase the strength of the binding tape.

The intermediate layer may also be formed by weaving the first linear members and the second linear member each other. According to this configuration, since a surface of the intermediate layer has a flat sheet shape having less unevenness, the intermediate layer can be easily handled even before sandwiching the same between the first surface layer and the second surface layer, and the binding tape can be easily manufactured. Also, the first linear members and the second linear member are entangled with each other, so that the first linear members and the second linear member are difficult to relatively move and it is thus possible to effectively suppress stretching of the binding tape.

At least one of the first linear members and the second linear member may also be formed by bundling a fabric material. According to this configuration, even when the first linear members or the second linear member is thickened to increase the strength, a thickness of the intermediate layer can be prevented from increasing. That is, since the linear members formed by bundling the fabric material are flattened when sandwiching the intermediate layer between the first surface layer and the second surface layer, it is possible to reduce the thickness of the binding tape.

The first linear members may also be arranged side by side at intervals of 5 mm or smaller. According to this configuration, even when the binding tape is stretched and extended after the staple is struck for binding, leg portions of the staple collide with the first linear members until the binding tape is stretched by at least 5 mm. Therefore, further movement of the staple is hindered, so that it is possible to suppress the holes, which are formed upon fixing by the staple, from further expanding.

At least one of the first surface layer and the second surface layer may also be formed of a photodegradable or biodegradable material. According to this configuration, when the binding tape after bound is left outdoors, the binding tape can be naturally deteriorated. The surface layer is deteriorated in this way, so that the binding tape can be easily removed when harvesting agricultural crops, and even though the detached binding tape falls in the field, it can be made less noticeable.

Note that, the binding tape of the present invention can be used in a binding method of winding the binding tape around a to-be-bound object, overlapping both end portions of the binding tape, and striking a U-shaped staple into both the end portions to stitch and bind the vicinity of both the end portions each other. When the binding tape is used in the binding method, the leg portions of the staple are held by the first linear members, so that movement of the staple is suppressed. Thereby, the holes pierced by the staple are difficult to expand, so that the binding tape is difficult to tear.

The binding tape of the present invention can also be used in a binding method of winding the binding tape around a to-be-bound object by a binding machine having the binding tape mounted thereto, overlapping both end portions of the binding tape, and striking a U-shaped staple into both the end portions to stitch and bind the vicinity of both the end portions each other. When the binding tape is used in the binding method, the leg portions of the staple are held by the first linear members, so that movement of the staple is suppressed. Thereby, the holes pierced by the staple are difficult to expand, so that the binding tape is difficult to tear.

Here, an adhesion part between the binding tape and the first member may extend in a circumferential direction of the binding tape. The adhesion part between the binding tape and the first member may also extend in a radial direction of the binding tape. The adhesion part between the binding tape and the first member may be provided in plural with being spaced from each other. The adhesion part between the binding tape and the first member may also extend in a spiral shape extending in the circumferential direction and the radial direction of the binding tape.

In the tape winding body, the first member may also have a non-adhesion part that extends in the radial direction of the binding tape and is not bonded to a side surface of the binding tape. The first member may also have a first part including a portion that is bonded to the tube member, and a plurality of parts that are bonded to the side surface of the binding tape. The first member may also have a first part including a portion that is bonded to the tube member, and further have a first circular arc part that is bonded to the side surface of the binding tape and a second circular arc part that is not bonded to the side surface of the binding tape, on a virtual circle having an axis of the tube member as a center and including the first part therein.

The present disclosure provides a reel including a cylindrical tube member on which a tape capable of binding a to-be-bound object can be wound, and a flexible protrusion protruding from an inner wall part of the tube member or one end face-side of the tube member toward an axis center of the tube member. Here, the reel may include a tape wound on the tube member and capable of binding the to-be-bound object.

According to this configuration, since the protrusion is flexible, when a rod-shaped member such as a tree branch is inserted into the tube member, the protrusion is bent, so that a check effect of making it difficult for the rod-shaped member to separate in a pull-off direction can be achieved.

The protrusion is preferably provided within a range W of ±5.5 mm from a center position of the inner wall part in the axis center direction.

According to this configuration, when a rod-shaped member such as a tree branch is inserted into the tube member, the protrusion is favorably bent by engagement between the rod-shaped member and the tube member, so that the reel is stably supported without being excessively tilted.

The maximum thickness T in the axis center direction is preferably equal to or larger than 0.05 mm and equal to or smaller than 2 mm. The protrusion may also be a film protruding from one end face-side of the tube member toward the axis center of the tube member.

According to this configuration, since the protrusion is provided as the film, the protrusion can be easily provided to the tube member. By adjusting a shape of the film, it is also possible to easily adjust the protruding amount P and the maximum thickness T. Also, the protrusion can be formed of a material having physical properties (including an elastic modulus) different from the tube member. Note that, the film may have a two-layered structure.

The film has a two-layered structure, so that it is possible to adjust the protruding amount P and the maximum thickness T according to uses. Also, the film has a two-layered structure, so that when bonding a first member to an end face of the tube member, even though an adhesive or the like squeezes out of a part of the first member becoming the protrusion, the adhesive or gluing agent can be covered by a second member. In a case where a rod-shaped member such as a tree branch is inserted into the tube member to pull out the tape, it is possible to prevent the squeezed adhesive or gluing agent from becoming a resistance to have a bad influence. Note that, the two-layered structure includes a multilayered structure of three or more layers including the two-layered structure.

Preferably, one end face-side and the other end face-side of the tube member communicate with each other, and a protruding amount P of the protrusion is 1 mm or greater.

If the protrusion is provided within the above numerical range, when a rod-shaped member such as a tree branch is inserted into the tube member to pull out the tape, the protrusion is bent, so that a favorable braking force can be obtained.

The protrusion may also be configured by a first member having a surface facing one end face of the tube member and extending toward the axis center of the tube member. In addition, a second member having one surface facing one end face of the tube member and the other surface facing the first member, and extending toward the axis center of the tube member may be further provided. Here, the first member may also be formed with a hole communicating with a part surrounded by an inner wall of the tube member.

In a cross section including the axis center, the protrusion can be formed so that a tangential line, which contacts the protrusion at a first contact point at a tip end of the protrusion and contacts the tube member at a second contact point on the other end face-side of the tube member, is inclined with respect to a straight line including the axis center. An angle of inclination is preferably 3° or greater, for example.

The present disclosure also relates to a reel having a tape capable of binding a to-be-bound object. The reel includes a tube member, a tape wound on the tube member, and a protrusion extending on one end face-side of the tube member toward an axis center of the tube member, wherein in a cross section including the axis center, a tangential line that contacts the protrusion at a first contact point at a tip end of the protrusion and contacts the tube member at a second contact point on the other end face-side of the tube member is formed so as to be inclined with respect to a straight line including the axis center. An angle of inclination is preferably 3° or greater, for example.

The present disclosure also relates to a reel including a cylindrical tube member on which a tape capable of binding a to-be-bound object is wound. Here, in a first cross section including an axis center, at least one end portion of the tube member in an axis center direction may be provided with a first protrusion extending from an inner wall of the tube member toward the axis center, and in a second cross section including the axis center and different from the first cross section, the same one end portion may be provided with a second protrusion extending from the inner wall of the tube member toward the axis center. However, an annular protrusion where the first protrusion and the second protrusion are integrally formed may also be possible. On the other hand, the first protrusion and the second protrusion may also be formed spaced from each other in a circumferential direction whose center is the axis center. In this case, in a third cross section including the axis center, the protrusion protruding from the inner wall is not formed. Preferably, the protrusions have end portions close to the axis center, as free ends, and are configured so as to be deformable in any direction of the axis center direction (a direction of the axis center direction facing toward the other end portion or an opposite direction thereto). The deformation is preferably elastic deformation. That is, the protrusions are preferably formed by a size and a material that enables return to an original shape when an action of force causing the deformation disappears.

The reel may further include a tape that is wound on the tube member and can bind the to-be-bound object.

In a tape winding body where a bindable tape is wound on the tube member, one end portion of an intermediate layer of the binding tape in a width direction may be formed with a plurality of first cuts spaced in a longitudinal direction of the binding tape. The other end portion of the intermediate layer of the binding tape in the width direction may be formed with a plurality of second cuts spaced in the longitudinal direction of the binding tape. At least one of the first cuts of the second linear member may cut at least a portion of the second linear member. Positions in the longitudinal direction in which the plurality of first cuts are formed and positions in the longitudinal direction in which the plurality of second cuts are formed may be asymmetrical to each other with respect to a line passing through a center of the binding tape in the width direction. A position of the first surface layer or the second surface layer corresponding to at least one of the first cuts may also be formed with a cut cutting a portion of the first surface layer or the second surface layer. A position of the first surface layer or the second surface layer corresponding to at least one of the second cuts may also be formed with a cut cutting a portion of the first surface layer or the second surface layer. A position of the second surface layer corresponding to at least one of the first cuts may also be formed with a cut cutting a portion of the second surface layer. A position of the second surface layer corresponding to at least one of the second cuts may also be formed with a cut cutting a portion of the second surface layer. A length of at least one of the first cuts in the width direction with respect to a width of the binding tape may be 15% or less. The first cut may cut 60% or more of a length of the second linear member in the width direction.

The reel as a tape winding body includes a cylindrical tube member, a tape wound on the tube member and capable of binding a to-be-bound object, and a first member positioned on a side surface of the wound tape, and the first member and at least a part of the side surface of the tape are bonded. Here, the first member may be flexible to be elastically deformed.

The first member may also be formed with a hole communicating with a part surrounded by an inner wall of the tube member. On the other hand, the first member may be simply formed with a cut. A user or the like may push and expand the first member along the cut. The first member may not also be formed with a hole or a slit. A user or the like may tear a part of the first member.

An inner diameter of the tube member is preferably larger than a diameter of the hole. The tube member may also have a cylindrical shape extending in a direction of a central axis passing through the part surrounded by the inner wall and the hole. The hole is preferably formed so that a minimum distance (D2) between the inner wall surface of the tube member and the central axis is larger than a minimum distance (D1) between the first member and the central axis. The minimum distance (D2) between the inner wall surface of the tube member and the central axis is more preferably formed to be larger than the minimum distance (D1) between the first member and the central axis by 1 mm or greater.

A part of the first member where the minimum distance (D2) between the tube member and the central axis is larger than the minimum distance (D1) between the first member and the central axis has preferably a thickness T equal to or larger than 0.05 mm and equal to or smaller than 2 mm in a direction along the central axis.

An adhesion area in which the first member and the side surface of the tape are bonded may also reduce from an outer periphery-side toward an inner periphery-side of the wound tape. In addition, the reel may further include a second member having one surface facing parts of a surface of the tube member and the side surface of the tape and the other surface facing the first member and formed with a second hole communicating with a space surrounded by the tube member and the hole. Here, the hole and the second hole may have substantially the same diameters, and the inner diameter of the tube member may be larger than the diameters of the hole and the second hole.

The present disclosure also relates to a tape winding body having a tape capable of binding two or more to-be-bound objects. The tape winding body includes a cylindrical tube member, a tape wound on the tube member and capable of binding the to-be-bound objects, and a first member bonded to a side surface of the wound tape and having a hole communicating with a part surrounded by an inner wall of the tube member. Note that, the first member may also be formed with a region that reduces an adhesion area in which the first member and the side surface of the tape are bonded by an adhesive layer from an outer periphery-side toward an inner periphery-side of the wound tape, and in which the adhesive layer is not exposed.

The present disclosure also relates to a tape winding body having a tape capable of binding a to-be-bound object. The tape winding body includes a cylindrical tube member, a tape wound on the tube member, and a first member bonded to a side surface of the wound tape and having a hole communicating with a part surrounded by an inner wall of the tube member.

In the reel or the tape winding body, the binding tape may have an intermediate layer, and a first surface layer covering one surface of the intermediate layer. The intermediate layer has a plurality of first linear members arranged side by side at an angle with respect to a longitudinal direction of the binding tape.

The present invention as described above includes an intermediate layer, and a first surface layer covering one surface of the intermediate layer. The intermediate layer has a plurality of first linear members arranged side by side at an angle with respect to a longitudinal direction of the binding tape. According to this configuration, when a force to stretch the binding tape in the longitudinal direction is applied, the force to stretch the binding tape is also applied to the first linear members. Therefore, since strength of the binding tape is increased by the first linear members, it is possible to make it difficult for the binding tape to tear even though a staple is struck into the binding tape and binds the same. When the binding tape is used, it is possible to perform a binding operation by using a binding machine for gardening even in a guiding operation of crops having a high repulsive force.

Note that, the present invention may further include a second surface layer covering the other surface of the intermediate layer. That is, the intermediate layer may be sandwiched between the first surface layer and the second surface layer.

The intermediate layer may also have a second linear member intersecting with the first linear members. According to this configuration, since intervals of the first linear members are suppressed from increasing by the second linear member, it is possible to suppress stretching of the binding tape. Therefore, even though the binding tape is stretched after a staple is struck into the binding tape and binds the same, holes pierced by the staple are difficult to expand, so that it is possible to provide the binding tape that is difficult to tear.

The first linear members may also be arranged orthogonal to the longitudinal direction of the binding tape, and the second linear member may extend in the longitudinal direction of the binding tape. According to this configuration, since the first linear members and the second linear member are arranged in a lattice shape, it is possible to increase the strength of the binding tape.

The intermediate layer may also be formed by weaving the first linear members and the second linear member each other. According to this configuration, since a surface of the intermediate layer has a flat sheet shape having less unevenness, the intermediate layer can be easily handled even before sandwiching the same between the first surface layer and the second surface layer, and the binding tape can be easily manufactured. Also, the first linear members and the second linear member are entangled with each other, so that the first linear members and the second linear member are difficult to relatively move and it is thus possible to effectively suppress stretching of the binding tape.

At least one of the first linear members and the second linear member may also be formed by bundling a fabric material. According to this configuration, even when the first linear members or the second linear member is thickened to increase the strength, a thickness of the intermediate layer can be prevented from increasing. That is, since the linear members formed by bundling the fabric material are flattened when sandwiching the intermediate layer between the first surface layer and the second surface layer, it is possible to reduce the thickness of the binding tape.

The first linear members may also be arranged side by side at intervals of 5 mm or smaller. According to this configuration, even when the binding tape is stretched and extended after the staple is struck for binding, leg portions of the staple collide with the first linear members until the binding tape is stretched by at least 5 mm. Therefore, further movement of the staple is hindered, so that it is possible to suppress the holes, which are formed upon fixing by the staple, from further expanding.

At least one of the first surface layer and the second surface layer may also be formed of a photodegradable or biodegradable material. According to this configuration, when the binding tape after bound is left outdoors, the binding tape can be naturally deteriorated. The surface layer is deteriorated in this way, so that the binding tape can be easily removed when harvesting agricultural crops, and even though the detached binding tape falls in the field, it can be made less noticeable.

Note that, the binding tape of the present invention can be used in a binding method of winding the binding tape around a to-be-bound object, overlapping both end portions of the binding tape, and striking a U-shaped staple into both the end portions to stitch and bind the vicinity of both the end portions each other. When the binding tape is used in the binding method, the leg portions of the staple are held by the first linear members, so that movement of the staple is suppressed. Thereby, the holes pierced by the staple are difficult to expand, so that the binding tape is difficult to tear.

The binding tape of the present invention can also be used in a binding method of winding the binding tape around a to-be-bound object by a binding machine having the binding tape mounted thereto, overlapping both end portions of the binding tape, and striking a U-shaped staple into both the end portions to stitch and bind the vicinity of both the end portions each other. When the binding tape is used in the binding method, the leg portions of the staple are held by the first linear members, so that movement of the staple is suppressed. Thereby, the holes pierced by the staple are difficult to expand, so that the binding tape is difficult to tear.

Supplementary Remarks

Subsequently, technical spirits that can be perceived from a plurality of embodiments and modified embodiments, which will be described later, are described.
(Supplementary Remark A)
  1. A tape winding body including:
    a cylindrical tube member;
    a binding tape wound on the tube member; and
    a first member positioned on a side surface of the wound binding tape and bonded to at least a part of the side surface.
  2. The tape winding body according to the above 1, wherein the first member is flexible to be elastically deformed.
  3. The tape winding body according to the above 1, wherein the first member is formed with a hole communicating with a part surrounded by an inner wall of the tube member.
  4. The tape winding body according to the above 3, wherein an inner diameter of the tube member is larger than a diameter of the hole.
  5. The tape winding body according to the above 3, wherein the tube member has a cylindrical shape extending in a direction of a central axis passing through the part surrounded by the inner wall and the hole, and a minimum distance (D2) between the tube member and the central axis is larger than a minimum distance (D1) between the first member and the central axis.
  6. The tape winding body according to the above 5, wherein in the first member, the minimum distance (D2) between the tube member and the central axis is larger than the minimum distance (D1) between the first member and the central axis by 1 mm or greater.
  7. The tape winding body according to the above 5 or 6, wherein a part of the first member where the minimum distance (D2) between the tube member and the central axis is larger than the minimum distance (D1) between the first member and the central axis has a thickness (T) equal to or larger than 0.05 mm and equal to or smaller than 2 mm in a direction along the central axis.
  8. The tape winding body according to the above 1, wherein an adhesion area in which the first member and the side surface of the tape are bonded reduces from an outer periphery-side toward an inner periphery-side of the wound binding tape.
  9. The tape winding body according to the above 1, wherein the first member is provided with a region that reduces an adhesion area in which the first member and the side surface of the binding tape are bonded by an adhesive layer from an outer periphery-side toward an inner periphery-side of the binding tape, the adhesive layer not being exposed in the region.
  10. The tape winding body according to the above 3, wherein at least a part of the first member is bonded to the tube member.
  11. The tape winding body according to the above 3, further comprising a second member having one surface facing parts of an end face of the tube member and the side surface of the binding tape and the other surface facing the first member and formed with a second hole communicating with the part surrounded by the tube member and the hole.
  12. The tape winding body according to the above 11, wherein the hole and the second hole have substantially the same diameters, and an inner diameter of the tube member is larger than the diameters of the hole and the second hole.
  13. The tape winding body according to the above 1 or 2, wherein the first member is formed with a part communicating with a part surrounded by an inner wall of the tube member.
  14. The tape winding body according to the above 13, wherein the tube member has a cylindrical shape extending in a direction of a central axis passing through the part surrounded by the inner wall and the part communicating with the part, and a minimum distance (D2) between the tube member and the central axis is larger than a minimum distance (D1) between the first member and the central axis.
  15. The tape winding body according to the above 14, wherein the minimum distance (D2) between the tube member and the central axis is larger than the minimum distance (D1) between the first member and the central axis by 1 mm or greater.
  16. The tape winding body according to the above 14, wherein a part of the first member where the minimum distance (D2) between the tube member and the central axis is larger than the minimum distance (D1) between the first member and the central axis has a thickness (T) equal to or larger than 0.05 mm and equal to or smaller than 2 mm.
  17. The tape winding body according to the above 1, wherein the first member has a first part including a portion that is bonded to the tube member, and a second part including a portion that extends in a radial direction of the binding tape and is bonded to the side surface of the binding tape.
  18. The tape winding body according to the above 17, wherein the first member has a non-adhesion part that extends in the radial direction of the binding tape and is not bonded to the side surface of the binding tape.
  19. The tape winding body according to the above 1, wherein the first member has a first part including a portion that is bonded to the tube member, and a plurality of parts that are bonded to the side surface of the binding tape.
  20. The tape winding body according to the above 1, wherein the first member has a first part including a portion that is bonded to the tube member, and further has a first circular arc part that is bonded to the side surface of the binding tape and a second circular arc part that is not bonded to the side surface of the binding tape, on a virtual circle having an axis of the tube member as a center and including the first part therein.
  21. The tape winding body according to the above 1, wherein the binding tape includes:

an intermediate layer, and
a first surface layer covering one surface of the intermediate layer, and
wherein the intermediate layer has a plurality of first linear members arranged side by side at an angle with respect to a longitudinal direction of the binding tape.

22. The tape winding body according to the above 21, wherein the intermediate layer has a second linear member intersecting with the first linear members.

23. The tape winding body according to the above 22, wherein the first linear members are arranged orthogonal to the longitudinal direction of the binding tape, and
wherein the second linear member extends in the longitudinal direction of the binding tape.

24. The tape winding body according to the above 22 or 23, wherein the first linear members and the second linear member are formed by weaving the same each other.

25. The tape winding body according to any one of the above 22 to 24, wherein at least one of the first linear members and the second linear member is formed by bundling a fabric material.

26. The tape winding body according to any one of the above 21 to 25, wherein the first linear members are arranged side by side at intervals of 5 mm or smaller.

27. The tape winding body according to any one of the above 21 to 26, further including a second surface layer covering the other surface of the intermediate layer.

28. The tape winding body according to the above 27, wherein at least one of the first surface layer and the second surface layer is formed of a photodegradable or biodegradable material.

29. The tape winding body according to any one of the above 21 to 28, wherein one end portion of the intermediate layer in a width direction is formed with a plurality of first cuts spaced in the longitudinal direction of the binding tape.

30. The tape winding body according to the above 29, wherein the other end portion of the intermediate layer in the width direction is formed with a plurality of second cuts spaced in the longitudinal direction of the binding tape.

31. The tape winding body according to the above 21 or 25, wherein one end portion of the intermediate layer in a width direction is formed with a plurality of first cuts spaced in the longitudinal direction of the binding tape, and at least one of the first cuts cuts at least a portion of the second linear members.

32. The tape winding body according to the above 30, wherein positions in the longitudinal direction in which the plurality of first cuts are formed and positions in the longitudinal direction in which the plurality of second cuts are formed are asymmetrical to each other with respect to a line passing through a center of the binding tape in a width direction.

33. The tape winding body according to the above 30 or 32, wherein a position of the first surface layer corresponding to at least one of the first cuts is formed with a cut cutting a portion of the first surface layer.

34. The tape winding body according to the above 30 or 32, wherein a position of the first surface layer corresponding to at least one of the second cuts is formed with a cut cutting a portion of the first surface layer.

35. The tape winding body according to the above 29, wherein a length of at least one of the first cuts in the width direction with respect to a width of the binding tape is 15% or less.

36. The tape winding body according to the above 31, wherein the first cut cuts 60% or more of a width of the second linear member.

37. A binding method including:
winding the binding tape from the tape winding body according to any one of the above 1 to 36 around a to-be-bound object, and
overlapping both end portions of the wound binding tape, and striking a U-shaped staple into both the end portions to stitch and bind the vicinity of both the end portions each other.

38. A binding method of binding a to-be-bound object by using a binding machine having the tape winding body mounted thereto according to any one of the above 1 to 36, the binding method including:
winding the binding tape around the to-be-bound object;
overlapping both end portions of the wound binding tape, and striking a U-shaped staple into both the end portions to stitch and bind the vicinity of both the end portions each other.

(Supplementary Remark B)

101. A reel including:
a cylindrical tube member on which a binding tape capable of binding a to-be-bound portion can be wound, and
a flexible protrusion protruding from an inner wall part of the tube member or one end face-side of the tube member toward an axis center of the tube member.

102. The reel according to the above 101, wherein the protrusion is provided within a range W of ±5.5 mm from a center position of the inner wall part in the axis center direction.

103. The reel according to the above 101 or 102, wherein one end face-side and the other end face-side of the tube member communicate with each other, and
wherein a protruding amount P of the protrusion is equal to or greater than 1 mm.

104. The reel according to any one of the above 101 to 103, wherein a maximum thickness T of the protrusion in the axis center direction is equal to or larger than 0.05 mm and equal to or smaller than 2 mm.

105. The reel according to any one of the above 101 to 104, wherein the protrusion is a film protruding from one end face-side of the tube member toward the axis center of the tube member.

106. The reel according to the above 105, wherein the film has a two-layered structure.

107. The reel according to any one of the above 101 to 106, wherein the protrusion has at least one of water resistance and ductility.

108. A tape winding body having a binding tape wound on the reel according to the above 101, the tape winding body including:
a binding tape;
a reel including a cylindrical tube member on which the binding tape is wound and a flexible protrusion protruding from an inner wall part of the tube member or one end face-side of the tube member toward an axis center of the tube member; and
a first member positioned on a side surface of the wound binding tape and bonded to at least a part of the side surface.

109. The tape winding body according to the above 108, wherein the first member has a first part including a portion that is bonded to the tube member, and a second part including a portion that extends in a radial direction of the binding tape and is bonded to the side surface of the binding tape.

110. The tape winding body according to the above 108, wherein the first member has a non-adhesion part that extends in a radial direction of the binding tape and is not bonded to the side surface of the binding tape.

111. The tape winding body according to the above 108, wherein the first member has a first part including a portion that is bonded to the tube member, and a plurality of parts that are bonded to the side surface of the binding tape.

112. The tape winding body according to the above 108, wherein the first member has a first part including a portion that is bonded to the tube member, and further has a first circular arc part that is bonded to the side surface of the binding tape and a second circular arc part that is not bonded to the side surface of the binding tape, on a virtual circle having an axis of the tube member as a center and including the first part therein.

113. The tape winding body according to the above 108, further including:
an intermediate layer, and
a first surface layer covering one surface of the intermediate layer,
wherein the intermediate layer has a plurality of first linear members arranged side by side at an angle with respect to a longitudinal direction of the binding tape.

114. The tape winding body according to the above 113, wherein the intermediate layer has a second linear member intersecting with the first linear members.

115. The tape winding body according to the above 114, wherein the first linear members are arranged orthogonal to the longitudinal direction of the binding tape, and
wherein the second linear member extends in the longitudinal direction of the binding tape.

116. The tape winding body according to the above 114 or 115, wherein the first linear members and the second linear member are formed by weaving the same each other.

117. The tape winding body according to any one of the above 114 to 116, wherein at least one of the first linear members and the second linear member is formed by bundling a fabric material.

118. The tape winding body according to any one of the above 113 to 117, wherein the first linear members are arranged side by side at intervals of 5 mm or smaller.

119. The tape winding body according to any one of the above 113 to 118, further including a second surface layer covering the other surface of the intermediate layer.

120. The tape winding body according to the above 119, wherein at least one of the first surface layer and the second surface layer is formed of a photodegradable or biodegradable material.

121. The tape winding body according to any one of the above 113 to 120, wherein one end portion of the intermediate layer in a width direction is formed with a plurality of first cuts spaced in the longitudinal direction of the binding tape.

122. The tape winding body according to the above 121, wherein the other end portion of the intermediate layer in the width direction is formed with a plurality of second cuts spaced in the longitudinal direction of the binding tape.

123. The tape winding body according to any one of the above 114 or 117, wherein one end portion of the intermediate layer in a width direction is formed with a plurality of first cuts spaced in the longitudinal direction of the binding tape, and at least one of the first cuts cuts at least a portion of the second linear member.

124. The tape winding body according to the above 122, wherein positions in the longitudinal direction in which the plurality of first cuts are formed and positions in the longitudinal direction in which the plurality of second cuts are formed are asymmetrical to each other with respect to a line passing through a center of the binding tape in a width direction.

125. The tape winding body according to the above 122 or 124, wherein a position of the first surface layer corresponding to at least one of the first cuts is formed with a cut cutting a portion of the first surface layer.

126. The tape winding body according to the above 122 or 124, wherein a position of the first surface layer corresponding to at least one of the second cuts is formed with a cut cutting a portion of the first surface layer.

127. The tape winding body according to the above 121, wherein a length of at least one of the first cuts in the width direction with respect to a width of the binding tape is 15% or less.

128. The tape winding body according to the above 123, wherein the first cut cuts 60% or more of a width of the second linear member.

129. A binding method including:
winding the binding tape of the tape winding body according to any one of the above 113 to 128 around a to-be-bound object, and
overlapping both end portions of the wound binding tape, and striking a U-shaped staple into both the end portions to stitch and bind the vicinity of both the end portions each other.

130. A binding method of binding a to-be-bound object by using a binding machine having the binding tape of the tape winding body according to any one of the above 113 to 128, the binding method including:
winding the binding tape around the to-be-bound object;
overlapping both end portions of the wound binding tape, and striking a U-shaped staple into both the end portions to stitch and bind the vicinity of both the end portions each other.

131. The tape winding body according to the above 108, wherein the first member is flexible to be elastically deformed.

132. The tape winding body according to the above 108, wherein the first member is formed with a hole communicating with a part surrounded by the inner wall of the tube.

133. The tape winding body according to the above 132, wherein an inner diameter of the tube member is larger than a diameter of the hole.

134. The tape winding body according to the above 132, wherein the tube member has a cylindrical shape extending in a direction of a central axis passing through the part surrounded by the inner wall and the hole, and
wherein a minimum distance (D2) between the tube member and the central axis is larger than a minimum distance (D1) between the first member and the central axis.

135. The tape winding body according to the above 134, wherein in the first member, the minimum distance (D2) between the tube member and the central axis is larger than the minimum distance (D1) between the first member and the central axis by 1 mm or greater.

136. The tape winding body according to the above 134 or 135, wherein a part of the first member where the minimum distance (D2) between the tube member and the central axis is larger than the minimum distance (D1) between the first member and the central axis has a thickness (T) equal to or larger than 0.05 mm and equal to or smaller than 2 mm.

137. The tape winding body according to the above 108, wherein an adhesion area in which the first member and the side surface of the tape are bonded reduces from an outer periphery-side toward an inner periphery-side of the wound binding tape.

138. The tape winding body according to the above 108, wherein the first member is provided with a region that reduces an adhesion area in which the first member and the side surface of the binding tape are bonded by an adhesive layer from an outer periphery-side toward an inner periphery-side of the wound binding tape, the adhesive layer not being exposed in the region.

139. The tape winding body according to the above 132, wherein at least a part of the first member is bonded to the tube member.

140. The tape winding body according to the above 132, further comprising a second member having one surface facing parts of an end face of the tube member and the side surface of the binding tape and the other surface facing the first member and formed with a second hole communicating with the part surrounded by the tube member and the hole.

141. The tape winding body according to the above 140, wherein the hole and the second hole have substantially the same diameters, and an inner diameter of the tube member is larger than the diameters of the hole and the second hole.

142. The tape winding body according to the above 108 or 109, wherein the first member is formed with a part communicating with a part surrounded by the inner wall of the tube member.

143. The tape winding body according to the above 142, wherein the tube member has a cylindrical shape extending in a direction of a central axis passing through the part surrounded by the inner wall and the part communicating with the part, and a minimum distance (D2) between the tube member and the central axis is larger than a minimum distance (D1) between the first member and the central axis.

144. The tape winding body according to the above 143, wherein the minimum distance (D2) between the tube member and the central axis is larger than the minimum distance (D1) between the first member and the central axis by 1 mm or greater.

145. The tape winding body according to the above 143, wherein a part of the first member where the minimum distance (D2) between the tube member and the central axis is larger than the minimum distance (D1) between the first member and the central axis has a thickness (T) equal to or larger than 0.05 mm and equal to or smaller than 2 mm.

146. The tape winding body according to the above 108, wherein the first member has a first part including a portion that is bonded to the tube member, and a second part including a portion that extends in a radial direction of the binding tape and is bonded to the side surface of the binding tape.

147. The tape winding body according to the above 146, wherein the first member has a non-adhesion part that extends in the radial direction of the binding tape and is not bonded to the side surface of the binding tape.

148. The tape winding body according to the above 108, wherein the first member has a first part including a portion that is bonded to the tube member, and a plurality of parts that are bonded to the side surface of the binding tape.

149. The tape winding body according to the above 108, wherein the first member has a first part including a portion that is bonded to the tube member, and further has a first circular arc part that is bonded to the side surface of the binding tape and a second circular arc part that is not bonded to the side surface of the binding tape, on a virtual circle having an axis of the tube member as a center and including the first part therein.

The problems corresponding to the Supplementary Remark A (Supplementary Remark 1 to 38) and Supplementary Remark B (Supplementary Remark 101 to 149) are described as follows.

PTL 3 discloses technology of arranging thick papers arranged side by side to face a side surface of an adhesive tape so as to prevent a so-called bamboo shoot phenomenon that a wound adhesive tape slides laterally in a winding axis direction to form a mortar shape due to residual stress generated when pulling out the adhesive tape or strain stress generated due to a change in temperature during storage. Since the thick papers are bonded only to an end face of a core body, on which the adhesive tape is wound, by paste and are not bonded to a side surface of the adhesive tape, the papers do not apply resistance when pulling out the adhesive tape, and can prevent the adhesive tape from sliding laterally in the winding axis direction.

PTL 4 discloses a paper tube for winding a thread such as wool thereon. The paper tube is formed to have a conical shape so that the thread can be easily pulled out even though the thread is steamed and swollen.

PTL 5 discloses a taping reel for winding an electronic component band having an electronic component bonded thereto. The taping reel has such a configuration that two side plates made of plastic sheets are arranged to face each other and boss parts protruding from central portions of each of the side plates are abutted and bonded to each other to form an outer peripheral surface for winding the electronic component band.

Unlike the adhesive tape disclosed in PTL 3, a binding tape has a feature that wound binding tapes are easily loosened from each other. For this reason, even though the technology disclosed in PTL 3 is applied to the binding tape, the binding tape is loosened toward a side perpendicular to a winding axis, i.e., in an outer diameter direction.

It is therefore an object of the invention described as Supplementary Remarks to provide a tape winding body where a binding tape for binding a to-be-bound object or a non-adhesive binding tape having no adhesive layer is difficult to loosen.

A reel may also be used hooked on tree branches or stanchions (hereinbelow, referred to as "core rod") of diverse sizes. PTL 4 and PTL 5 do not disclose a reel that can be favorably supported on core rods of diverse diameters.

It is therefore an object of the invention described as Supplementary Remarks to provide a reel that can be favorably supported on core rods of diverse diameters.

BRIEF DESCRIPTION OF DRAWINGS

FIG. 8A and FIG. 8B depict an aspect of stitching a tape loop by the staple, in which FIG. 8A depicts a state before the staple is clinched and FIG. 8B depicts a state after the staple is clinched.

FIG. 9A and FIG. 9B depict an aspect of stitching a tape loop by the staple (a first surface layer is omitted), in which FIG. 9A depicts a state before the staple is clinched and FIG. 9B depicts a state after the staple is clinched.

FIG. 11A and FIG. 11B depict Modified Embodiment 1, in which FIG. 11A depicts a state before a surface layer is degraded, and FIG. 11B depicts a state after the surface layer is degraded.

FIG. 12A and FIG. 12B depict Modified Embodiment 2, in which FIG. 12A depicts a state before a binding tape is stretched, and FIG. 12B depicts a state after the binding tape is stretched.

DESCRIPTION OF EMBODIMENTS

Embodiments of the present invention will be described with reference to the drawings.

First Embodiment

Figure 1:
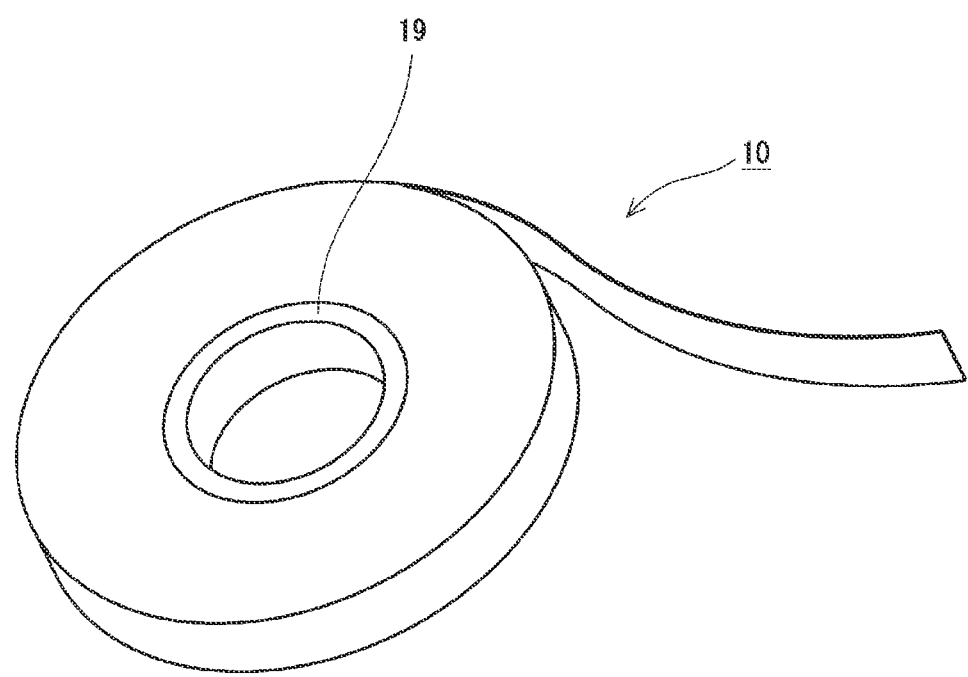
FIG. 1 depicts an outer shape of a binding tape.

A binding tape 10 in accordance with the present embodiment is used for binding of a to-be-bound object 40, and is used, for example, for a guiding/binding operation when cultivating agricultural crops. Specifically, the binding tape is used so as to bind plant vines, stems, branches and the like to stanchions, nets, shelves and the like. The binding tape 10 is usually used mounted to a binding machine 20 (which will be described later), and is wound on a winding core 19, as shown in FIG. 1, which is then loaded in a tape magazine 26 of the binding machine 20.

Figure 2:
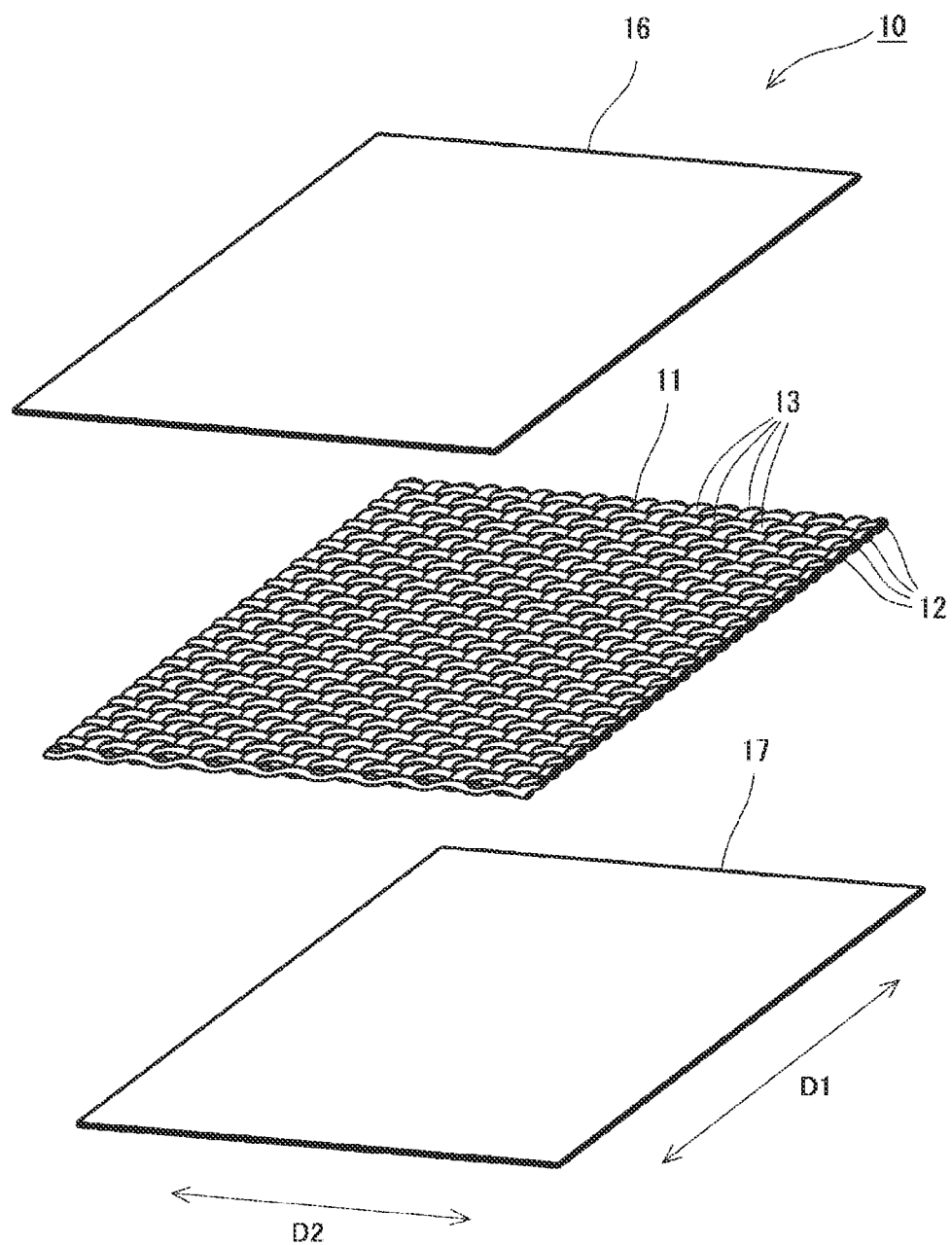
FIG. 2 is an exploded perspective view depicting a structure of the binding tape.

As shown in FIG. 2, the binding tape 10 includes an intermediate layer 11, a first surface layer 16 covering one surface of the intermediate layer 11, and a second surface layer 17 covering the other surface of the intermediate layer 11.

The intermediate layer 11 of the present embodiment consists of a plurality of linear members. Specifically, the intermediate layer 11 consists of first linear members 12 and second linear members 13.

The first linear members 12 are arranged side by side at an angle with respect to a longitudinal direction of the binding tape 10. In the present embodiment, the first linear members 12 are arranged orthogonal to the longitudinal direction D1 of the binding tape 10. In other words, the first linear members 12 extend in a width direction D2 of the binding tape 10.

The plurality of first linear members 12 is arranged side by side at predetermined intervals. An interval W1 of the first linear members 12 is preferably equal to or smaller than 5 mm (equal to or smaller than a length of a crown portion 32 of a staple 30 that is used for binding), and is more preferably equal to or smaller than 3 mm (equal to or smaller than a length of leg portions 31 of the staple 30 that is used for binding). According to this configuration, even when the binding tape 10 is stretched and extended after the staple 30 is struck for binding, the leg portions 31 of the staple 30 collide with the first linear members 12 until the binding tape is stretched by at least 5 mm (or 3 mm). Therefore, further movement of the staple 30 is hindered, so that it is possible to suppress the holes, which are formed upon fixing by the staple 30, from further expanding. A size of the expanded holes is suppressed to a range that does not exceed the length of the crown portion 32 of the staple 30 used for binding, so that it is possible to make it difficult for the staple 30 to come off.

Note that, the second linear members 13 are provided to intersect with the first linear members 12. In the present embodiment, the second linear members 13 extend in the longitudinal direction D1 of the binding tape 10. In other words, the second linear members 13 are arranged orthogonal to the width direction D2 of the binding tape 10.

In the present embodiment, the second linear members 13 are arranged side by side at predetermined intervals. An arrangement interval of the second linear members 13 is set to the same interval as the arrangement interval of the first linear members 12.

Note that, in the present embodiment, the plurality of second linear members 13 is arranged side by side. However, the present invention is not limited thereto. For example, only one second linear member may also be provided. However, when it is intended to increase the strength of the binding tape 10, it is preferably to use the plurality of second linear members 13. Furthermore, when the staple 30 is struck, at least one of the second linear members 13 is enabled to pass between the pair of leg portions 31 of the staple 30, which makes it difficult for the binding tape 10 to tear.

The first linear members 12 and the second linear members 13 are formed by bundling (twisting) a fabric material of polyester-based resin such as polyethylene terephthalate (PET). By bundling the fabric material in this way, even when the first linear members 12 and the second linear members 13 are thickened to increase the strength, a thickness of the intermediate layer 11 can be prevented from increasing. That is, since the first linear members 12 and the second linear members 13 are flattened when sandwiching the intermediate layer 11 between the first surface layer 16 and the second surface layer 17, it is possible to reduce the thickness of the binding tape 10.

Figure 3:
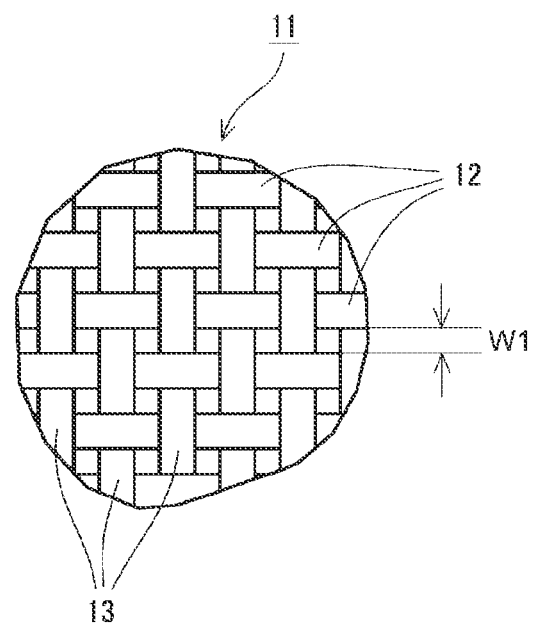
FIG. 3 is a partially enlarged view of an intermediate layer.

As shown in FIG. 3, the first linear members 12 and the second linear members 13 are alternately woven into a lattice shape, so that the sheet-shaped intermediate layer 11 is formed. The intermediate layer 11 is formed into the sheet shape, in this way, so that the intermediate layer 11 can be easily handled even before sandwiching the same between the first surface layer 16 and the second surface layer 17, and the binding tape 10 can be advantageously manufactured. Also, the first linear members 12 and the second linear members 13 are entangled with each other, so that the first linear members and the second linear members are difficult to move by friction. Therefore, the intervals of the lattices are difficult to increase and the stretching of the binding tape 10 can be effectively suppressed.

Note that, it is not necessarily required that the first linear members 12 and the second linear members 13 be alternately woven. For example, the first linear members 12 and the second linear members 13 may also be stacked in a grid shape or the first linear members 12 and the second linear members 13 may be woven every multiple linear members, instead of being alternately woven. The first linear members 12 and the second linear members 13 may also be knitted, instead of being woven. By doing so, the first linear members 12 and the second linear members 13 are difficult to loosen.

The first surface layer 16 and the second surface layer 17 are formed of a film-shaped resin material (polyvinyl chloride (PVC), polyethylene (PE) and the like) so as to exhibit a weather resistance. The intermediate layer 11 is sandwiched between the first surface layer 16 and the second surface layer 17 and the first surface layer 16 and the second surface layer 17 are bonded to each other, so that the binding tape 10 is configured.

Figure 4:
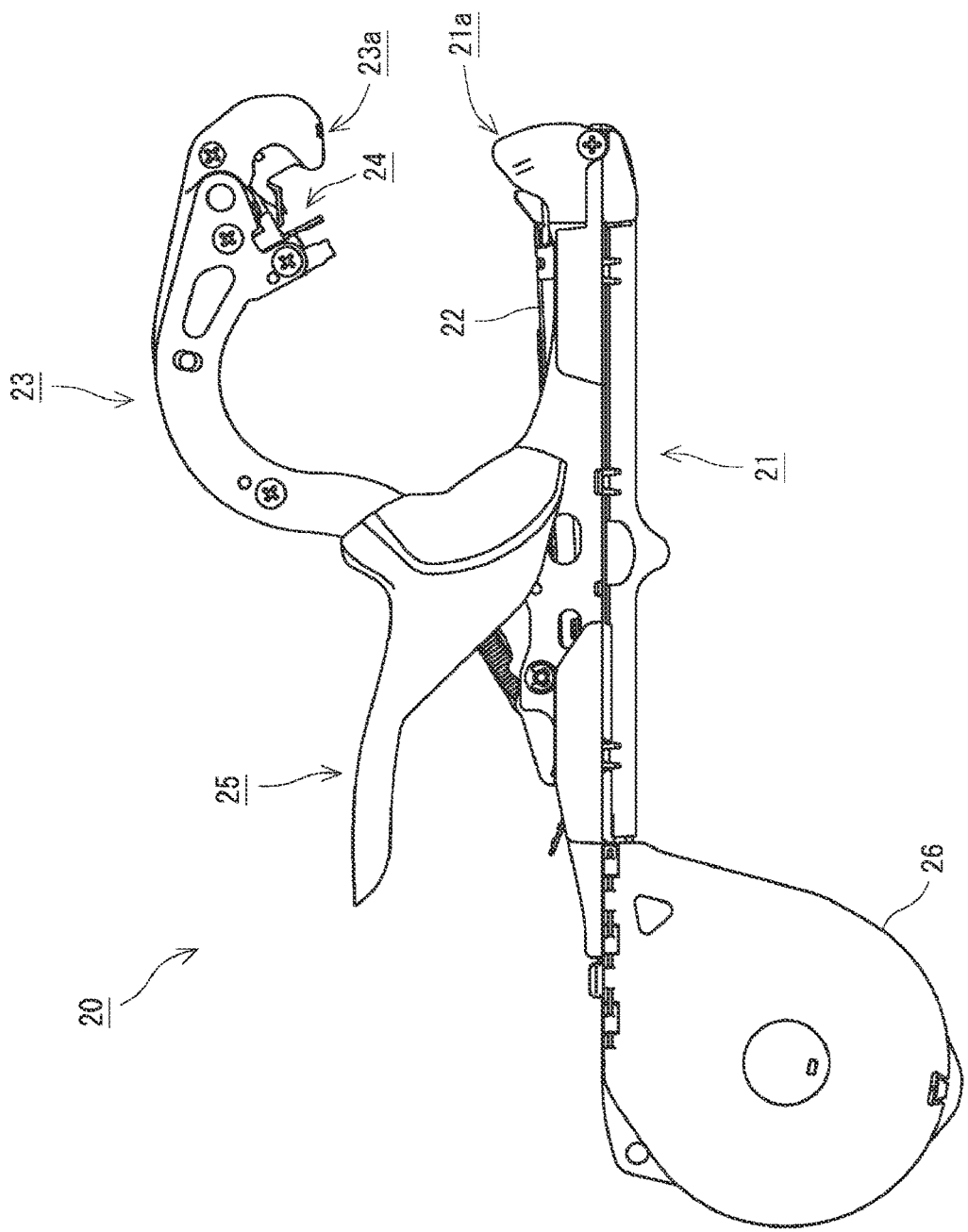
FIG. 4 is a side view of a binding machine.
Figure 5:
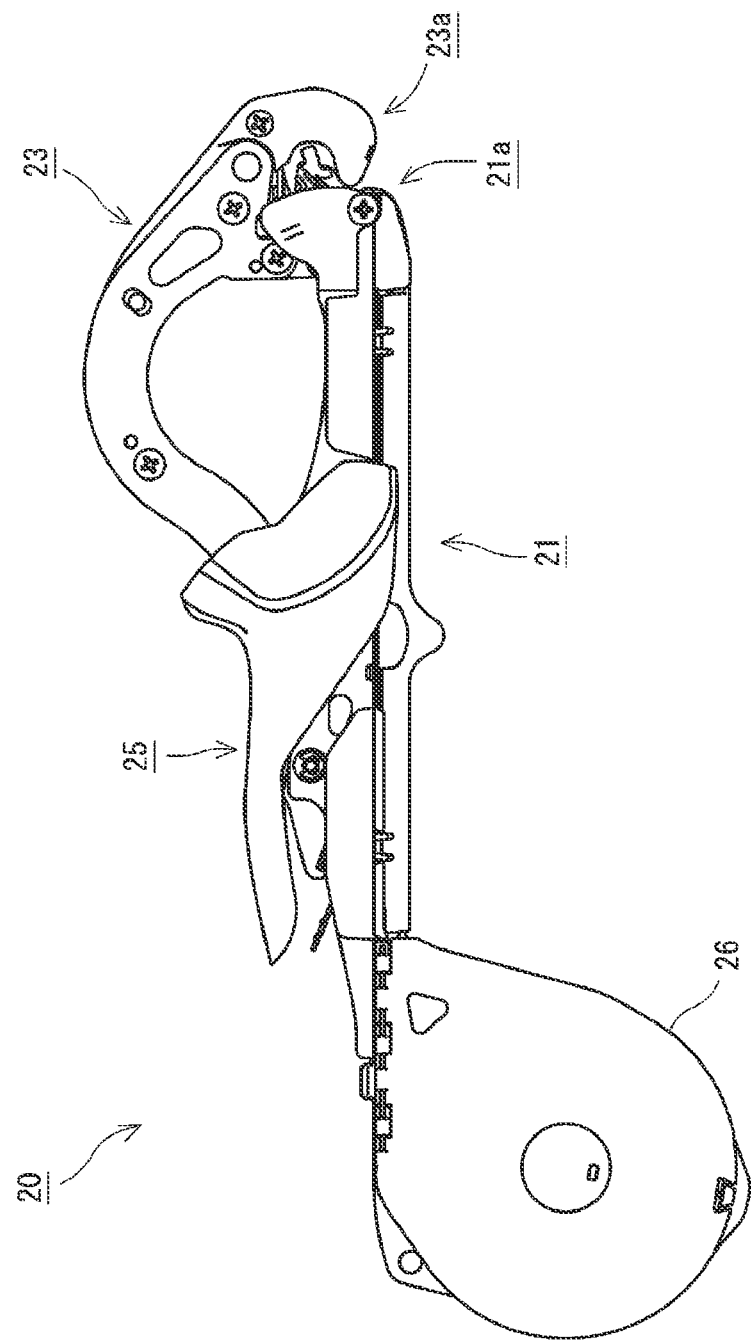
FIG. 5 is a side view of the binding machine in a state where a clincher arm is closed.

The binding tape 10 is used with a binding machine 20 as shown in FIGS. 4 and 5, for example. The binding machine 20 is similar to the well-known binding machines. That is, the binding machine 20 includes an elongated main handle 21 that is formed linear, a clincher arm 23 rotatably attached to the main handle 21, and an operating handle 25 rotatably attached to the clincher arm 23. The clincher arm 23 is urged all the time by a spring, so that it is usually opened with respect to the main handle 21, as shown in FIG. 4. When the operating handle 25 and the main handle 21 are gripped from this state, the clincher arm 23 is rotated in a closing direction with respect to the main handle 21, as shown in FIG. 5.

Note that, a rear part of the main handle 21 is provided with a tape magazine 26 for accommodating the binding tape 10. The binding tape 10 accommodated in the tape magazine 26 is pulled out to a tip end portion 21a of the main handle 21 through an inside of the main handle 21. At the tip end portion 21a of the main handle 21, a tip end of the binding tape 10 is held and set.

Figure 6A:
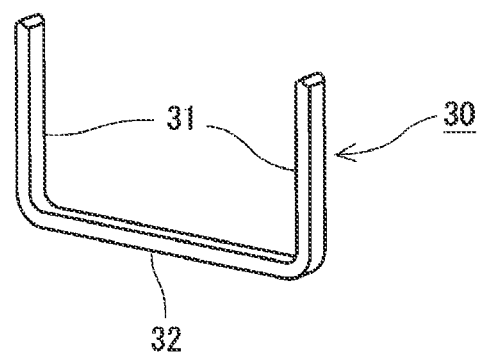
FIG. 6A is a perspective view of a staple and FIG. 6B is a front view.
Figure 6B:
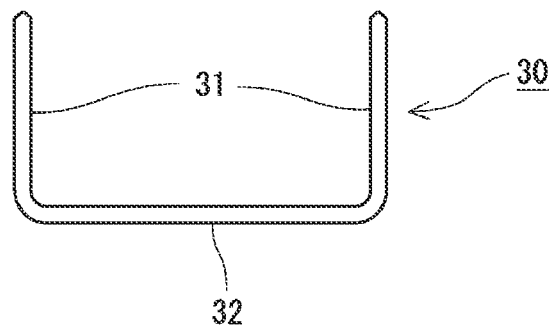

The main handle 21 is provided with a staple magazine 22 for accommodating staples 30. The staple 30 that is used in the present embodiment has a substantially U-shape, as shown in FIG. 6, and has a pair of leg portions 31 and a crown portion 32 connecting the pair of leg portions 31. As the staples 30 accommodated in the staple magazine 22, a staple where a plurality of staples 30 is bonded by an adhesive or the like is used. The staples 30 accommodated in the staple magazine 22 are sequentially sent toward the tip end, which is used so as to stitch the binding tape 10.

A staple driver (not shown) for striking out the staple 30 is provided in the vicinity of a tip end of the staple magazine 22. When the clincher arm 23 rotates to a state where it is completely closed with respect to the main handle 21, the staple driver is introduced into the staple magazine 22 to strike out the head staple 30 in the staple magazine 22. The leg portions 31 of the struck-out staple 30 are pressed and bent inwardly by a clincher (not shown) provided to a tip end portion 23a of the clincher arm 23.

The tip end portion 21a of the main handle 21 is also provided with a cutting blade (not shown) for cutting the bound binding tape 10.

The tip end portion 23a of the clincher arm 23 is also provided with a tape gripping part 24 for gripping the binding tape 10 pulled out to the tip end portion 21a of the main handle 21.

Figure 7A:
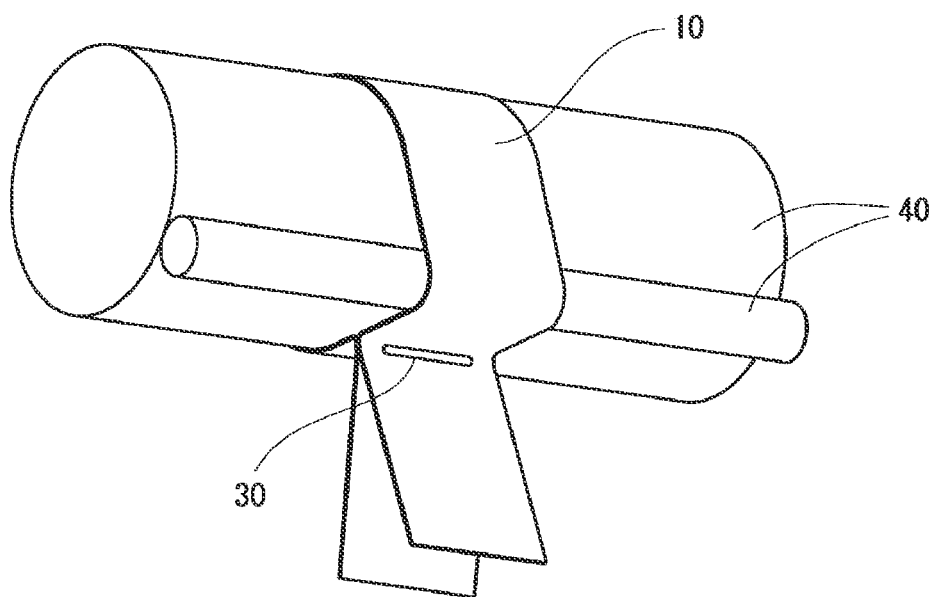
FIG. 7A is a perspective view depicting a state where a to-be-bound object is bound.
Figure 7B:
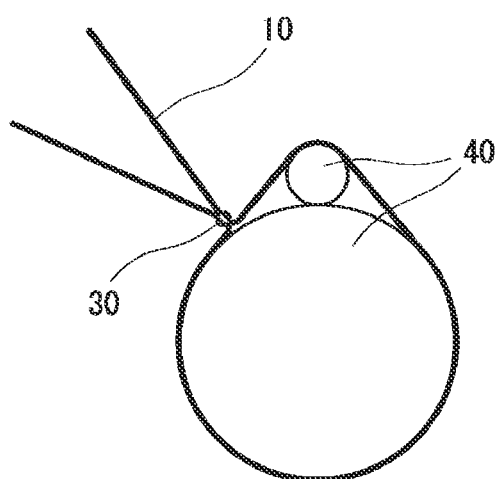
FIG. 7B is a side view.

When binding the to-be-bound object 40 with the binding machine 20, a user first grips the operating handle 25 to rotate the clincher arm 23 in the closing direction with respect to the main handle 21. Thereby, the tape gripping part 24 provided at the tip end portion 23a of the clincher arm 23 grips the binding tape 10 pulled out to the tip end portion 21a of the main handle 21. Thereafter, when the user releases the gripped state of the operating handle 25 to rotate the clincher arm 23 in the opening direction with respect to the main handle 21, the tip end portion 23a of the clincher arm 23 and the tip end portion 21a of the main handle 21 are apart from each other with the binding tape 10 being gripped, so that the binding tape 10 is stretched between the clincher arm 23 and the main handle 21. In this state, the user inserts the to-be-bound object 40 from an outside of the stretched binding tape 10, and again grips the operating handle 25 to rotate the clincher arm 23 in the closing direction with respect to the main handle 21. When the tip end portion 23a of the clincher arm 23 and the tip end portion 21a of the main handle 21 are pressed to each other by the movement, both end portions of the binding tape 10 wound on the to-be-bound object 40 are overlapped to form a tape loop for binding the to-be-bound object 40. Then, the staple 30 is struck out by the staple driver, so that the leg portions 31 of the struck-out staple 30 are struck into the vicinity of both ends of the overlapped tape loop and penetrate the same. The leg portions 31 of the staple 30 penetrating the tape loop are pressed and stitched by the clincher. Thereafter, the binding tape 10 is cut so as to cut the stitched tape loop. In this way, during the first gripping operation, the binding tape 10 is pulled out, and during the second gripping operation, the binding is performed. In this way, the binding machine 20 of the present embodiment can strike the U-shaped staple 30 into both end portions of the binding tape 10 wound on the to-be-bound object 40, thereby performing the binding as shown in FIG. 7.

Figure 8A:
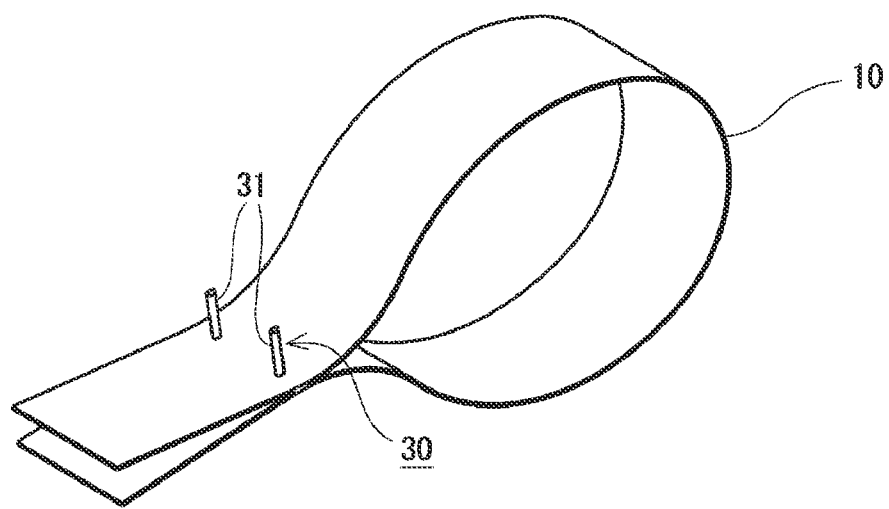
Figure 8B:
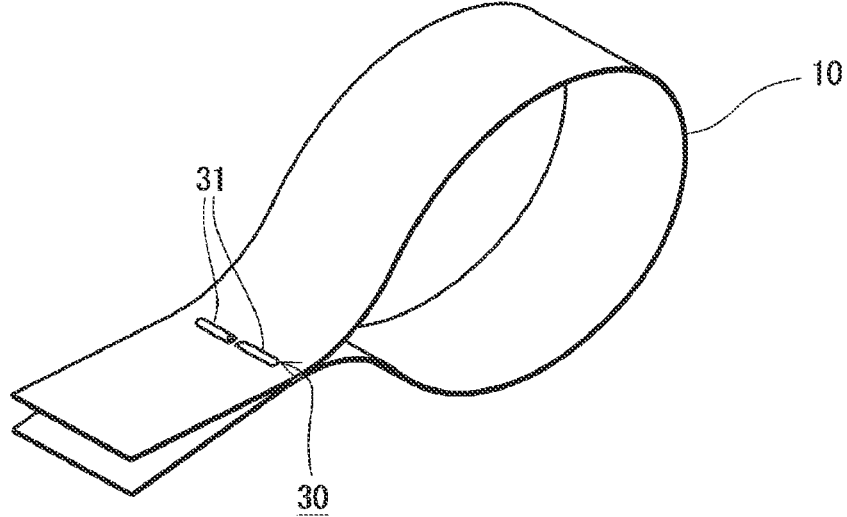
Figure 10A:
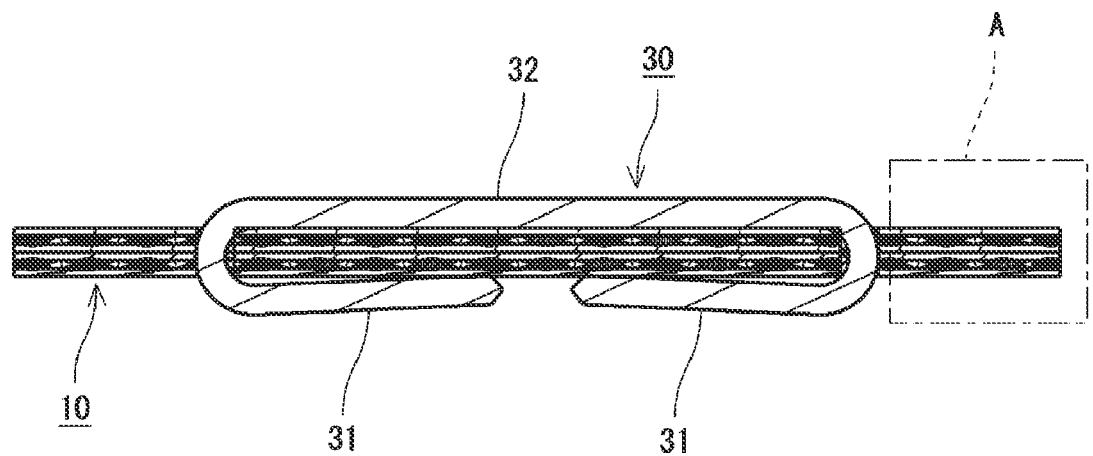
FIG. 10A is a sectional view when the tape loop is stitched by the staple.
Figure 10B:
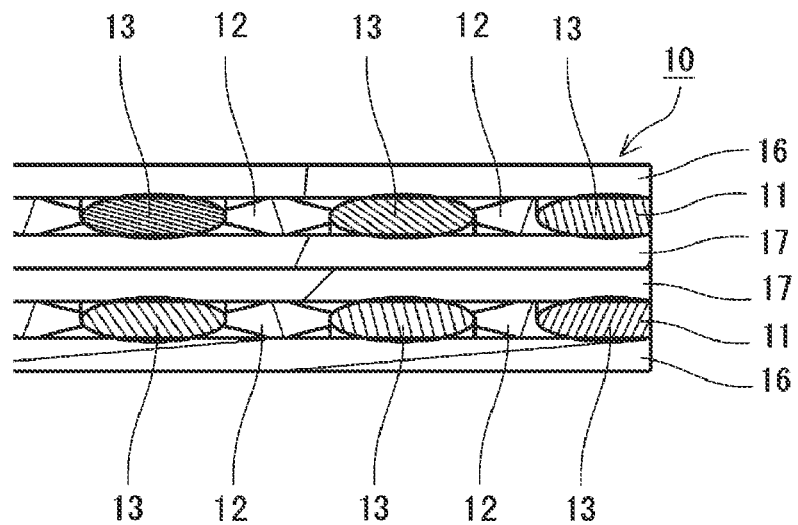
FIG. 10B is an enlarged view of an A part.

Here, when the staple 30 is struck into the binding tape 10 during the binding operation, the leg portions 31 of the staple 30 penetrate and pierce the vicinity of both end portions of the overlapped binding tape 10, as shown in FIG. 8A. Then, as shown in FIG. 8B, the leg portions 31 of the staple 30 are clinched and bent inwardly. Thereby, as shown in FIG. 10A, the overlapped binding tape 10 is sandwiched and held by the leg portions 31 and the crown portion 32 of the staple 30.

Figure 13A:
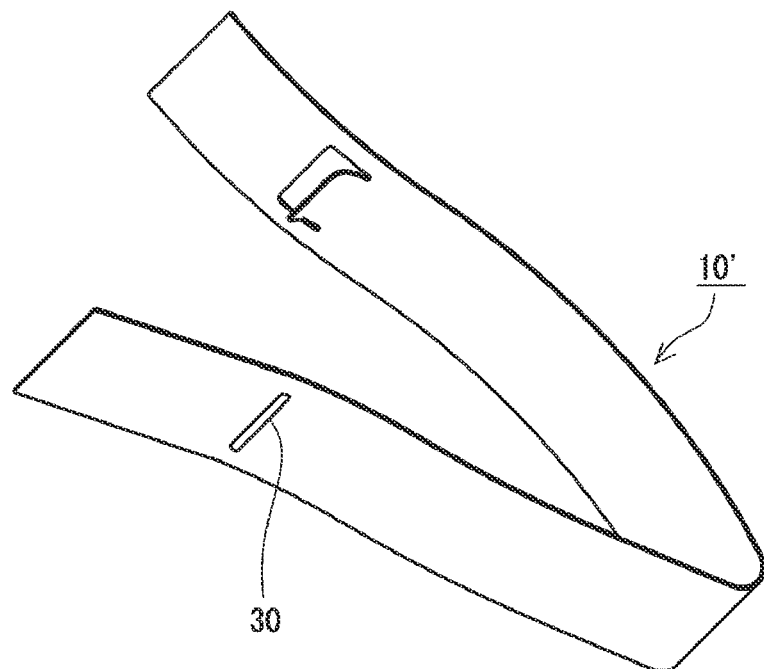
FIG. 13A is a perspective view and FIG. 13B is a front view, depicting an aspect where the binding tape is torn from holes pierced by the staple.
Figure 13B:
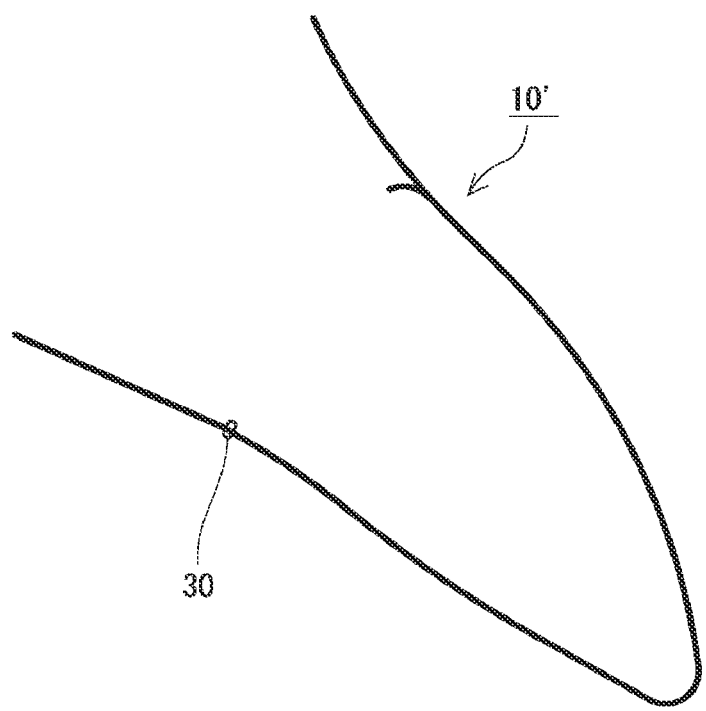

In the binding method of fixing the binding tape 10 with the staple 30 in this way, since the leg portions 31 of the staple 30 pierce the binding tape 10, it is not possible to avoid formation of holes in the binding tape 10. When the binding tape 10 is stretched, stress is concentrated on the holes formed upon fixing by the staple 30. For this reason, in a binding method of using a binding tape 10' of the conventional art, the binding tape 10' may be torn from the holes formed upon fixing by the staple 30, as shown in FIG. 13.

Figure 9A:
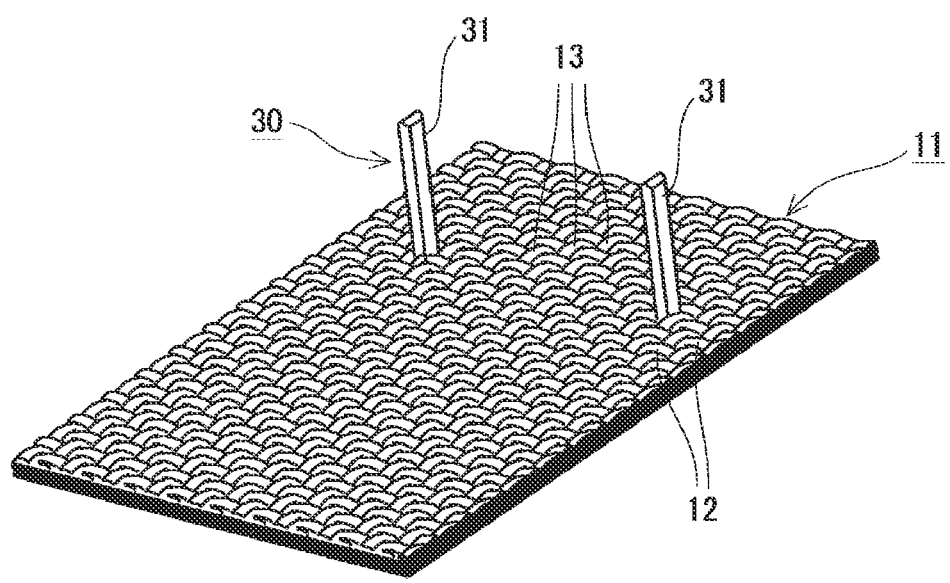
Figure 9B:
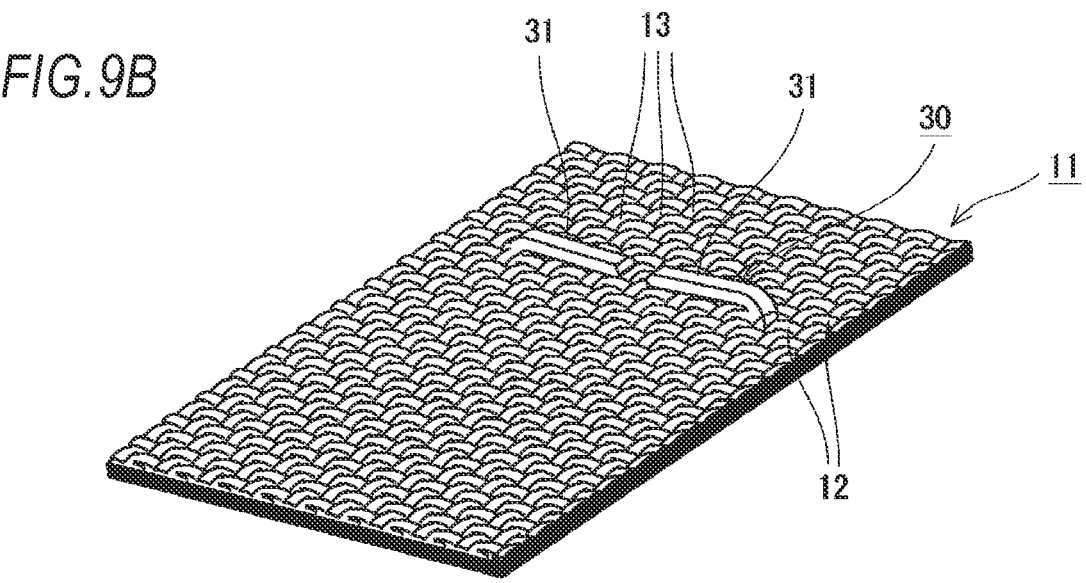

In this respect, if the binding tape 10 of the present embodiment is used, when the leg portions 31 of the staple 30 are enabled to pierce the binding tape 10, the leg portions 31 of the staple 30 penetrate between the plurality of first linear members 12, as shown in FIG. 9A. Also, at least one or more second linear members 13 are enabled to pass between the leg portions 31 of the staple 30. In this state, when the leg portions 31 of the staple 30 are clinched as shown in FIG. 9B, the leg portions 31 of the staple 30 are held in the gaps of the first linear members 12 and the second linear members 13 woven in the lattice shape.

In this bound state, even when the binding tape 10 is stretched, the leg portions 31 of the staple 30 are held by the first linear members 12, so that movement of the staple 30 is suppressed. Therefore, the holes pierced by the staple 30 are difficult to expand, so that the binding tape 10 is difficult to tear.

In addition, since the stretching of the binding tape 10 is suppressed by the first linear members 12 and the second linear members 13, the holes formed upon fixing by the staple 30 are difficult to expand. Therefore, it is possible to effectively prevent the binding tape 10 from being torn from the holes formed upon fixing by the staple 30.

As described above, according to the present embodiment, the binding tape includes the intermediate layer 11, the first surface layer 16 covering one surface of the intermediate layer 11, and the second surface layer 17 covering the other surface of the intermediate layer 11, and the intermediate layer 11 is sandwiched by the first surface layer 16 and the second surface layer 17. The intermediate layer 11 has the plurality of first linear members 12 arranged side by side at an angle with respect to the longitudinal direction D1 of the binding tape 10. According to this configuration, since the strength of the binding tape 10 is increased by the first linear members 12, even when the staple 30 is struck into the binding tape 10 and binds the same, it is possible to make it difficult for the binding tape to tear. Therefore, when the binding tape 10 is used, it is possible to perform the binding operation by using the binding machine 20 even in a guiding/binding operation for crops having a high repulsive force.

The intermediate layer 11 also has the second linear members 13 intersecting with the first linear members 12. Since the intervals of the first linear members 12 are suppressed from increasing by the second linear members 13, it is possible to suppress the binding tape 10 from being stretched. Therefore, even though the binding tape 10 is stretched after the staple 30 is struck into the binding tape 10 and binds the same, the holes pierced by the staple 30 are difficult to expand, so that it is possible to provide the binding tape 10 that is difficult to tear.

Figure 11A:
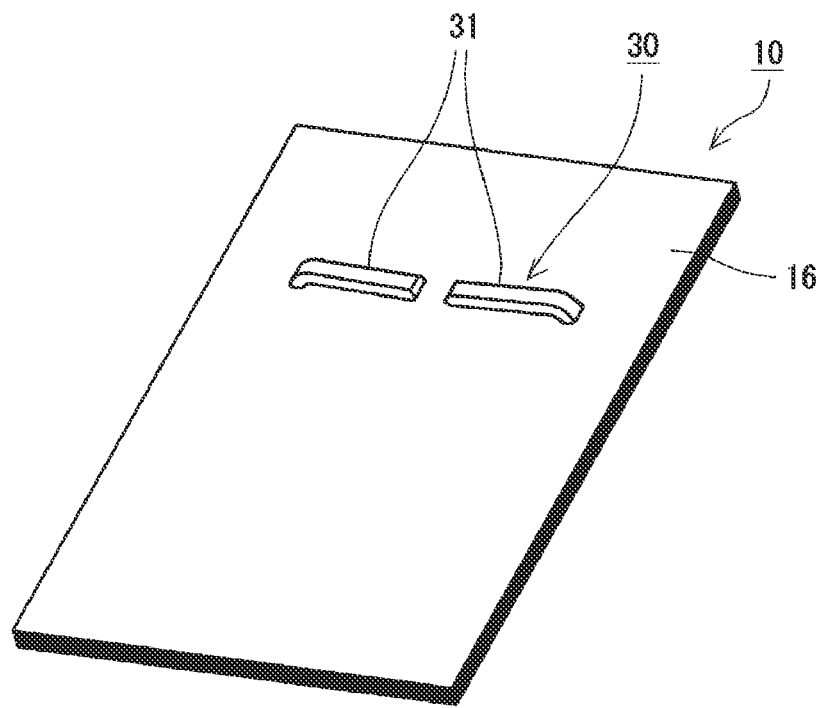
Figure 11B:
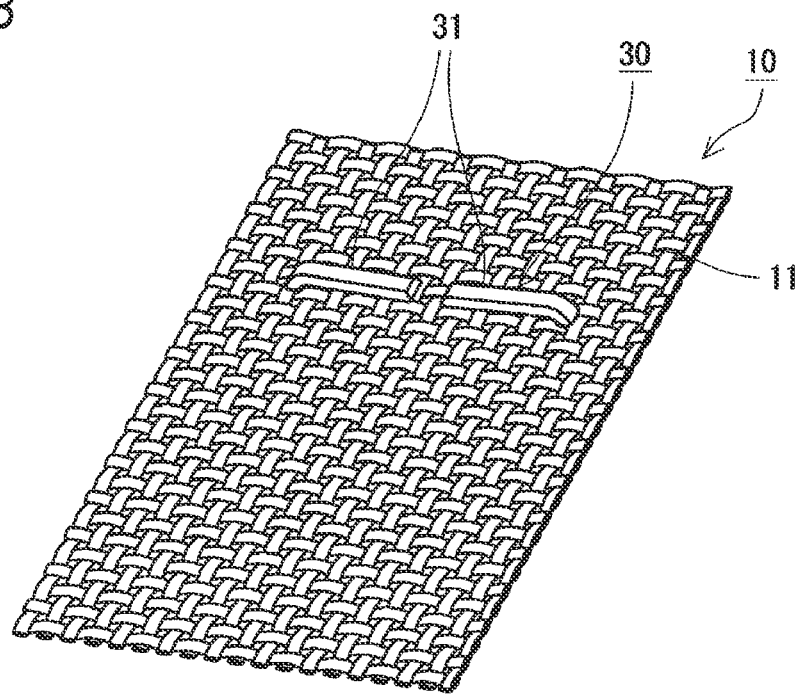

Note that, in the above-described embodiment, the first surface layer 16 and the second surface layer 17 are formed of the weather resistant material. However, the present invention is not limited thereto. For example, at least one of the first surface layer 16 and the second surface layer 17 may also be formed of a photodegradable or biodegradable material. According to this configuration, since the surface layer is not deteriorated at an initial stage of the binding, as shown in FIG. 11A, the binding strength can be secured. Note that, when the binding tape 10 after bound is left outdoors for a predetermined time period or longer, the surface layer is naturally deteriorated, as shown in FIG. 11B. If the surface layer is deteriorated and only the intermediate layer 11 is left, the gaps of the first linear members 12 and the second linear members 13 configuring the intermediate layer 11 are likely to widen, so that the staple 30 can be easily detached from the binding tape 10. For this reason, it is possible to easily remove the binding tape 10 when harvesting agricultural crops. Also, even though the detached binding tape 10 falls in the field, it can be made less noticeable because the fibers of the intermediate layer 11 simply remain. Further, if the first linear members 12 and the second linear members 13 are colored by a blackish color or a brownish color, the binding tape can be made further less noticeable when the fibers of the intermediate layer 11 fall in the field or farmland, because the color becomes a protective color.

Figure 12A:
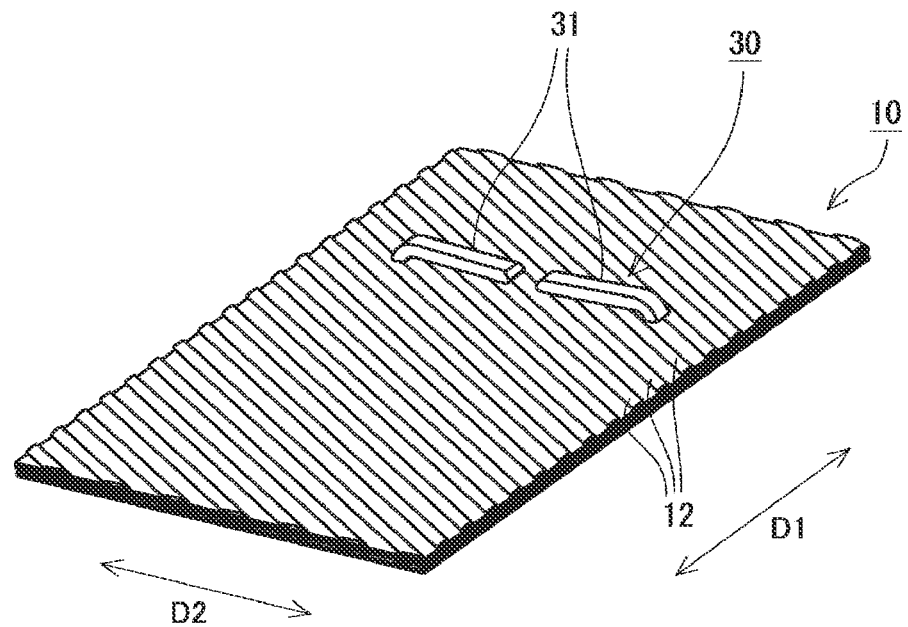

In the above-described embodiment, the intermediate layer 11 is configured by the first linear members 12 and the second linear members 13. However, the present invention is not limited thereto. For example, the intermediate layer 11 may be configured only by the first linear members 12. In this case, as shown in FIG. 12A, the first linear members 12 are preferably arranged obliquely with respect to the longitudinal direction D1 of the binding tape 10 and the width direction D2 of the binding tape 10. Note that, in FIG. 12A, the first linear members 12 are exposed but this is just for convenience of descriptions. That is, the front and back of the actual first linear members 12 (intermediate layer 11) are covered by the first surface layer 16 and the second surface layer 17 and are not thus exposed.

Figure 12B:
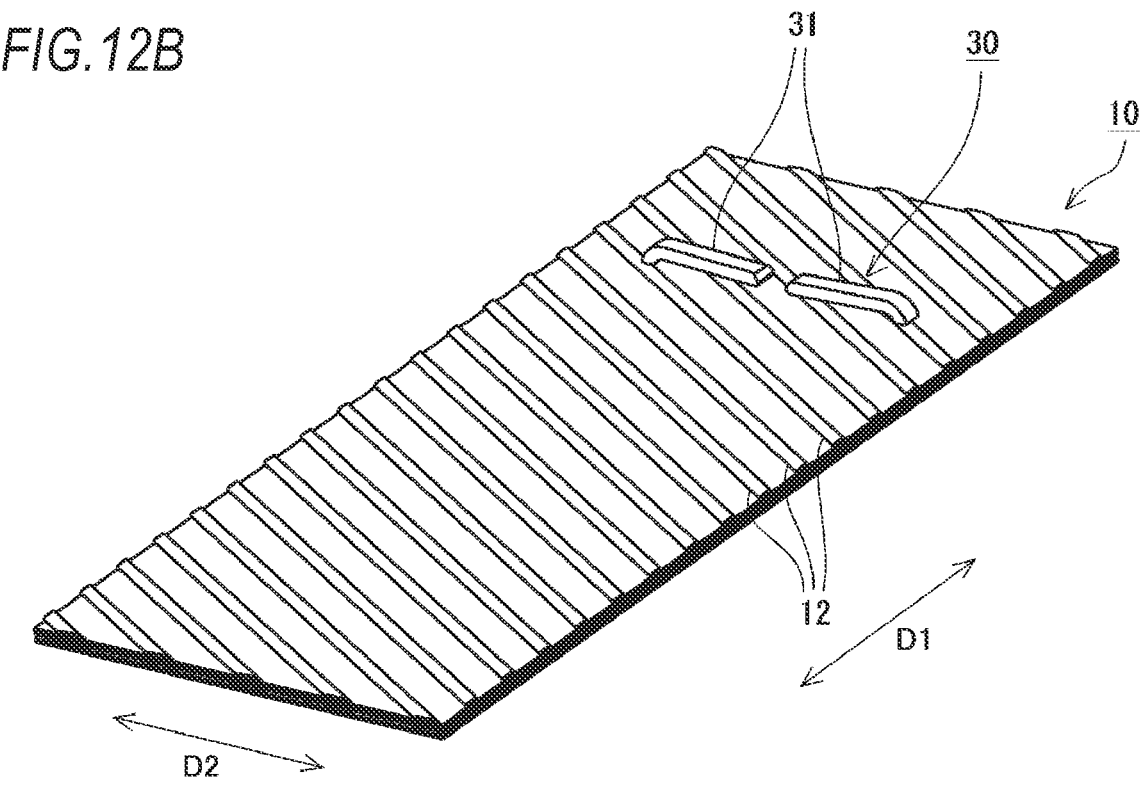

In a case where the first linear members 12 are provided obliquely in this way, the binding tape 10 can be extended within a predetermined range in the longitudinal direction D1, as shown in FIG. 12B. That is, it is possible to provide the binding tape 10 having appropriate flexibility while increasing the strength of the binding tape 10, as compared to the conventional art. The binding tape 10 may be used when it is desired to stretch the binding tape 10 according to growth of branches in agricultural crop cultivation, i.e., when it is desired not to inhibit growth of a tree while avoiding excessive restraint, for example.

The binding tape 10 may be configured by the intermediate layer 11 and the first surface layer 16 provided on one surface of the intermediate layer 11. In this case, the other surface of the intermediate layer 11 may not be provided with the second surface layer 17, and the other surface of the intermediate layer 11 may be thus exposed. Also in this configuration, the intermediate layer 11 has the plurality of first linear members 12 angled with respect to the longitudinal direction D1 of the binding tape 10. According to this configuration, since the strength of the binding tape 10 is increased by the first linear members 12, even when the staple 30 is struck into the binding tape 10 and binds the same, it is possible to make it difficult for the binding tape to tear. Therefore, when the binding tape 10 is used, it is possible to perform the binding operation by using the binding machine 20 even in a guiding operation of crops having a high repulsive force.

Note that, the first surface layer 16 may not cover one entire surface of the intermediate layer 11. For example, one surface of the intermediate layer 11 may also be exposed at one end or both ends of the intermediate layer 11 in the width direction D2.

Modified Embodiment 1

Hereinbelow, a binding tape 10A in accordance with a modified embodiment of the binding tape 10 of the first embodiment is described with reference to the drawings. Note that, the descriptions of the constitutional elements, for which it can be understood by one skilled in the art that the configurations or functions that are the same as or similar to the constitutional elements described in the first embodiment can be adopted, will be omitted or simplified.

Figure 14:
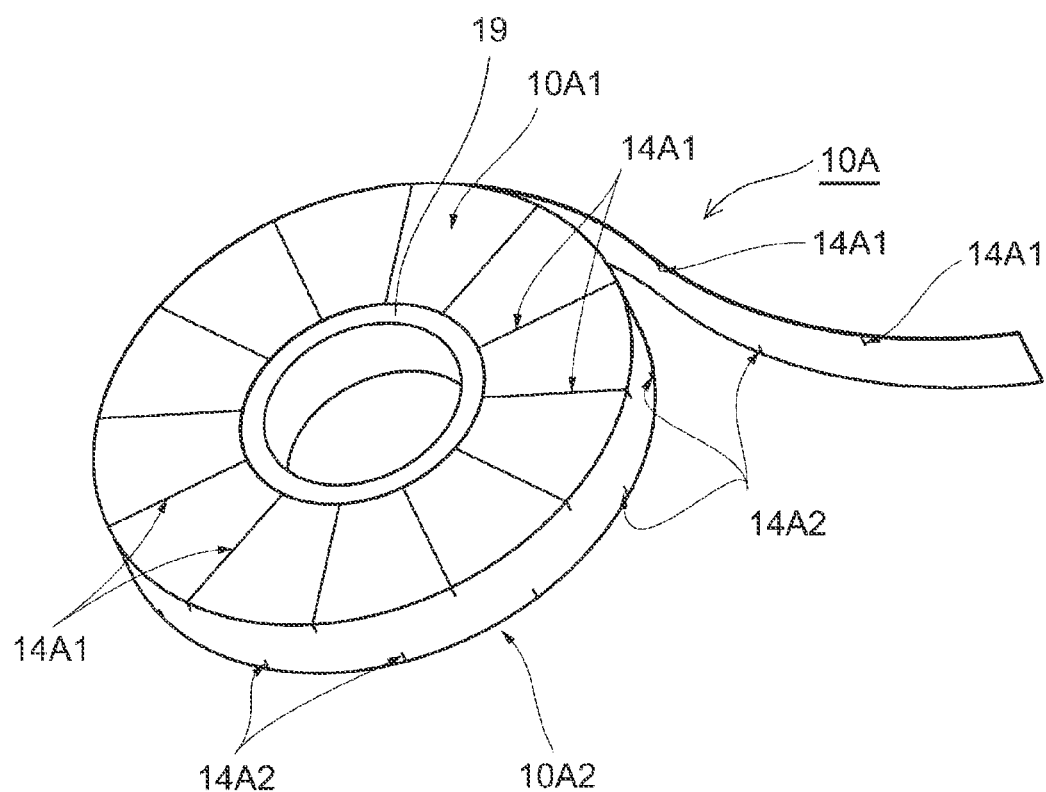
FIG. 14 is a perspective view of a binding tape 10A.

FIG. 14 is a perspective view of a binding tape 10A. As shown in FIG. 14, the binding tape 10A is wound on the winding core 19. One side surface 10A1 of the wound binding tape 10A, i.e., one end portion or edge portion of the binding tape 10A in the width direction D2 is formed with first cuts 14A1. As shown in FIG. 14, the side surface 10A1 is formed with 12 first cuts 14A1 extending from a substantial center of the winding core 19 in a radial direction and formed with rotational symmetry of 30°, for example.

Similarly, the other side surface 10A2 of the wound binding tape 10A, i.e., the other end portion or other edge portion of the binding tape 10A in the width direction D2 is formed with second cuts 14A2. The side surface 10A2 is formed with 12 second cuts 14A2 extending from the substantial center of the winding core 19 in the radial direction and formed with rotational symmetry of 30°, for example.

As shown in FIG. 14, the first cuts 14A1 and the second cuts 14A2 are formed in positions different from each other in the longitudinal direction D1 of the binding tape 10A. Specifically, the second cut 14A2 is formed in an intermediate position in the longitudinal direction D1 between the two adjacent first cuts 14A1 spaced in the longitudinal direction D1 of the binding tape 10A. Also, the first cut 14A1 is formed in an intermediate position in the longitudinal direction D1 between the two adjacent second cuts 14A2 spaced in the longitudinal direction D1 of the binding tape 10A.

Figure 15A:
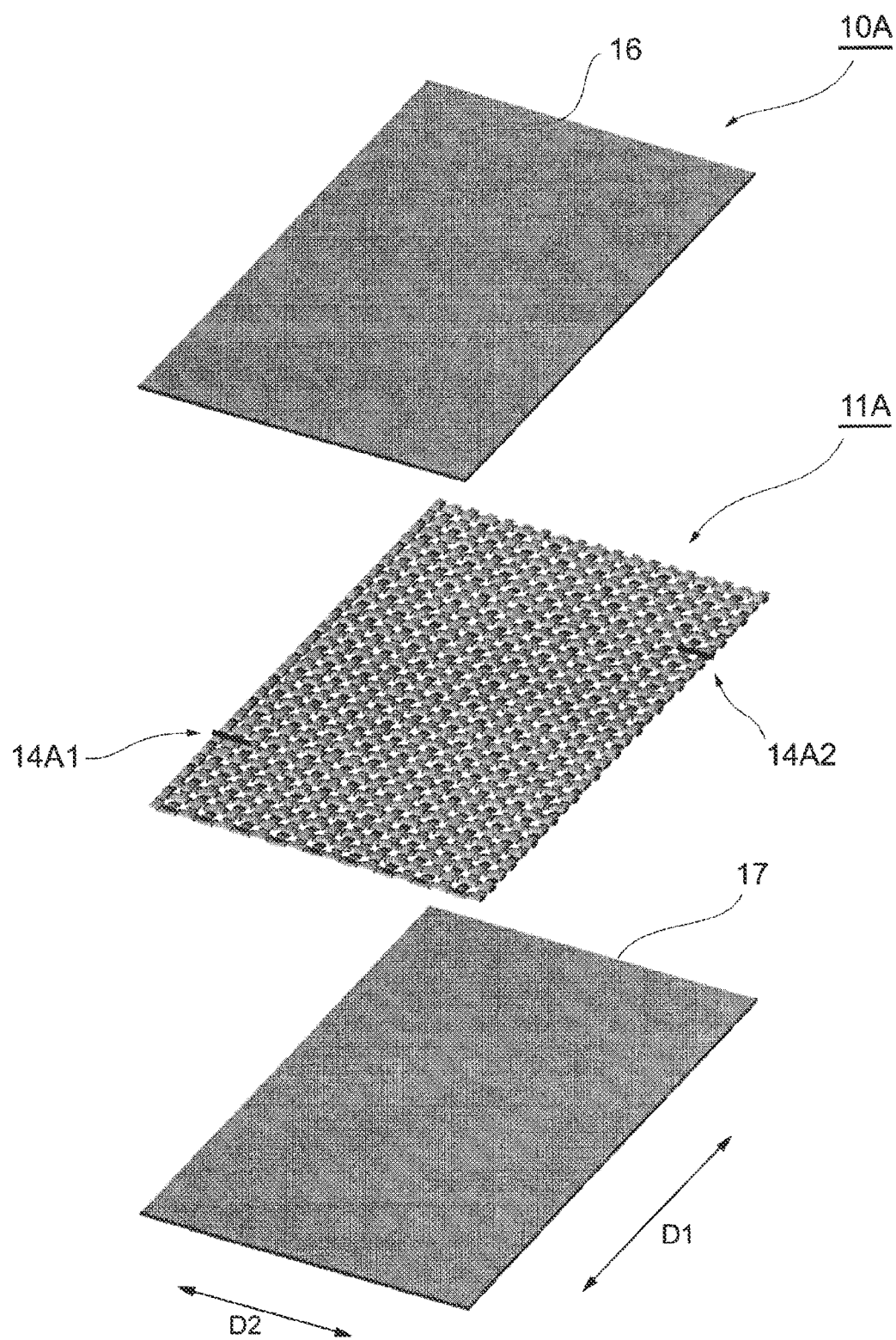
FIG. 15A is a perspective view pictorially depicting a layer structure of the binding tape 10A.

FIG. 15A is a perspective view pictorially depicting an aspect where the binding tape 10A is configured by an intermediate layer 11A, a first surface layer 16 covering one surface of the intermediate layer 11A, and a second surface layer 17 covering the other surface of the intermediate layer 11. Lengths of the first surface layer 16, the intermediate layer 11 and the second surface layer 17 in the width direction D2 are substantially the same. However, the lengths of the first surface layer 16 and the second surface layer 17 in the width direction D2 may also be larger than the length of the intermediate layer 11 in the width direction D2. On the other hand, the lengths of the first surface layer 16 and the second surface layer 17 in the width direction D2 may also be smaller than the length of the intermediate layer 11 in the width direction D2. In this case, a surface of an end portion of the intermediate layer 11 in the width direction D2 is not covered by the first surface layer 16 and the second surface layer 17 and is thus exposed.

In FIG. 15A, one end portion of the intermediate layer 11A in the width direction D2 is formed with the first cut 14A1. The other end portion of the intermediate layer 11A in the width direction D2 is also formed with the second cut 14A2. The first cut 14A1 and the second cut 14A2 are formed in different positions in the longitudinal direction D1.

Figure 15B:
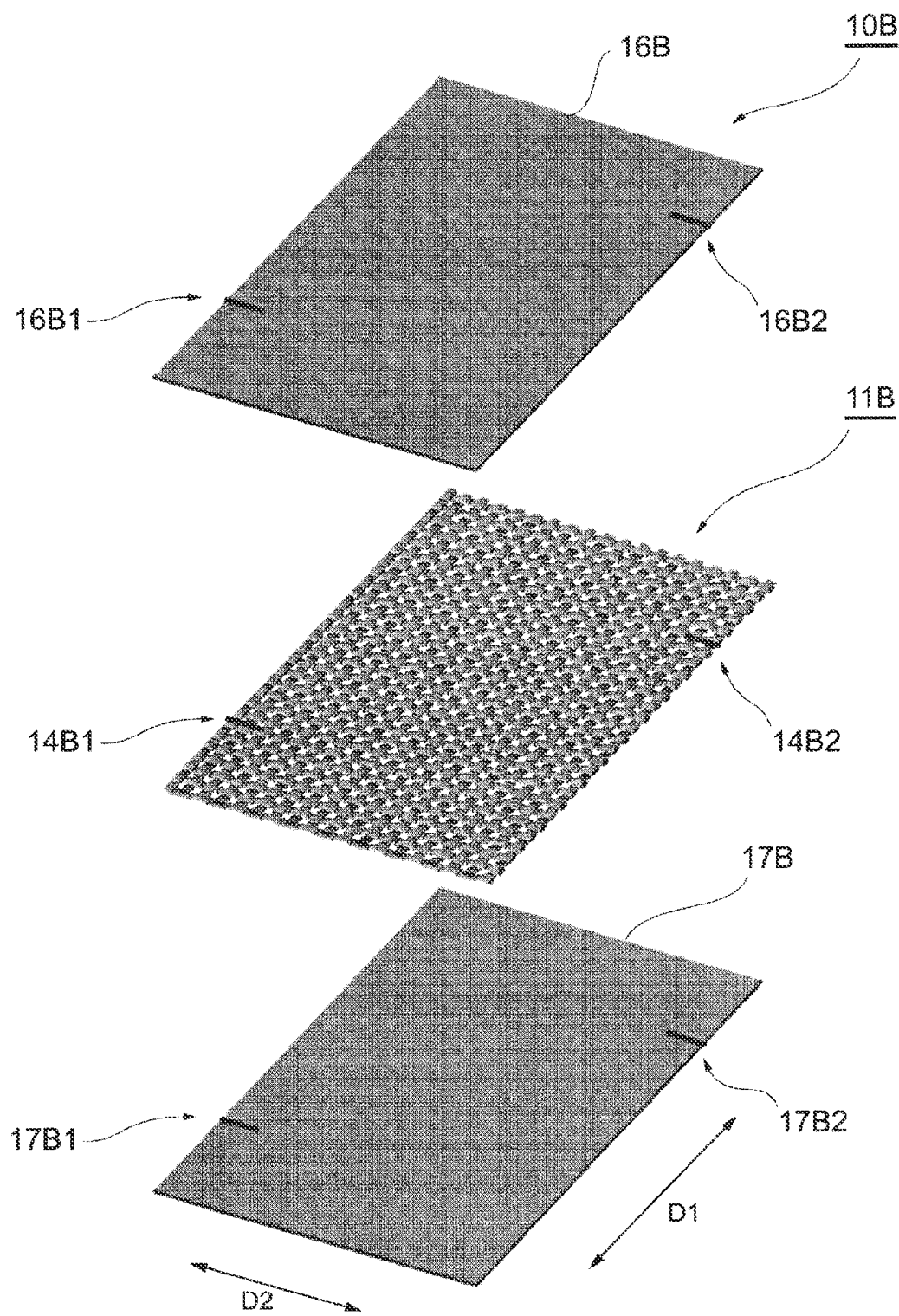
FIG. 15B is a perspective view pictorially depicting a layer structure of a binding tape 10B.

Instead of the binding tape 10A shown in FIG. 15A, the binding tape 10 of the first embodiment may also be modified, like a binding tape 10B shown in FIG. 15B.

As shown in FIG. 15B, the binding tape 10B is configured by an intermediate layer 11A, a first surface layer 16B covering one surface of the intermediate layer 11A, and a second surface layer 17B covering the other surface of the intermediate layer 11. One end portion of the intermediate layer 11B in the width direction D2 is formed with a first cut 14B1. A position of the first surface layer 16B corresponding to the first cut 14B1 is formed with a cut 16B1, and a position of the second surface layer 17B corresponding to the first cut 14B1 is formed with a cut 17B1. A position of the first surface layer 16B corresponding to a second cut 14B2 is formed with a cut 16B2, and a position of the second surface layer 17B corresponding to the second cut 14B2 is formed with a cut 17B2. However, either the first surface layer 16B or the second surface layer 17B may not be formed with the cut.

The binding tape 10A and the binding tape 10B may be used so as to bind the to-be-bound object with being mounted to the binding machine 20 as shown in FIGS. 4 and 5.

Figure 16A:
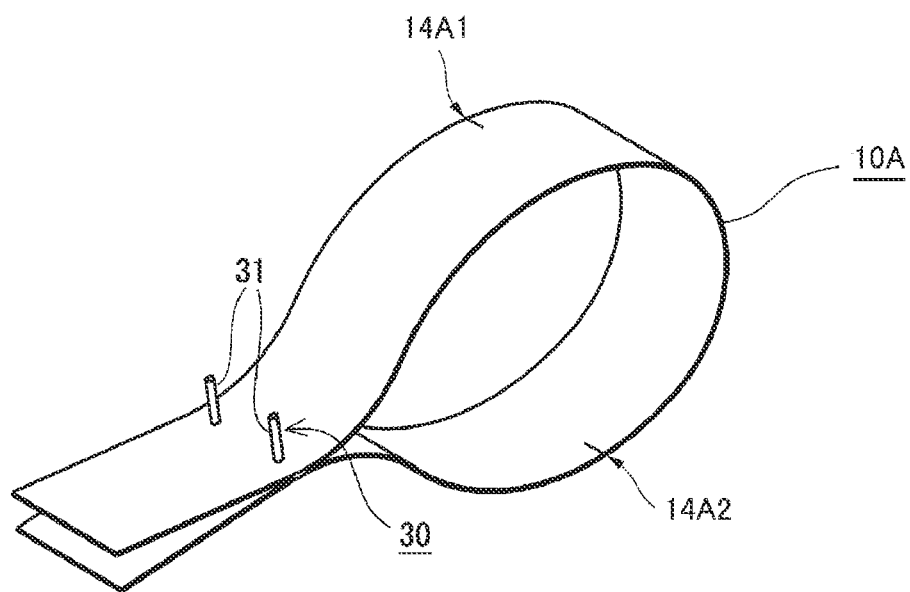
FIG. 16A is a perspective view pictorially depicting an aspect where a staple 30 is struck so as to bind a to-be-bound object by using the binding tape 10B.
Figure 16B:
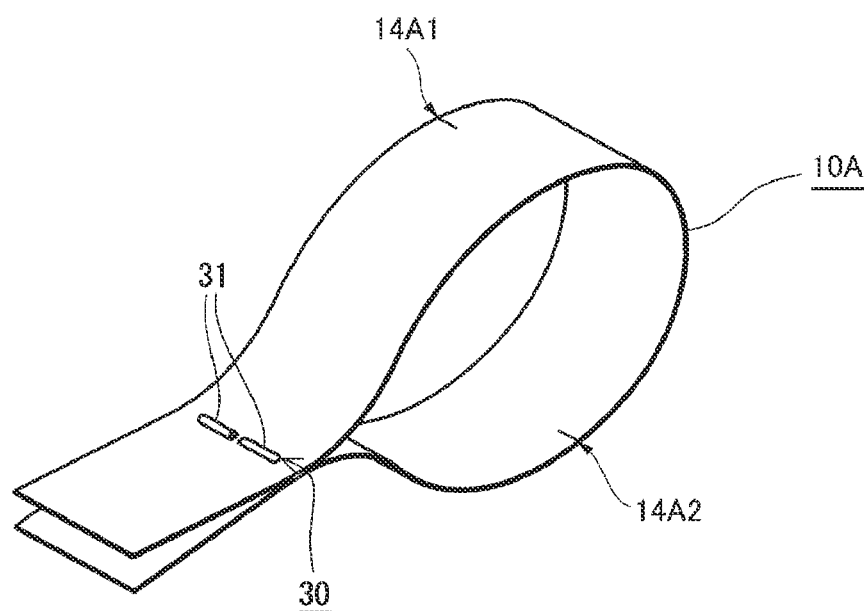
FIG. 16B is a perspective view pictorially depicting an aspect where the staple 30 is clinched so as to bind the to-be-bound object by using the binding tape 10B.

FIGS. 16A and 16B are pictorial views depicting an aspect where the staple 30 is struck into the binding tape 10B mounted to the binding machine 20 so as to bind a to-be-bound object (not shown). Note that, the staple 30 has the same structure as that shown in FIG. 6. Specifically, the staple 30 has a crown portion 32 extending in a first direction, a first leg portion 31 connecting to the crown portion 32 at one end portion of the crown portion 32 in the first direction and extending in a second direction intersecting with the first direction, and a second leg portion 31 connecting to the crown portion 32 at the other end portion of the crown portion 32 in the first direction and extending in a third direction (which may be the same as the second direction) intersecting with the first direction. One ends of the two leg portions 31 may be free ends. The connection portions between the crown portion 32 and the leg portions 31 may be rounded, as shown in FIG. 6. The staple 30 may also be shown as a rectangular U-shape.

When the staple 30 is struck into the binding tape 10B, the leg portions 31 of the staple 30 penetrate the overlapped binding tape 10B, as shown in FIG. 16A. Then, as shown in FIG. 16B, the leg portions 31 of the staple 30 are clinched and bent inwardly. Thereby, the overlapped binding tape 10B is sandwiched and held by the leg portions 31 and the crown portion 32 of the staple 30. At this time, at least one bundle of the first linear members 12 and the second linear members 13 are sandwiched between the leg portions 31 and the crown portion 32. Also, one side surface of the binding tape 10B in the width direction D2 is formed with the first cut 14A1, and the other side surface is formed with the second cut 14A2. For this reason, as shown in FIG. 16, one end portion of a tape loop, which is formed as a result of the stitching by the staple 30, of the binding tape 10B in the width direction D2 is formed with the first cut 14A1, and the other end portion in the width direction D2 is formed with the second cut 14A2.

In this state, even though the binding tape 10B is stretched, the leg portions 31 of the staple 30 are caught by at least one of the first linear members 12 and the second linear members 13, so that movement of the staple 30 is suppressed. For this reason, the through-holes formed as the staple 30 penetrates the binding tape 10B are difficult to expand, so that it is possible to suppress the binding tape 10 from being torn.

In the below, the technical meanings of the first cut 14A1 or the second cut 14A2 are described.

As described above, the tip end portion 21a of the main handle 21 of the binding machine 20 is provided with the cutting blade (not shown) for cutting the wound binding tape 10B. After the tape loop for binding the to-be-bound object 40 is formed, the staple 30 is struck out to stitch the binding tape 10B by the staple driver. Then, the binding tape 10 is cut so as to cut the stitched tape loop by using the tip end portion 21a of the main handle 21.

The present inventors noticed that the second linear member 13, which is provided at the end portion in the width direction D2, of the plurality of second linear members 13 arranged side by side in the width direction D2 may not be cut. For example, in a case where the cutting blade for cutting the binding tape 10B is formed by a plurality of periodically formed blades such as saw teeth, the present inventors noticed that a sufficient force is not applied from the blade to the second linear member 13 existing on an outermore side in the width direction D2 than the blade at the end portion in the width direction D2, so that the second linear member 13 at the end portion in the width direction D2 may not be cut. Since the second linear members 13 are connected to the binding tape 10B that is mounted to the binding machine 20, the user of the binding machine 20 should separately cut the second linear member 13 that could not be originally cut.

However, the end portion of the intermediate layer 11B of the binding tape 10B in the width direction D2 is formed with the plurality of first cuts 14B1. For this reason, at least a portion of the second linear member 13 provided at one end portion in the width direction D2 is cut in advance by the first cuts 14B1. For this reason, the second linear members 13 that are not originally cut by the cutting blade of the binding machine 20 can be easily cut. Note that, the second linear members 13 provided at one end portion in the width direction D2 may not be completely cut by the first cuts 14B1. For example, at least a portion of the second linear members 13 provided at one end portion in the width direction D2 is cut by the first cuts 14B1, so that the second linear members can be more easily cut by the pulling resulting from the cutting with the binding machine 20 or by other means such as light pulling with a hand, as compared to the conventional art. 60% or more of a length of at least one second linear member 13 in the width direction D2 is preferably cut by the first cut 14B1.

Note that, in a case where the single second linear member 13 is formed by bundling a plurality of fabric materials (for example, a plurality of polyester fibers), a half or more of the length (for example, 0.5 mm) of the second linear member 13 in the width direction D2 is preferably cut by the first cut 14B1. 60% or more of the length of the second linear member 13 in the width direction D2 is more preferably cut by the first cut 14B1. In the meantime, in a case where the side surface of the wound binding tape 10B is uneven, depths of slits, which are to be the first cuts 14B1 formed by pressing the blade into the side surface of the binding tape 10B, may also be uneven. If a length of the first cut 14B1 in the width direction D2 is made large, the binding tape 10B is extended in the longitudinal direction D1, so that the cutting for the binding tape 10B may be disturbed. Therefore, a length of at least one first cut 14B1 in the width direction D1 with respect to a width of the binding tape 10B is preferably 15% or less.

Similarly, at least a portion of the second linear members 13 provided at the other end portion in the width direction D2 is cut in advance by the second cuts 14B2. For this reason, it is possible to easily cut the second linear members 13 provided at the other end portion in the width direction D2, in a similar manner.

As described above, since one end of the intermediate layer of the binding tape in the width direction is provided with the plurality of cuts spaced in the longitudinal direction of the binding tape, it is possible to reduce a malfunction that may be caused when the second linear members are not cut.

Note that, the binding tape is not necessarily required to have both the first cuts and the second cuts. For example, only one end-side of the binding tape in the width direction may be formed with the first cuts.

In a case where both ends of the intermediate layer of the binding tape in the width direction are provided with the plurality of cuts spaced in the longitudinal direction of the binding tape, positions in the longitudinal direction in which the plurality of cuts is formed at one end portion and positions in the longitudinal direction in which the plurality of cuts is formed at the other end portion are preferably asymmetrical to each other with respect to a line passing through a center of the binding tape in the width direction. According to this configuration, it is possible to suppress the tensile strength of the binding tape from being lowered.

The number, shape and length of the cuts may also be changed as appropriate. In the present modified embodiment, the cuts are radially formed, as seen from a side surface. However, the present invention is not limited to the present modified embodiment. For example, the side surface of the wound binding tape may also be formed with cuts in a lattice shape, as seen from a side surface.

Second Embodiment

Figure 17A:
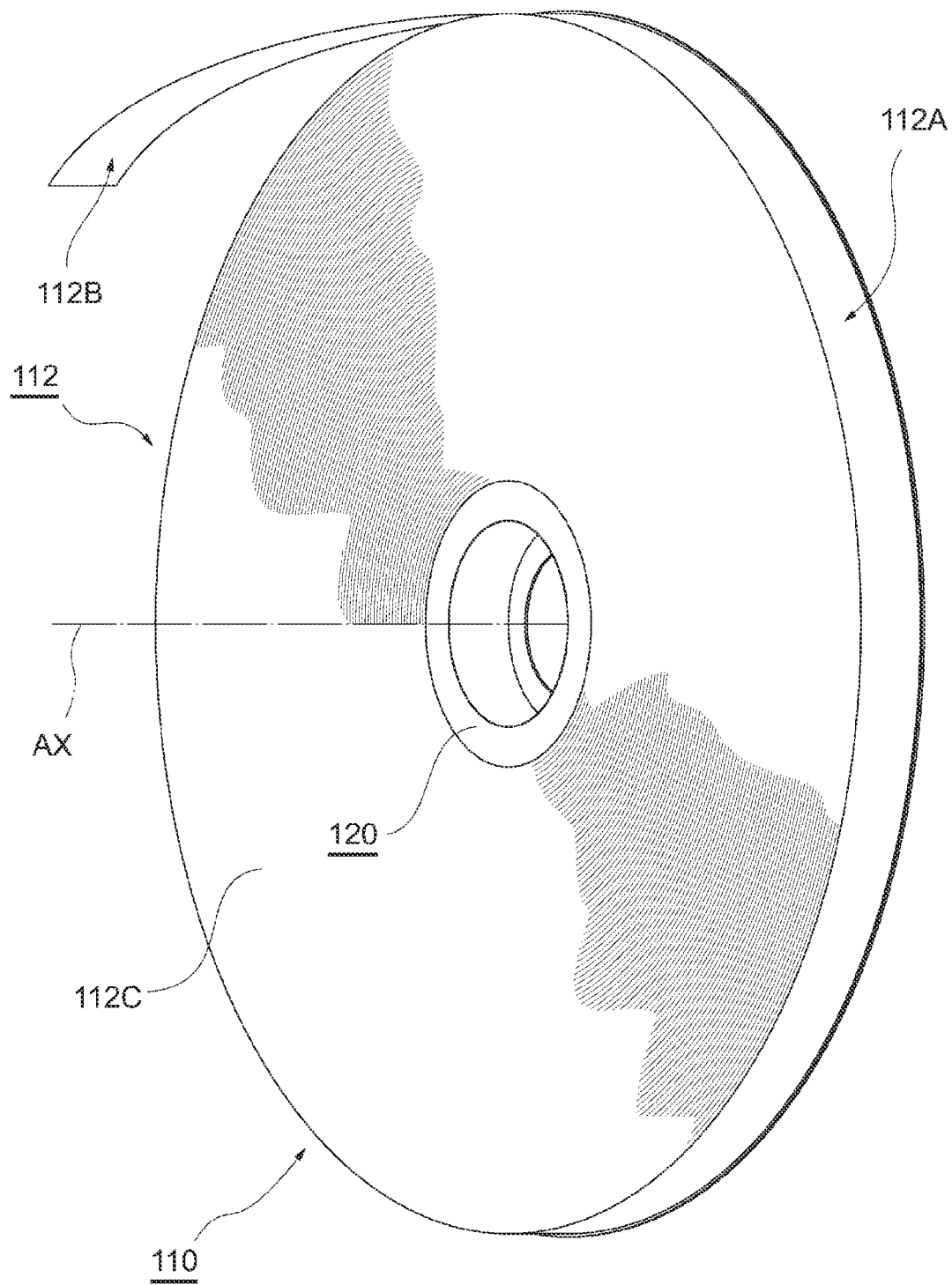
FIG. 17A is a perspective view of a tape winding body 110, as seen from the left.
Figure 17B:
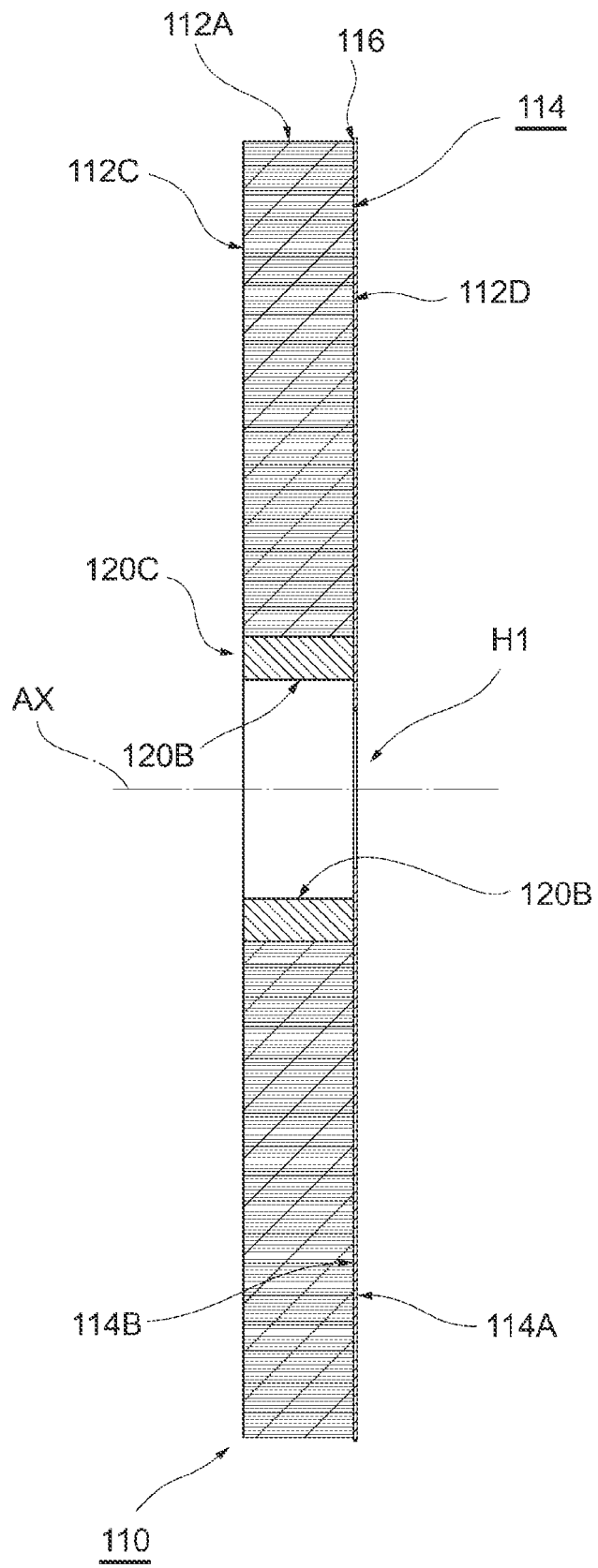
FIG. 17B is a sectional view of the tape winding body 110, including a central axis AX.
Figure 17C:
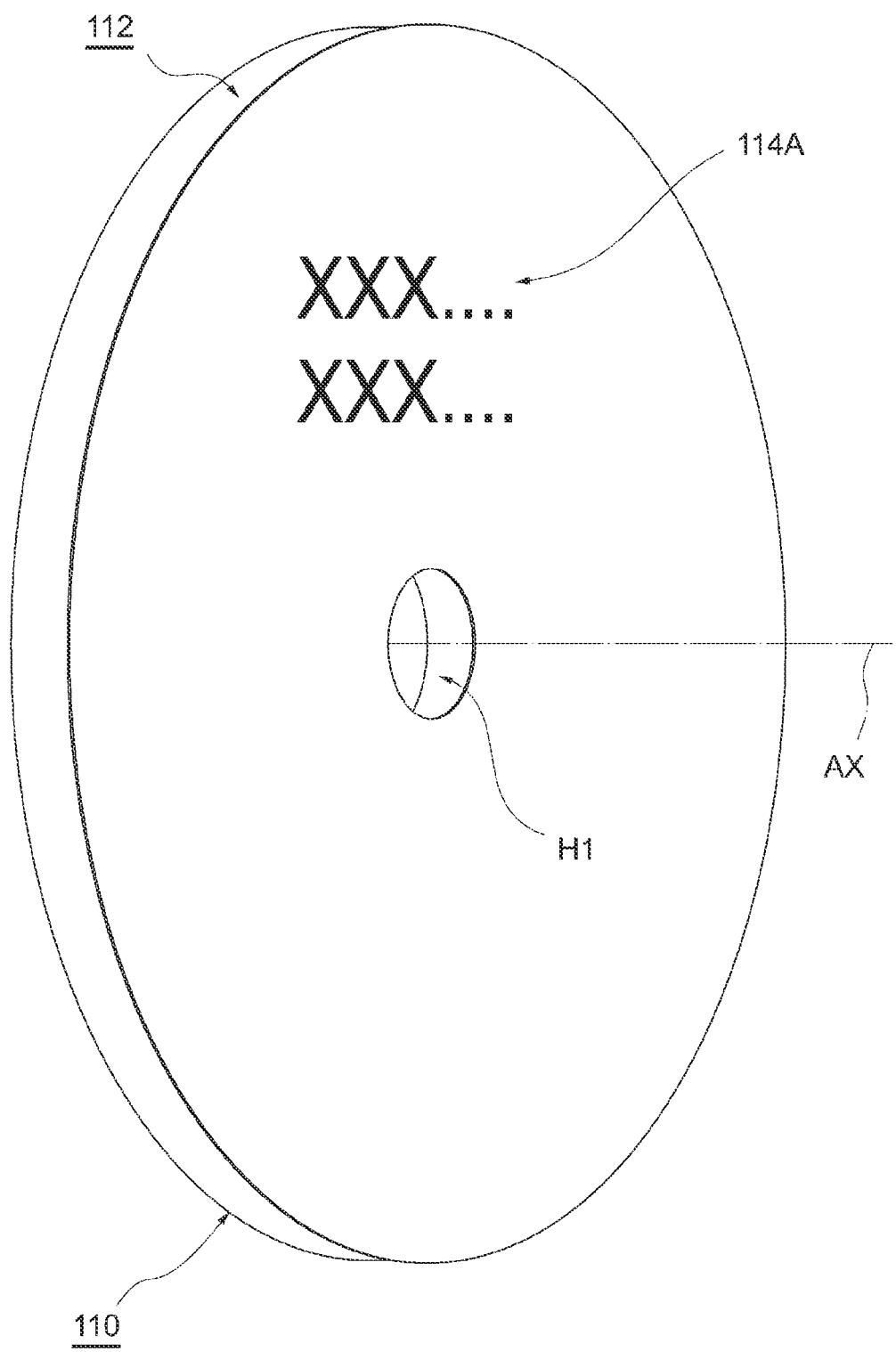
FIG. 17C is a perspective view of the tape winding body 110, as seen from the right.
Figure 17D:
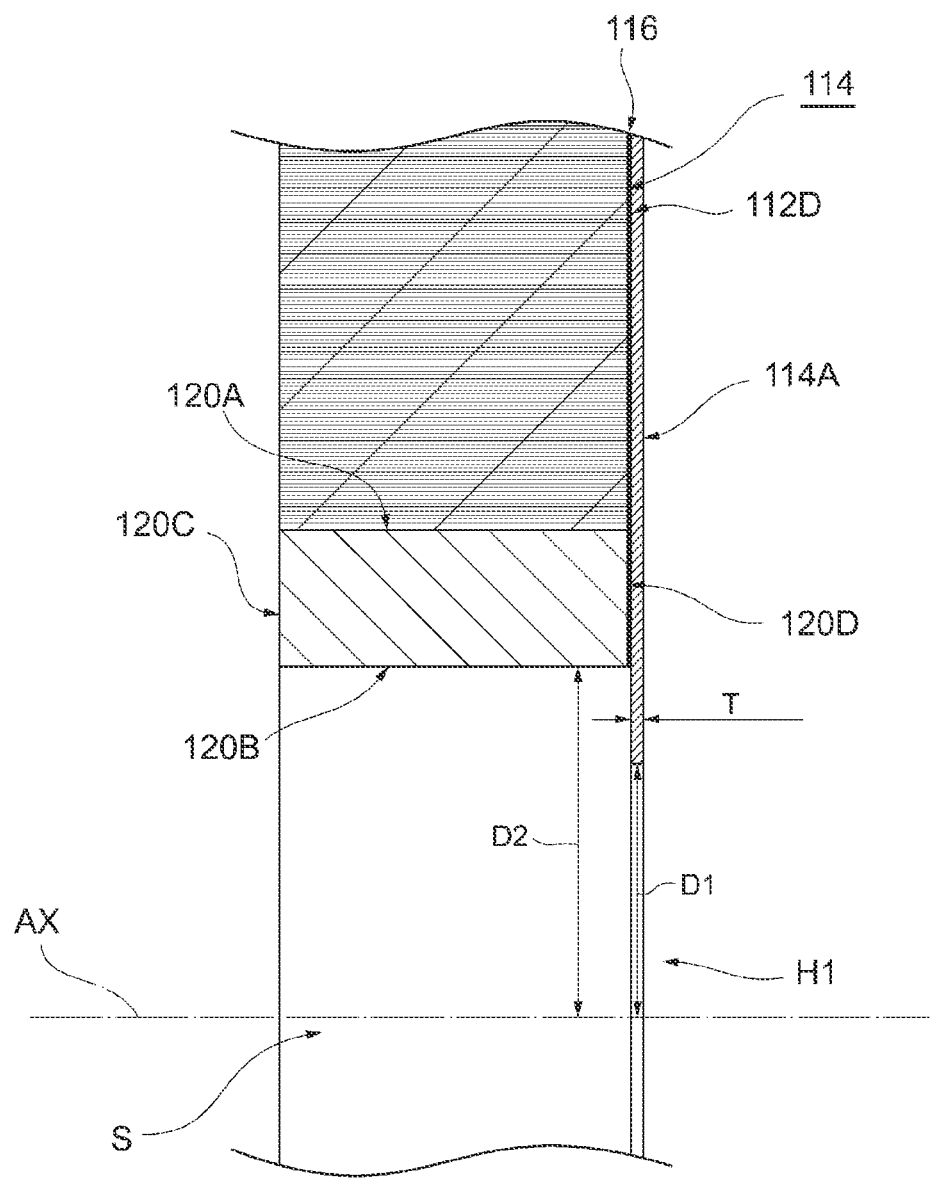
FIG. 17D is a partially enlarged view in the vicinity of the central axis AX shown in FIG. 1B.

FIG. 17A is a perspective view of a tape winding body 110 in accordance with a second embodiment, as seen from the left. FIGS. 17B, 17C and 17D are a sectional view including a central axis AX of the tape winding body 110, a perspective view, as seen from the right, and a partially enlarged view in the vicinity of the central axis AX, respectively. Note that, FIG. 17A depicts an aspect where a binding tape 112 is a little pulled out and an end portion of the binding tape 112 on an outer periphery-side is loosened.

As shown in FIG. 17, the tape winding body 110 includes a cylindrical tube member 120, a binding tape 112 wound on an outer peripheral surface of the tube member 120, a film 114 (an example of the "first member") provided to face one side surface 112D of a side surface 112C and a side surface 112D of the wound binding tape 112, and an adhesive layer 116 provided between the film 114 and the side surface 112D so as to bond the film 114 and the side surface 112D.

The tube member 120 is formed to have a hollow cylindrical shape whose center is the central axis AX, and has an inner wall surface 120B as an example of the inner wall whose at least a part includes a cylindrical surface having a radius D2 (FIG. 17D) centered on the central axis AX, an outer peripheral surface 120A whose at least a part includes a cylindrical surface having a radius larger than the radius D2 and centered on the central axis AX, and one end face 120D facing toward a direction of the central axis AX and an end face 120C facing toward an opposite direction to the end face 120D, which connect the inner wall surface 120B and the outer peripheral surface 120A. The tube member 120 is a winding core for winding the binding tape 112, and may be a paper tube formed to have a tube shape by paper board or may also be formed of plastic such as resin.

The binding tape 112 is a tape for binding two or more to-be-bound objects, for example. The binding tape is configured so that an inner peripheral surface 112B (FIG. 17A), which faces inwardly when wound, and an outer peripheral surface 112A, which faces the inner peripheral surface 112B outwardly when bound, do not adhere to each other so as to prevent the tape firmly adhering to the to-be-bound objects to disturb binding when it is intended to bind the to-be-bound objects by a hand. For example, each surface of the outer peripheral surface 112A and the inner peripheral surface 112B is formed of a non-adhesive material on which an adhesive is not applied, so that the binding tape 112 can be implemented.

The binding tape 112 has one surface becoming the outer peripheral surface 112A, the other surface becoming the inner peripheral surface 112B, and side surfaces connecting the surfaces. The binding tape 112 has one side surface 112D facing the direction of the central axis AX and a side surface 112C facing toward an opposite direction to the side surface 112D when wound on the outer peripheral surface 120A of the tube member 120 with the central axis AX of the tube member 120 as a winding axis. In the present embodiment, a width of the binding tape 112 and a length of the tube member 120 in the direction of the central axis AX are formed to be substantially the same. For this reason, when the binding tape 112 is wound, the end face 120D of the tube member 120 and the side surface 112D of the binding tape 112 are substantially flush with each other, and the end face 120C and the side surface 112C are substantially flush with each other.

The film 114 is a substantially circular film body having a surface facing the end face 120D of the tube member 120 and the side surface 112D of the binding tape 112 and arranged to be substantially concentric with the central axis AX. A central part of the film 114 is formed with a circular hole H1 substantially concentric with the central axis AX. For this reason, the hole H1 communicates with a region S surrounded by the inner wall surface 120B of the tube member 120. The film 114 may be formed of, for example, fiber such as paper or plastic. Also, the film may have a configuration where fiber and plastic are stacked. Note that, the part communicating with the region S surrounded by the inner wall surface 120B of the tube member 120 is not limited to the hole H1 formed in the film 114. For example, the film 114 may be formed to have a substantial C-shape, and the communicating part may be formed in a notched shape having an opening part. When the film 114 is formed of a material having water resistance and ductility, for example, a material such as resin and rubber or synthetic paper in which a resin material and a pulp material are mixed, the film can be favorably used even though the tape winding body 110 is used in environments exposed to wind and rain, such as an environment where it is used outdoors.

As shown in FIG. 17B, a radius of the film 114 is set so as to be larger than a radius of the wound binding tape 112 in an unused state. Also, as shown in FIG. 17D, a radius D1 of the hole H1 is set to be smaller than a radius D2 of the inner wall surface 120B. Therefore, in a cross section including the central axis AX, the radius D2 that is a minimum distance between the central axis AX and the inner wall surface 120B is larger than the radius D1 that is a minimum distance between the central axis AX and the film 114. Also, information about the tape winding body 110 is printed on the other surface 114A of the film 114 (FIG. 17C).

As shown in FIG. 17D, a surface of the film 114 is bonded to the facing side surface 112D of the binding tape 112 by the adhesive layer 116. In the present embodiment, the adhesive layer 116 is configured as an adhesive layer stacked on the surface of the film 114. For this reason, the surface of the film 114 is bonded on the substantially entire side surface 112D of the binding tape 112 and the substantially entire end face 120D of the tube member 120. Note that, the adhesive layer 116 may also be provided by coating or spraying an adhesive on the side surface 112D of the binding tape 112.

The sizes of the constitutional components of the tape winding body 110 can be designed as appropriate according to uses. For example, a length of the tube member 120 in the direction of the central axis AX may be set to 5 to 15 mm, a diameter of the inner wall surface 120B may be set to 10 to 30 mm, and a diameter of the outer peripheral surface 120A may be set to 15 to 40 mm. Also, a width of the binding tape 112 may be set to 5 to 15 mm, a thickness may be set to 0.05 to 0.4 mm, a length may be set to 10 to 40 m, and an outer diameter may be set to 100 to 120 mm, for example, when wound. Also, a thickness of the film 114 may be set to 0.5 to 3 mm, an outer diameter may be set to 100 to 130 mm, an inner diameter may be set to 10 to 20 mm, and an amount of protrusion from the inner wall surface 120B, i.e., a difference between the radius D2 and the radius D1 may be set to 1 to 5 mm.

Figure 18:
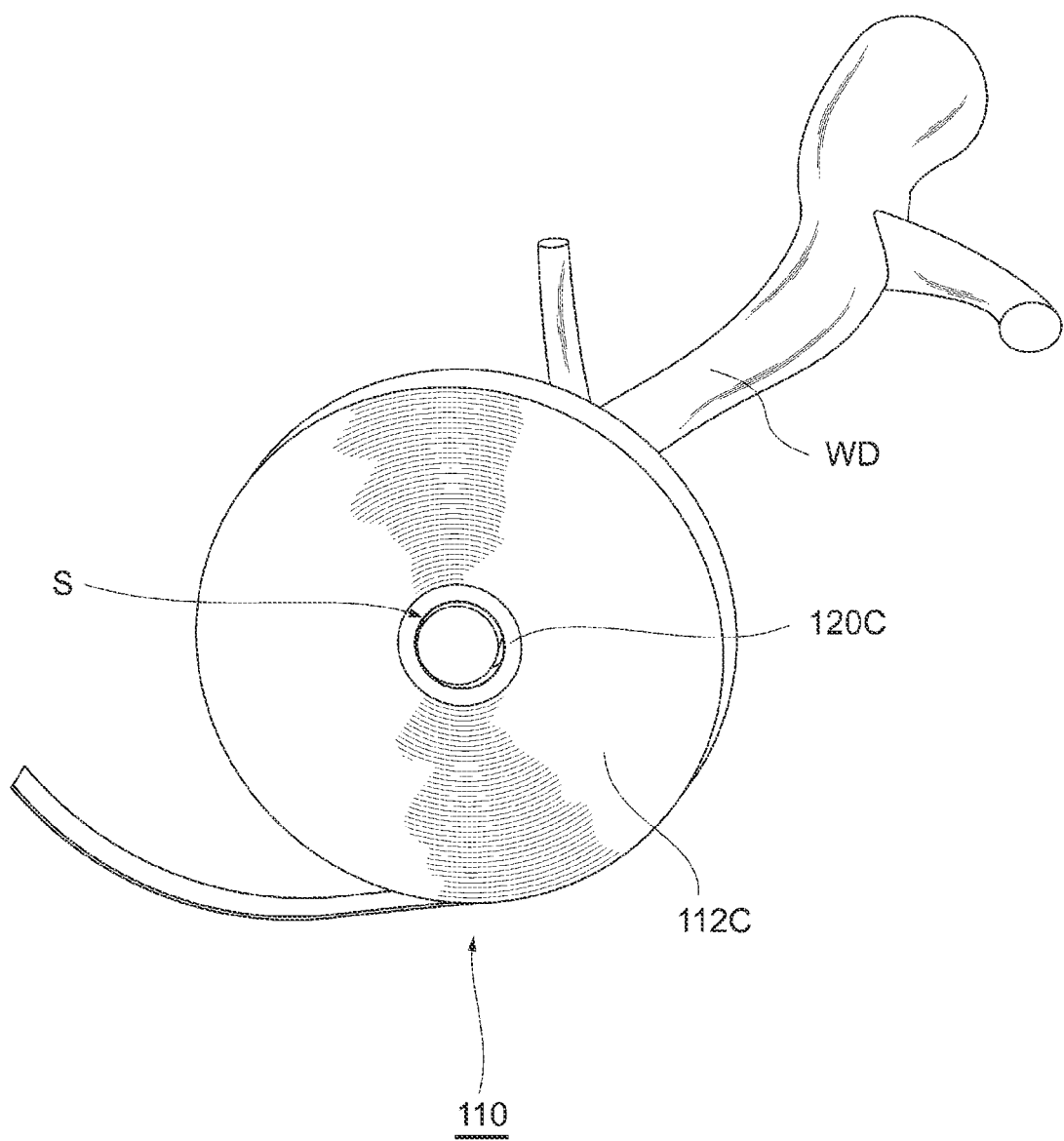
FIG. 18 is a pictorial view depicting a using method of the tape winding body 110.

FIG. 18 depicts an aspect where a to-be-bound object is bound using the tape winding body 110 with a hand. As shown in FIG. 18, it is possible to pull out the binding tape 112 while rotating the tape winding body 110 by supporting the tape winding body 110 with a tree branch WD, a stanchion or the like so as to penetrate the region S surrounded by the inner wall surface 120B of the tube member 120 and the hole H1. At this time, the side surface 112D of the binding tape 112 is bonded to the film 114, which is a film body, by the adhesive layer 116. For this reason, even though the binding tape 112 rotates when pulled out, it is possible to suppress the binding tape 112 from loosening due to the inertial force. Similarly, it is also possible to suppress the binding tape 112 from loosening when carried. Even when the binding tape 112 is kept after used, the binding tape is difficult to loosen because the side surface 112D of the end portion on the outer periphery-side of the binding tape 112 is bonded to the film 114.

The part bonded to the film 114 is not the outer peripheral surface 112A and the inner peripheral surface 112B of the binding tape 112 but the side surface 112D whose area per a length is extremely smaller than the outer peripheral surface 112A and the like. For this reason, it is possible to easily pull out the binding tape 112 while suppressing the binding tape from loosening. The information about the tape winding body 110 is printed on the surface 114A of the film 114, so that even after the tape winding body 110 is taken out from a box, the tape winding body 110 can be identified from other tape winding bodies and the like. Note that, the information to be printed is not limited to the identification information of the tape winding body. Also, the information may be displayed on the surface 114A of the film 114 by a method other than the printing. However, the information is not necessarily required to be printed. That is, the information may not be displayed.

Note that, even though the end portion on the outer periphery-side of the binding tape 112 is loosened after used, the binding tape may be kept in a state where a part of the outer peripheral surface 112A or the inner peripheral surface 112B is bonded and fixed to the surface of the film 114 that is exposed as the binding tape 112 is used.

Figure 17E:
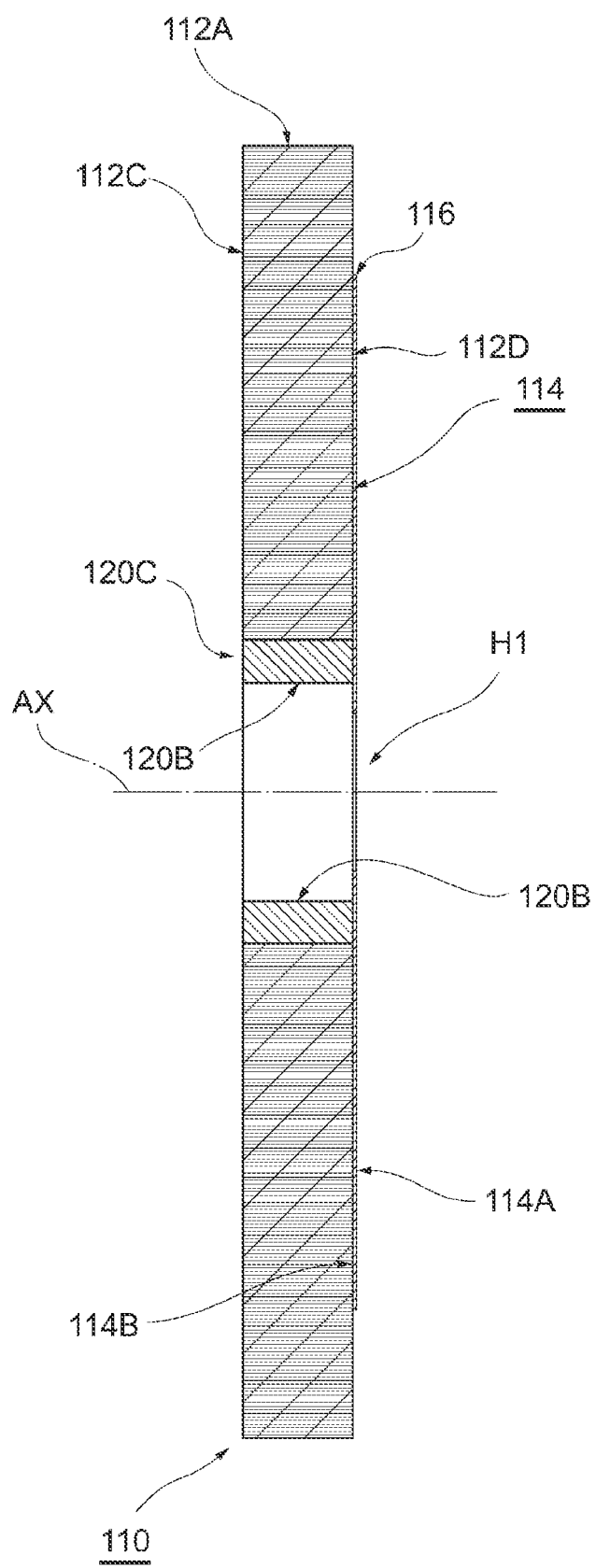
FIG. 17E depicts an embodiment where a size of a film 114 is smaller than an outer peripheral surface 112A.

The film may also be formed to have a variety of shapes such as rectangular and polygonal shapes, in addition to the circular shape. The film is not necessarily required to be bonded to the entire side surface of the binding tape, and may be bonded to only a part of the side surface. However, when the film is formed large enough to adhere to the side surface of the binding tape on the outermost periphery, it is possible to omit an operation of fixing the outer peripheral end portion of the binding tape by a tape or the like. For this reason, it is possible to reduce a troublesome of taking off a glove for operation and peeling off the tape at the outer peripheral end portion each time the binding tape is replaced. For example, when the film is formed to have a rectangular shape and is bonded at its vicinity of an apex to the side surface of the binding tape on the outermost periphery, it is possible to efficiently use the film. On the other hand, an outer diameter of the film may be formed to be smaller than the outer peripheral surface of the binding tape at the start of use. FIG. 17E depicts an embodiment where the outer diameter of the film 114 is formed to be smaller than the outer peripheral surface 112A of the binding tape 12 at the start of use.

The film is not also necessarily required to adhere to the entire end face of the tube member. That is, the film may be only partially bonded or may not be bonded at all. For example, the length of the tube member in the direction of the central axis may be formed to be smaller than the width of the binding tape to space the end face of the tube member and the film each other, so that a gap may be provided. However, when the film is also bonded to the end face of the tube member, even though an adhesion area between the side surface of the binding tape and the film reduces as the binding tape is used, the film can be stably supported.

The hole of the film may not be formed so that the film protrudes from the inner wall of the tube member in the direction of the central axis, or may also be formed to have a circular or polygonal hole larger than the inner wall of the tube member. However, when the film is formed with a small hole so as to protrude from the inner wall of the tube member, the film and the side surface of the binding tape can be bonded to each other so that the hole of the film can be seen beyond the region surrounded by the inner wall surface of the tube member. Therefore, when manufacturing the tape winding body 110 by bonding the film on the side surface of the binding tape wound on the tube member, the position of the film can be easily aligned. Also, even though a positional deviation occurs when bonding the film on the side surface of the binding tape, a part of the film can be bonded on the end face of the tube member. For example, when an inner diameter intersection of the hole of the film is set to ±0.3 mm, an inner diameter intersection of the tube member is set to ±0.3 mm, and a positioning intersection when bonding the film on the side surface of the binding tape is set to ±0.3 mm, a maximum error of 0.9 mm occurs. Therefore, when the radius of the hole of the film is formed to be smaller than the radius of the inner wall surface of the tube member by 1 mm or greater, it is possible to securely bond the end face of the tube member and a part of the film even if a positional deviation occurs. The film is preferably bonded on the side surface of the binding tape concentrically with the binding tape but may not be bonded concentrically. Also, as described above, the hole formed in the film may not be circular. For example, the hole may have a rectangular shape or a polygonal shape such as a hexagonal shape or may be a notch or a slit. Also, for example, the hole may have a rotationally symmetrical shape such as a star shape whose distance to a center changes.

Also, the film may not be formed with the hole. For example, the film may be configured as a film body having a circular shape, a polygonal shape or the like with no hole. Even for the tape winding body configured in this way, it is possible to form a hole through which a core rod or the like can penetrate a central part of the film, by tearing the film at the time of use.

Also, the central part of the film may be formed with a cut. Even for the tape winding body configured in this way, it is possible to form a hole through which a core rod or the like can penetrate a central part of the film, by pushing and expanding the film with the cut at the time of use.

The outer peripheral surface 120A of the tube member 120 may not be a cylindrical surface. The inner wall surface 120B may not also be a cylindrical surface, and for example, may be formed with an unevenness.

A thickness T of the film in a direction along the central axis AX is preferably equal to or larger than 0.05 mm and equal to or smaller than 2 mm, for example. The thickness T of the film is set to be equal to or larger than 0.05 mm and equal to or smaller than 2 mm, so that even when the side surface of the wound binding tape has an unevenness, the film can be easily bonded following the unevenness. Also, when stacking the tape winding body, it is possible to suppress a height from increasing.

In addition to the case where the adhesive layer is formed on the surface of the film, a double-sided tape separate from the film may also be used. Also, a spray-type adhesive or the like may be applied or sprayed on the film, which may be then bonded on the side surface of the binding tape. Also, an adhesive or the like may be applied or sprayed on the side surface of the tape or the end face of the tube member.

In the above, the film has been described as an example of the film body. However, a member having a predetermined thickness can also be used instead of the film.

Modified Embodiment 2

In the below, a modified embodiment of the film 114 is described. Since the other configurations are similar to the second embodiment, the same or similar reference signs are used and the descriptions thereof are omitted or simplified.

Figure 19:
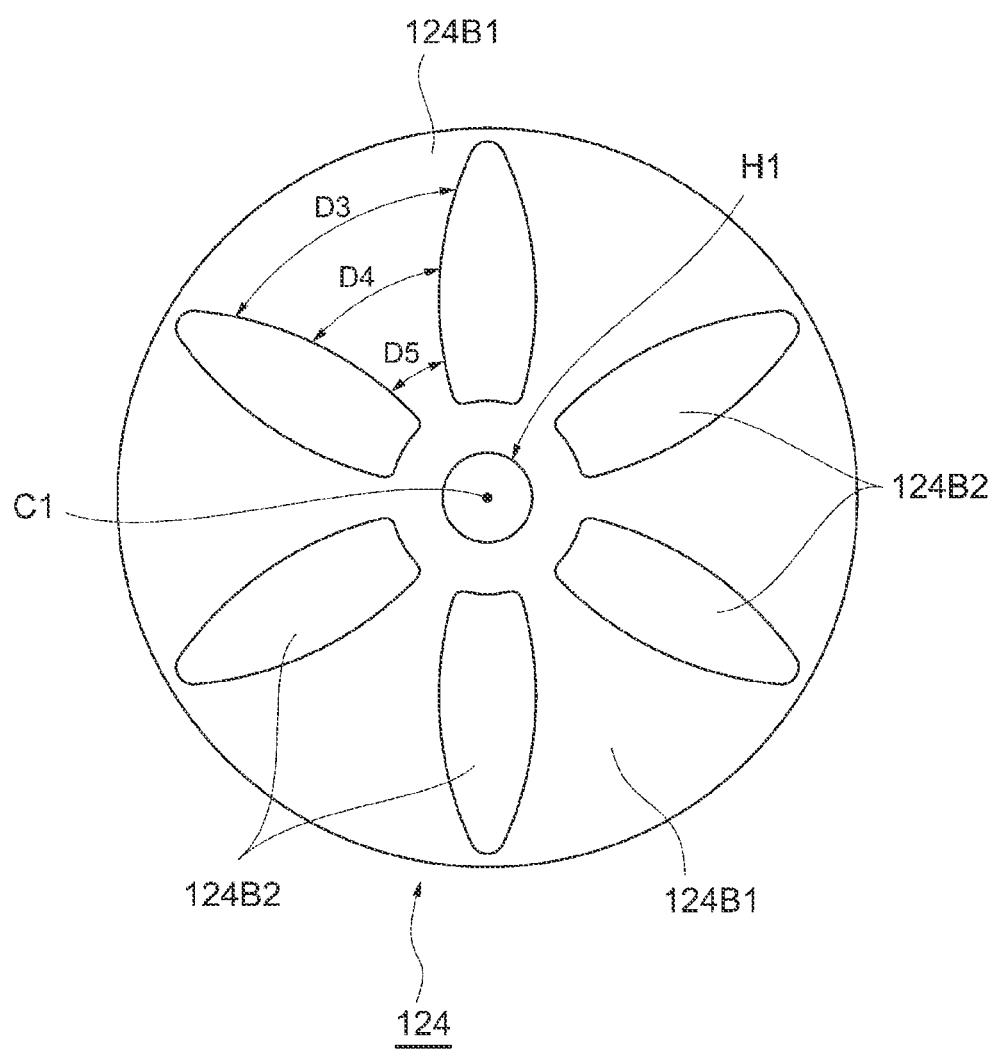
FIG. 19 is a plan view of a film 124.

FIG. 19 depicts a film 124 (an example of the "first member") in accordance with a modified embodiment of the film 114. A side surface of the film 124 facing a side surface of the binding tape 112 is formed with a region 124B1 in which an adhesive is applied to provide the adhesive layer 116 and six regions 124B2 in which the adhesive is not applied. As shown, the six regions 124B2 are formed in a rotational symmetry of 60° about a center C1 of the film 124 as a center. A distance of the two adjacent regions 124B2 in the circumferential direction reduces from an outer periphery-side toward an inner periphery-side of the film 124. For example, a distance in the circumferential distance from an outer periphery-side of any region 124B2 to the adjacent region 124B2 in a position close to the outer periphery-side is denoted as a distance D3, a distance in the circumferential distance between the adjacent regions 124B2 in positions on a more inner periphery-side is denoted as a distance D4 smaller than the distance D3, and a distance in the circumferential distance between the adjacent regions 124B2 in positions on a further inner periphery-side is denoted as a distance D5 smaller than the distance D4. An adhesion area between the side surface 112D of the binding tape 112 and the film 124 is a value obtained by integrating a sum of the distances in the circumferential direction between the adjacent regions 124B2 in positions spaced from the center C1 by predetermined distances with respect to the distance from the center C1. For this reason, the adhesion area between the side surface 112D of the binding tape 112 and the film 124 shown in FIG. 19 reduces from the outer periphery-side toward the inner periphery-side over a half or more region of the radius of the film 124.

In the below, effects of the film 124 are described with reference to FIGS. 20A and 20B. Note that, in the present modified embodiment, a tube member having a diameter larger than the tube member 120 of the second embodiment is used. However, since the tube member has similar functions, the same reference signs are used.

Figure 20A:
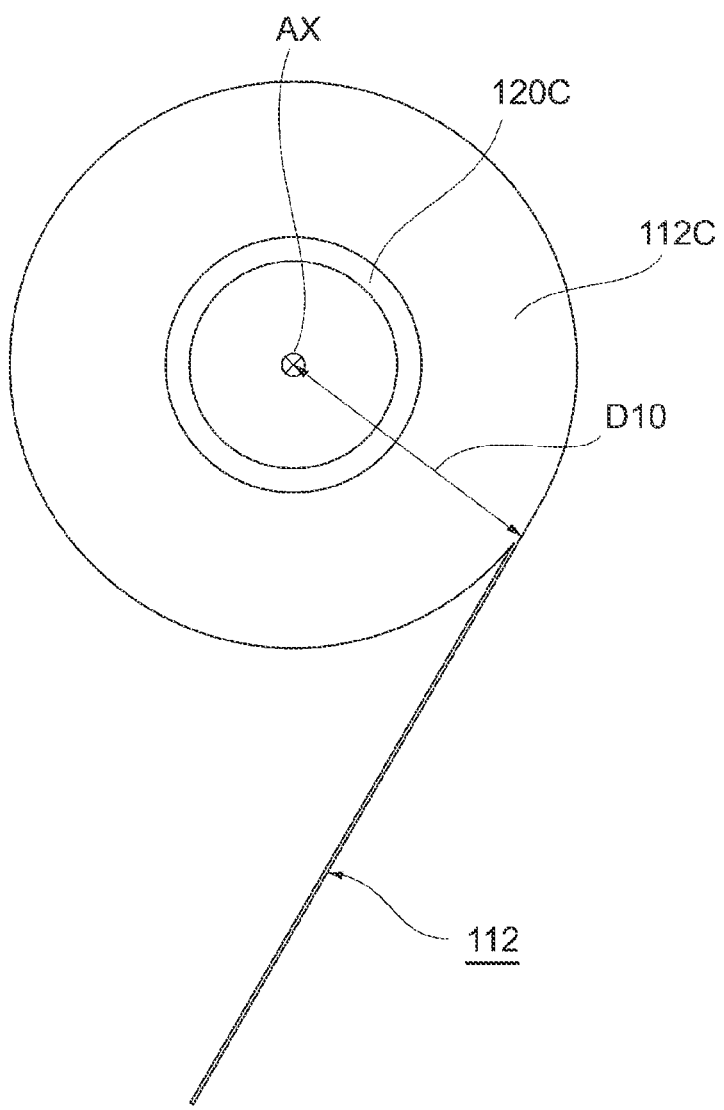
FIG. 20A is a pictorial view depicting an aspect where a binding tape 112 is pulled out.

FIG. 20A depicts an aspect where the binding tape 112 is being pulled out in a state where most of the binding tape 112 remains. FIG. 20B depicts an aspect where the binding tape 112 is being pulled out in a state where most of the binding tape 112 is used and a remaining amount is small.

In a case shown in FIG. 20A where the remaining amount of the binding tape 112 is large, a distance D10 between the central axis AX of the binding tape 112 and a pull-out position is large. For this reason, large moment is generated even when the binding tape 112 is pulled with the same force.

Figure 20B:
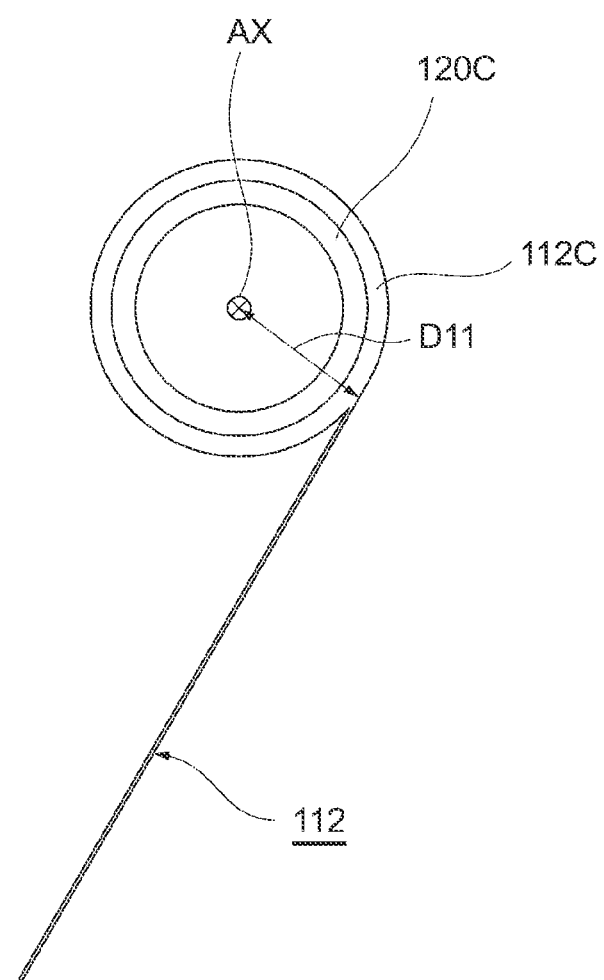
FIG. 20B is a pictorial view depicting an aspect where the binding tape 112 is pulled out.

On the other hand, in a case shown in FIG. 20B where the remaining amount of the binding tape 112 is small, a distance D11 between the central axis AX of the binding tape 112 and a winding position is smaller than the distance D10. For this reason, only small moment is generated even when the binding tape 112 is pulled with the same force. In other words, a pull-out resistance for pulling out the binding tape 112 increases. For this reason, it is impossible to pull out the binding tape 112, as intended. Also, if the force is excessively applied, the binding tape 112 may be excessively pulled out.

When the film 124 of the present modified embodiment is bonded on the side surface 112D of the binding tape 112, it is possible to reduce the adhesion area with the side surface 112D of the binding tape 112 from the outer periphery-side toward the inner periphery-side. For this reason, as compared to the case where the film 114 is used, it is possible to reduce the increase in pull-out resistance on the inner periphery-side.

Note that, the region 124B2 in which the adhesive is not applied may also be formed as a hole penetrating the film 124. As a shape of the region 124B2, a variety of shapes such as a circle and a polygon can be applied as long as the shape can reduce the adhesion area with the side surface of the binding tape from the outer periphery-side toward the inner periphery-side.

Modified Embodiment 3

In the below, a tape winding body 130 in accordance with a modified embodiment of the tape winding body 110 is described. The descriptions of the similar configurations are omitted or simplified by using the same or similar reference signs.

The tape winding body 130 is different from the tape winding body 110 of the second embodiment, in that a film 134 (an example of the "first member") and a film 136 (an example of the "second member") are used instead of the film 114.

Figure 21A:
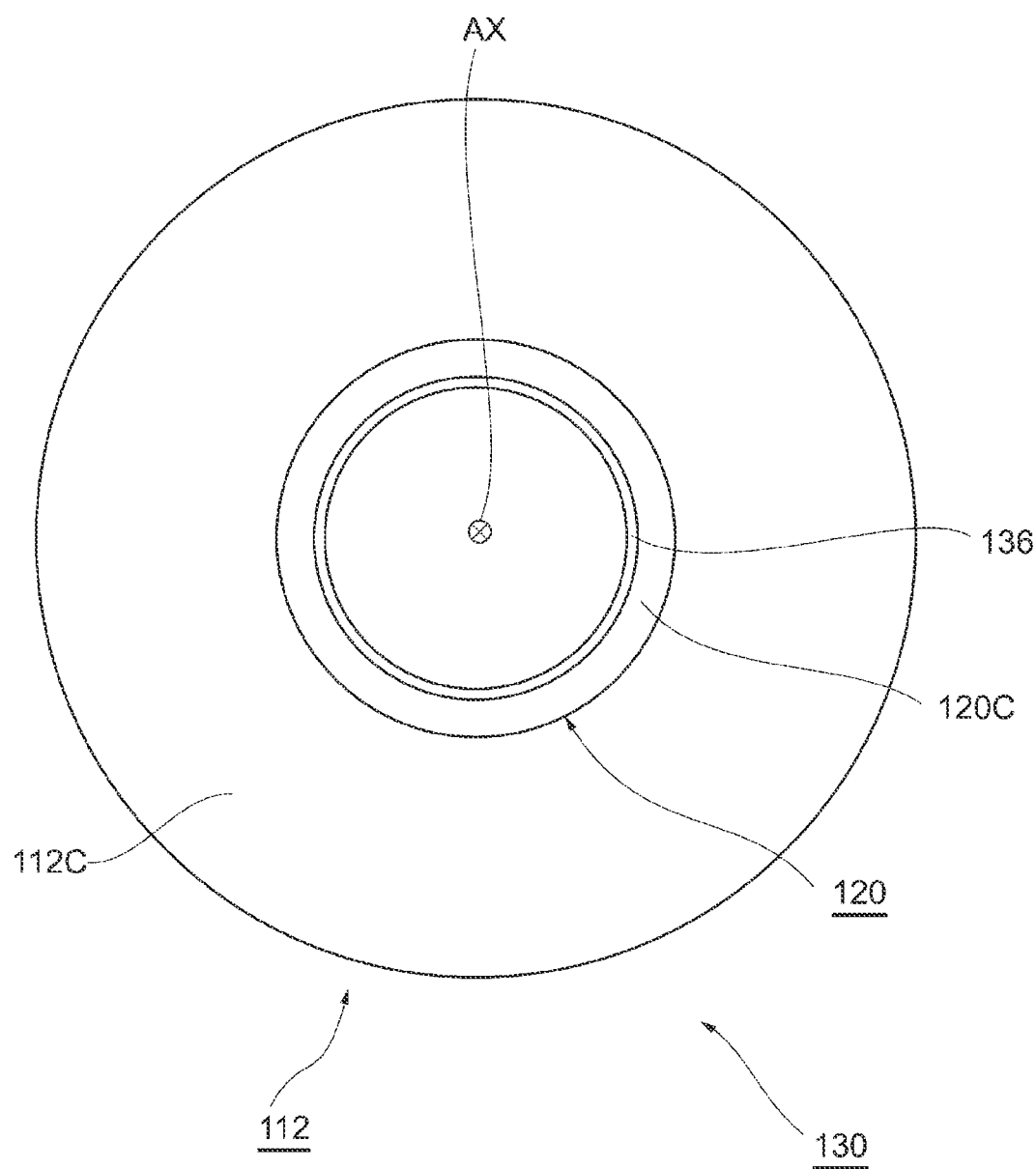
FIG. 21A is a left side surface of a tape winding body 130.
Figure 21B:
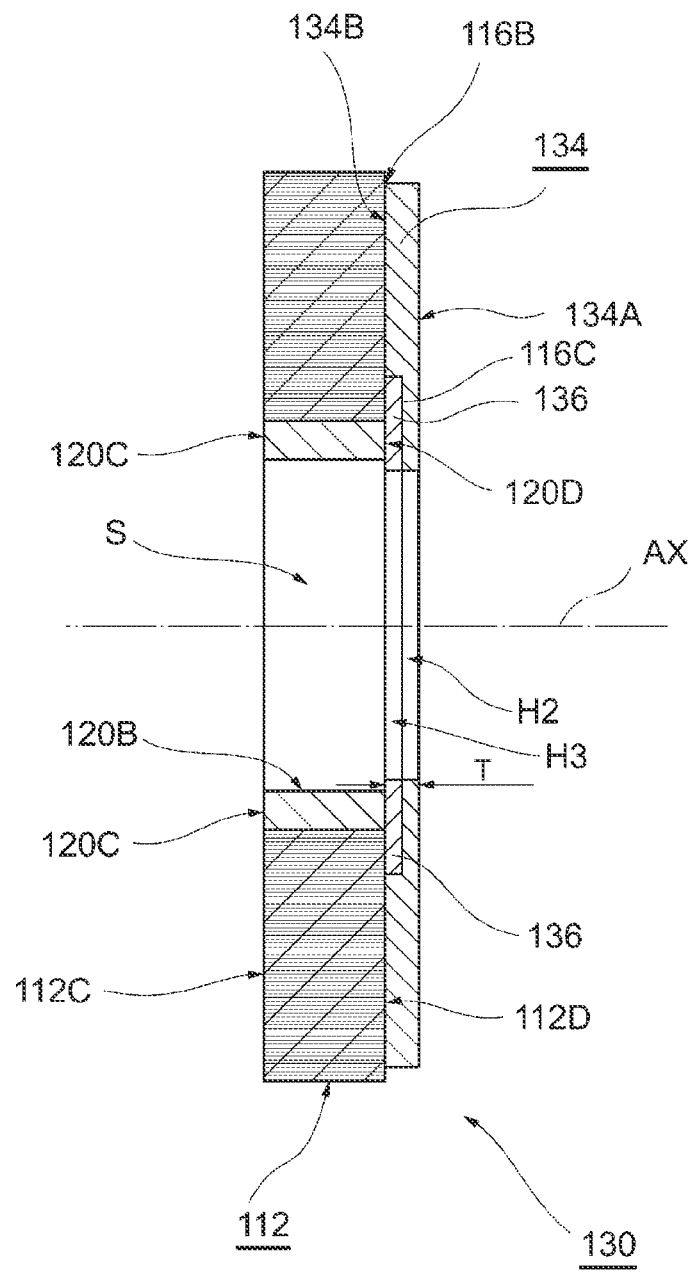
FIG. 21B is a sectional view of the tape winding body 130, including the central axis AX.

FIG. 21A is a left side view of the tape winding body 130, and FIG. 21B is a sectional view passing through the central axis AX of the tape winding body 130. The film 134 is a substantially circular film body, and one surface thereof is provided with an adhesive layer 116B on which an adhesive (not shown) is applied. A part of a surface 134B of the film 134 facing the side surface 112D of the binding tape 112 is bonded on the side surface 112D of the binding tape 112 facing the surface 134B by an adhesive layer 116B, and the other part is bonded on a surface of the film 136 facing the surface 134B by an adhesive layer 116C. Also, as shown in FIG. 21B, a central part of the film 134 is formed with a circular hole H2 having a diameter smaller than an inner diameter of the tube member 120. In the present modified embodiment, an outer diameter of the film 134 is formed to be slightly smaller than the outer diameter of the binding tape 112 in a wound state.

The film 136 is sandwiched between the film 134 and the side surface 112D of the binding tape 112. In the present modified embodiment, the film 136 is a substantially circular film body, and is formed with a substantially circular hole H3 (FIG. 21B) at a central part including the center. An outer diameter of the film 136 is formed to be larger than an outer diameter of the tube member 120, and an inner diameter thereof is formed to be substantially the same as an inner diameter of the film 134. For this reason, as shown in FIG. 21B, in a cross section passing through the central axis AX, the hole H2 and the hole H3 communicate with the region S surrounded by the inner wall surface 120B of the tube member 120. An end portion of the film 134 on the inner diameter-side and an end portion of the film 136 on the inner diameter-side protrude from the inner wall surface 120B of the tube member 120. The film 136 is a film body formed of fiber such as paper or resin such as plastic. In the present modified embodiment, a surface of the film 136 facing the film 134 is applied with an adhesive, and a surface facing the side surface 112D of the binding tape 112 and the end face 120D of the tube member 120 is not applied with an adhesive. Therefore, the film 136 adheres to the film 134, and does not adhere to the binding tape 112 and the tube member 120. Note that, the part communicating with the region S surrounded by the inner wall surface 20B of the tube member 120 is not limited to the hole H2 formed in the film 134 and the hole H3 formed in the film 136.

For example, the film 134 or the film 136 may be formed to have a substantial C-shape, and the communicating part may be formed in a notched shape having an opening part. When the film 134 or the film 136 is formed of a material having water resistance and ductility, for example, a material such as resin and rubber or synthetic paper in which a resin material and a pulp material are mixed, the film can be favorably used even though the tape winding body 110 is used in environments exposed to wind and rain, such as an environment where it is used outdoors.

Figure 21C:
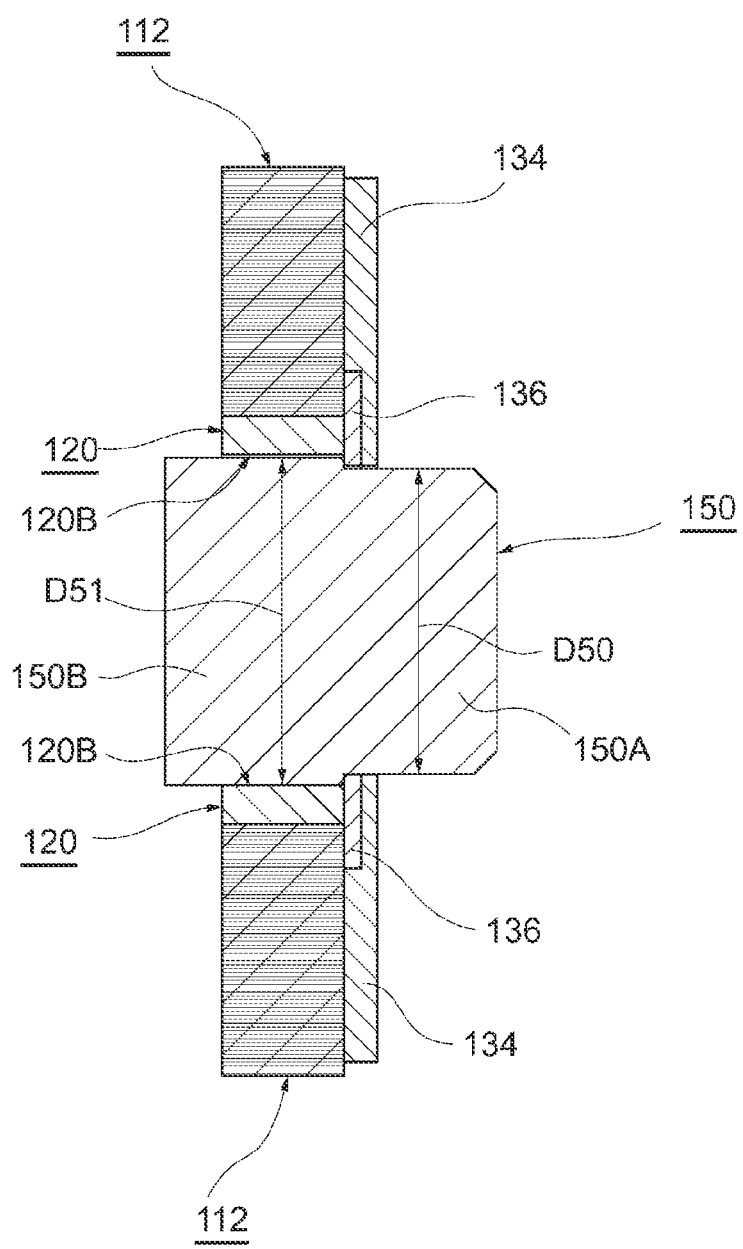
FIG. 21C is a pictorial view depicting a manufacturing process of the tape winding body 130.

FIG. 21C is a sectional view depicting one process for manufacturing the tape winding body 130. As shown in FIG. 21C, a jig 150 formed by connecting cylinders having different diameters can be used so as to manufacture the tape winding body 130. Specifically, as the jig 150, a cylindrical part 150B having an outer diameter D51 and a cylindrical part 150A provided at a tip end of the cylindrical part 150B and having an outer diameter D50 smaller than the outer diameter D51 are concentrically formed. Since the outer diameter D51 is substantially the same as the inner diameter of the tube member 120, the cylindrical part 150B can hold the tube member 120 on which the binding tape 112 is wound. Since the outer diameter D50 is substantially the same as each of the inner diameters of the film 134 and the film 136, the cylindrical part 150A can hold the film 134 and the film 136. In a state where the tube member 120 on which the binding tape 112 is wound is held by the cylindrical part 150B, the cylindrical part 150A holds the film 136 with penetrating the hole H3, so that the film 136 can be arranged side by side concentrically with the side surface 112D of the binding tape 112. Then, while holding the film 134 with the cylindrical part 150A penetrating the hole H2, the surface 134B of the film 134 is pressed against the surface of the film 136 and the side surface 112D of the binding tape 112.

By the above process, the film 134, the film 136, the tube member 120 and the binding tape 112 wound thereon can be concentrically integrated. When the binding tape 112 is made of resin, the binding tape 112 may expand or contract depending on temperatures or may be stretched during winding. Therefore, as compared to a case where the positional alignment is performed based on the outer diameter of the binding tape 112, it is possible to improve accuracy of the positional alignment.

Note that, in order to prevent the tube member 120 from moving leftward in FIG. 21A and the like, the jig 150 may be further provided with a cylindrical part having a large diameter and configured to contact the end face 120C of the tube member 120. Similarly, the tape winding body such as the tape winding body 110 where the film is one may also be positionally determined and integrated so that the film and the tube member are to be concentric with each other.

According to the tape winding body 130, it is possible to adjust the adhesion area between the film 134 and the side surface 112D of the binding tape 112 by adjusting the outer diameter of the film 136. Therefore, when the remaining amount of the binding tape 112 becomes small, the pull-out load of the binding tape 112 can be reduced by reducing the adhesion area between the film 134 and the binding tape 112 or removing the adhesion. Also, it is possible to suppress the adhesive on the surface of the film 134 from squeezing out by the film 136. Since a region protruding from the tube member 120, which can be seen in the left side view of FIG. 21A, toward the center direction can be covered with the film 136, dust and the like can be suppressed from being attached in the region.

Note that, the film 136 may also be formed so that an adhesive is not applied on any surface. At this time, a shape such as the region 124B2 (FIG. 19) may be continuously provided on the outer peripheral part. In this case, the film 136 has such a shape that a substantially circular central part having a hole formed at a center and a plurality of extension parts are provided, wherein the extension parts are each continuously provided on an outer periphery of the central part, extend so that an area gradually reduces toward an outer diameter and are spaced in a circumferential direction. Also, the film 136 may not be provided, and a region on the surface of the film 134 facing the film 136 may be applied with a release agent or the like, so that a non-contact surface may be provided.

In the tape winding body as described above, since the film that adheres to the side surface of the binding tape is provided, it is possible to suppress the binding tape from loosening. In the below, effects that are realized when the film protrudes inwardly beyond the tube member are described.

Figure 22A:
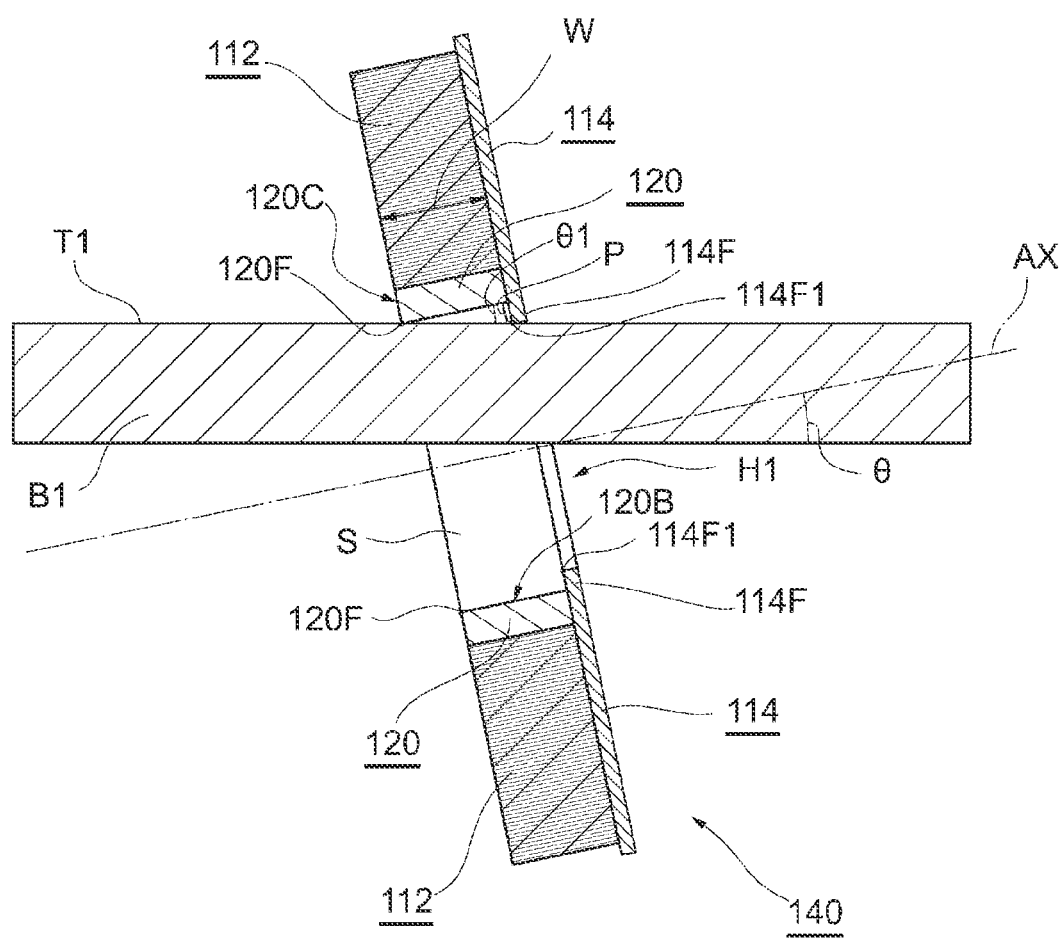
FIG. 22A is a sectional view depicting a state where a tape winding body 140 is supported by a round rod B1.

FIG. 22A is a pictorial view depicting a use aspect where a tape winding body 140 is used supported by a round rod B1. Note that, the descriptions of the constitutional elements satisfying the similar functions to the second embodiment and the like are omitted or simplified by using the similar reference signs, even when the sizes are different. FIG. 22A is a sectional view passing through the central axis AX of the tape winding body 140. For convenience, a part, which protrudes from the inner wall surface 120B toward the central axis AX, of the film 114 is referred to as a rib portion 114F. The rib portion 114F of the tape winding body 140 is annularly formed. In the sectional view passing through the central axis AX, an amount of protrusion of the rib portion 114F from the inner wall surface 120B is denoted as a protruding amount P. A width of the tube member 120 in the direction of the central axis AX is denoted as a width W2.

As shown in FIG. 22A, the rib portion 114F is provided, so that when supported by the round rod B1, the tape winding body 140 is supported at two places of both ends in the direction of the central axis AX by the round rod B1. Specifically, the tape winding body 140 is contacted to the round rod B1 in a position 114F1, which is a tip end of the film 114 exposed to the hole H1 and at which a distance to the central axis AX is smallest, and in a position 120F that is the other end portion, which is on the opposite side to the film 114 in the direction of the central axis AX, of the inner wall surface 120B of the tube member 120. The two support points are provided, so that the tape winding body 140 can be stably supported, as compared to a case where the rib portion 114F is not provided and the contact place with the round rod B1 is not thus constant. In particular, since the large moment is applied to the position 114F1 of the film 114 by the binding tape 112 on the lower side in FIG. 22A, the stability can be improved.

Note that, in a case where the width W2 is 5 to 15 mm, the protruding amount P is preferably 1 mm or more, i.e., 6.6% or more of the width W2. In this case, in the cross section including the central axis AX, an angle θ between a tangential line T1 (FIG. 22A) in contact with the film 14 on one end-side in the direction of the central axis AX and in contact with the tube member 120 on the other end-side in the direction of the central axis AX and the central axis AX is 3.8° or greater. Note that, in the same cross section, in a case where the inner wall surface 20B of the tube member 120 and the central axis AX are parallel to each other, an angle θ1 between the tangential line T1 and the inner wall surface 20B is the same as the angle θ. If the protruding amount P is smaller than the above, it may be difficult to make the contact in the position 114F1 and the position 20F as support points when a surface of the round rod B1 has an unevenness of about 1 mm or when the unevenness of the surface has an inclination of about 3°. For example, when the width W2 is about 15 mm, if the protruding amount P is 0.8 mm, the angle θ is about 3°.

When the width W2 is 5 to 15 mm, the protruding amount P is preferably 7.5 mm or smaller, i.e., 50% or less of the width W2. In this case, the angle θ is 26.5° or smaller. If the protruding amount P becomes larger, a high load is applied on the position 120F-side, so that the film 114 may be rotated in a counterclockwise direction due to a weight of the binding tape 112 and the tape winding body 140 may fall down, in some cases.

Note that, the rib portion 114F may not be formed in an annular shape. For example, a configuration is also possible in which the rib portion 114F is provided with a slit and a plurality of protrusions protruding toward the central axis AX is spaced from each other in the circumferential direction.

Figure 22B:
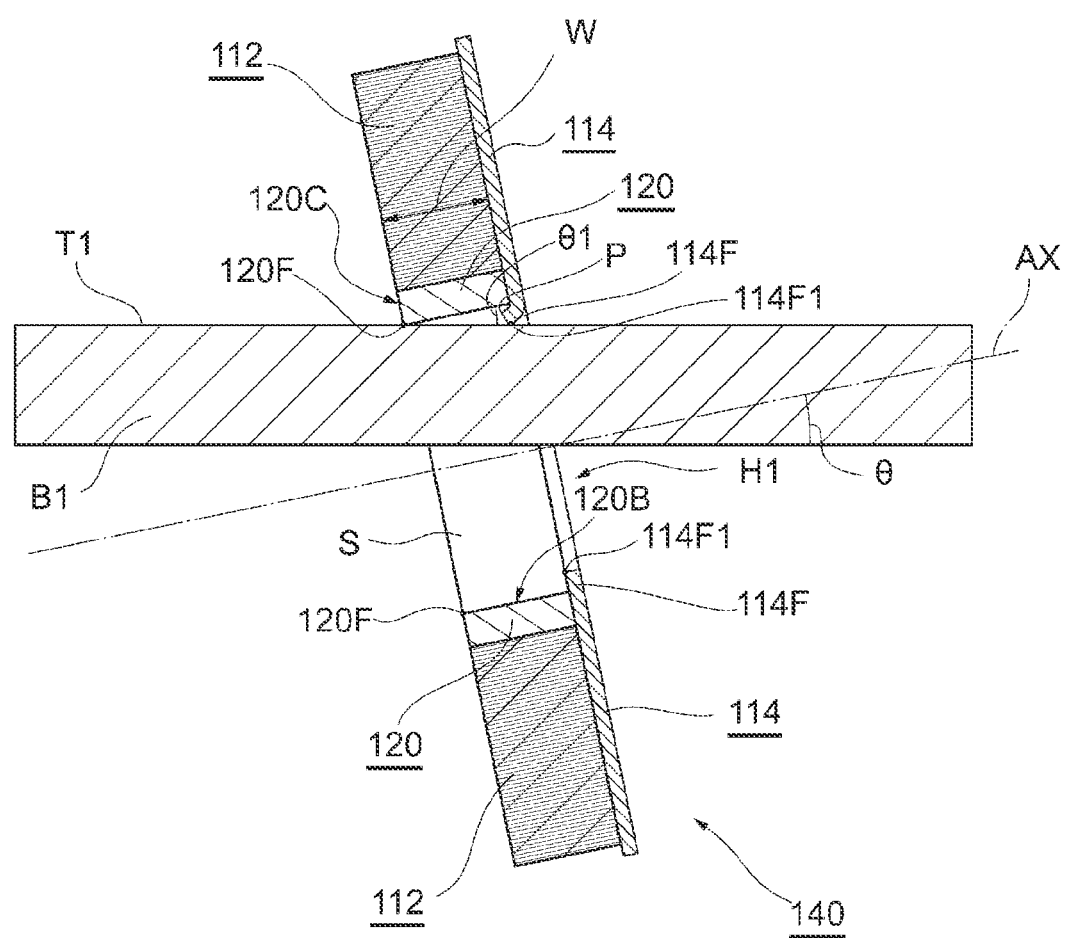
FIG. 22B is a sectional view depicting the state where the tape winding body 140 is supported by the round rod B1.

Note that, in a case where the film 114 that is an example of the first member is flexible to be elastically deformable and the rib portion 114F can be thus bent, in a case where the protruding amount P of the rib portion 114F from the inner wall surface 120B is 1 mm or more, and in a case where the thickness T of the rib portion 114F in the direction of the central axis AX is equal to or larger than 0.05 mm and equal to or smaller than 2 mm, when the tape winding body 140 is supported by the round rod B1, the rib portion 114F is bent in an insertion direction of the round rod B1 and is deformed, as shown in FIG. 22B. The rib portion 114F is bent, so that a check effect of making it difficult for the round rod B1 to separate is realized. As a result, the tape winding body 140 is difficult to separate from the round rod B1.

Figure 22C:
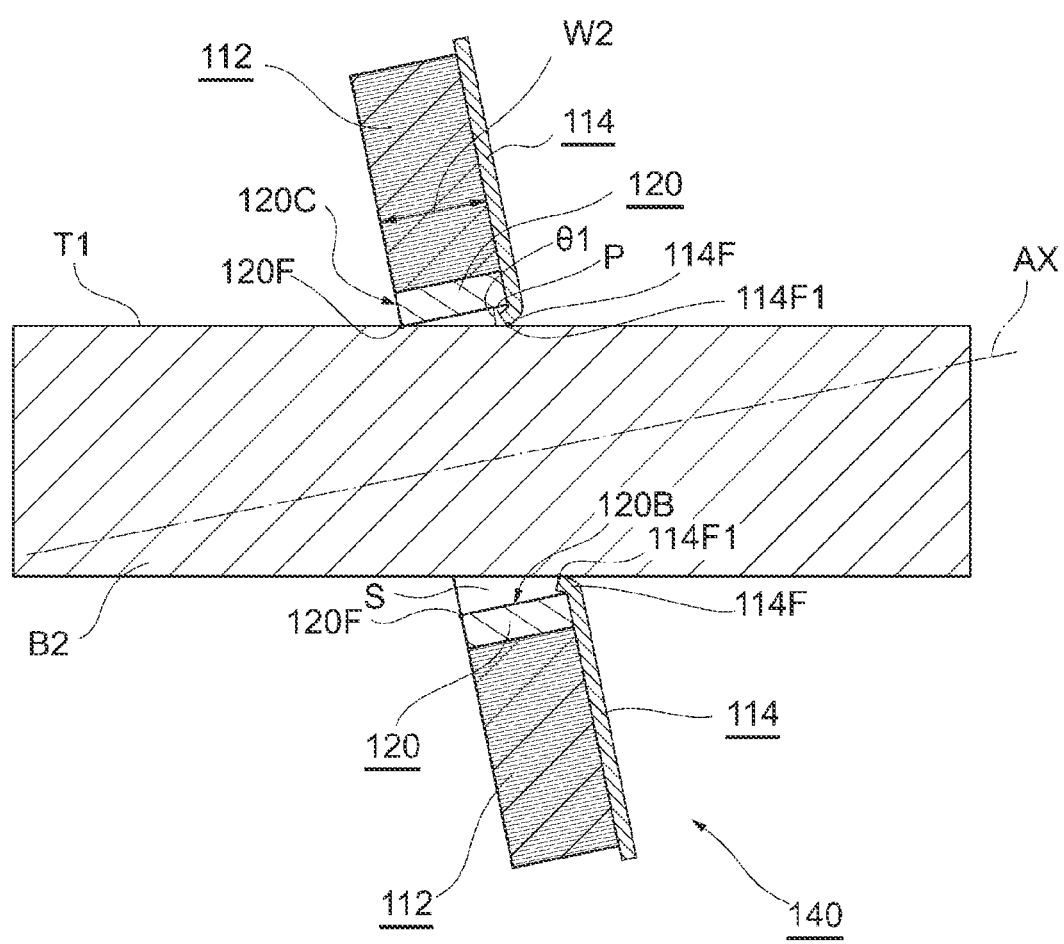
FIG. 22C is a sectional view depicting the state where the tape winding body 140 is supported by a round rod B2.

A case where an outer shape of a round rod B2 has a double or larger size of the radius D1 of the hole H1 of the film 114 is shown in FIG. 22C. Also in this case, in a case where the film 114 that is an example of the first member is flexible to be elastically deformable and the rib portion 114F can be thus bent, in a case where the protruding amount P of the rib portion 114F from the inner wall surface 120B is 1 mm or more, and in a case where the thickness T of the rib portion 114F is equal to or larger than 0.05 mm and equal to or smaller than 2 mm, when the tape winding body 140 is supported by the round rod B2, the rib portion 114F is bent in an insertion direction of the round rod B2 and is deformed. The rib portion 114F is bent, so that a check effect of making it difficult for the round rod B2 to separate is realized. As a result, the tape winding body 140 is difficult to separate from the round rod B2.

Third Embodiment

A third embodiment where the tape winding body is used loaded on the binding machine is described. By using the binding machine, it is possible to bind branches and vines of fruit trees and vegetables to stanchions, and to bundle vegetables and bags together.

Figure 23:
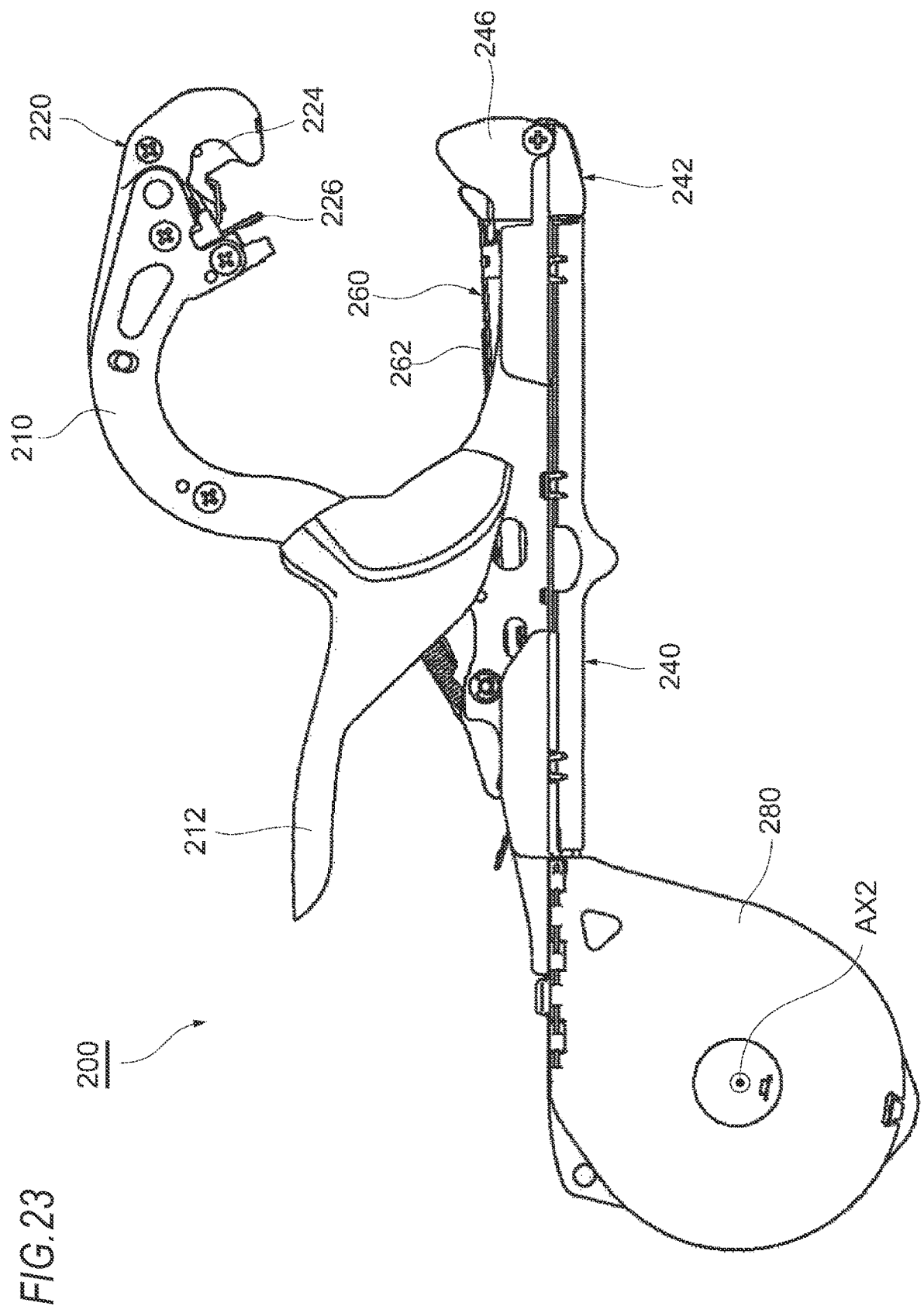
FIG. 23 is a front view of a binding machine 100.

FIG. 23 is a front view of a binding machine 200. The binding machine 200 as a hand-held tool includes a clincher arm 210, a binding machine main body 240, a handle 212, a tape pulling-out unit 220, a tape conveying unit 242, a staple magazine unit 260, and a tape magazine unit 280. In the tape magazine unit 280, a tape winding body is loaded. An end portion of a binding tape of the tape winding body is kept pulled out upwardly from a tape guide 246 of the tape conveying unit 242, in FIG. 23.

When the user grips the handle 212 and brings the same close to the binding machine main body 240, the clincher arm 210 comes close to the binding machine main body 240 according to the principle of a lever, thereby sandwiching the binding tape by a tape catcher 224 and a tape plate 226 of the tape pulling-out unit 220. When the user loosens the gripped state of the handle 212, the clincher arm 210 separates from the binding machine main body 240 in the state where the binding tape is sandwiched, so that the binding tape is pulled out upwardly from the tape guide 246. In this state, when the user pushes the binding machine 200 to the right in FIG. 23 so that a plurality of to-be-bound objects such as branches of vegetables and stanchions are present in a space between the clincher arm 210 and the tape conveying unit 242, the to-be-bound objects and the binding tape are contacted to each other, so that the binding tape is further pulled out from the tape guide 246. When the user again grips the handle 212, the clincher arm 210 again comes close to the binding machine main body 240, so that the binding tape is wrapped around the to-be-bound objects. Also, as the clincher arm 210 moves downwardly, when the tape guide 246 moves along an inclined surface facing the tape catcher 224 and reaches a position in which the movement is restrained, the tape catcher 224 rotates in a direction (toward the front part-side) away from the tape plate 226. The tape guide 246 is also correspondingly rotated toward the front part-side. As the tape guide 246 is rotated, a cutting blade provided at a tip end of the tape guide 246 cuts the binding tape. Also, the staple loaded in the staple magazine main body 262 is struck out to stitch overlapped parts of the binding tape. By the series of processes, the to-be-bound objects are bound.

The tape winding body is required to be rotatably held in the tape magazine unit 280 so that it can be favorably used for the binding machine 200. In a case where the tape winding body configured only by a tube member and the binding tape wound on the tube member is used, the tape magazine unit 280 is provided with a shaft part penetrating a region surrounded by an inner wall of the tube member, so that the tape winding body can be rotatably held. However, when it is intended to hold a tape winding body whose inner diameter of the tube member is large, a gap from the shaft part increases, so that it is difficult to rotatably hold the tape winding body in a stable manner.

The present inventors conceived that when the tape winding body 110 is used, the tape winding body 110 can be stably rotatably held.

Figure 24A:
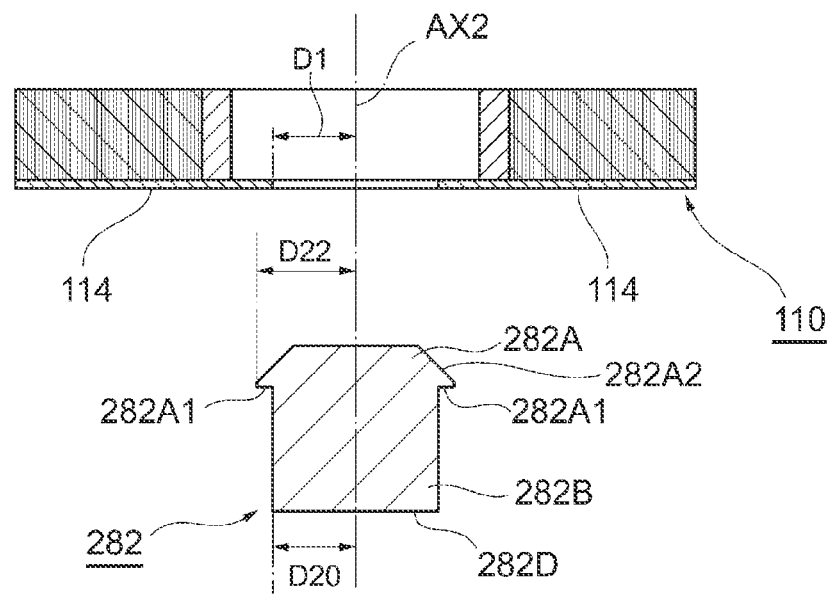
FIG. 24A is a pictorial view depicting an aspect where the tape winding body 110 is held.
Figure 24B:
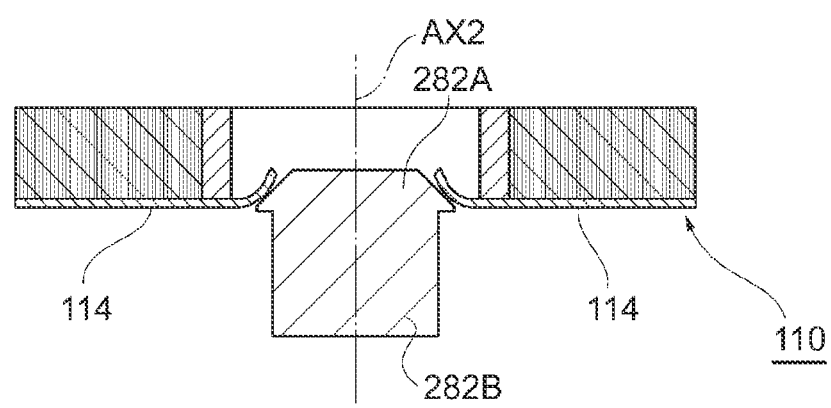
FIG. 24B is a pictorial view depicting an aspect where the tape winding body 110 is held.
Figure 24C:
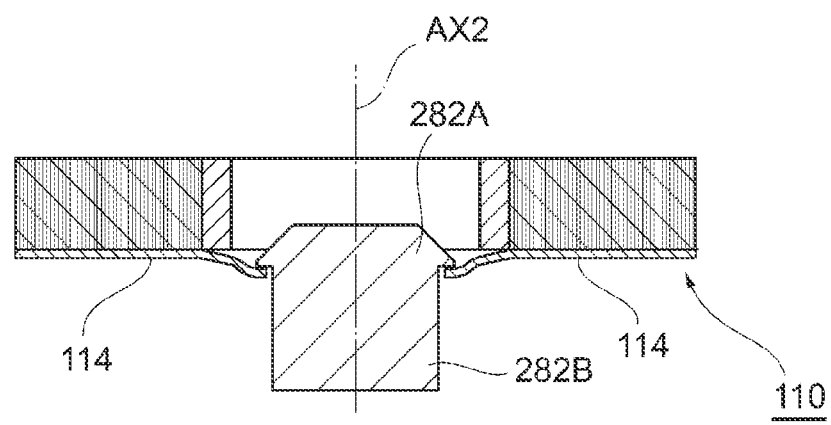
FIG. 24C is a pictorial view depicting an aspect where the tape winding body 110 is held.

FIGS. 24A to 24C are pictorial views depicting a method of holding the tape winding body 110. The tape magazine unit 280 has a shaft part 282 having a central axis AX2. The shaft part 282 has a cylindrical portion 282A having a cylindrical shape, and a circular truncated conical portion 282B having a circular truncated conical shape and formed on a tip end of the cylindrical portion 282A. A radius of a bottom surface of the circular truncated conical portion 282B is formed to be larger than a radius of the cylindrical portion 282A. For this reason, the shaft part 282 has an annular bottom surface part 282A1 protruding from the cylindrical portion 282A, and an inclined surface 282A2 that is a conical surface. Here, a radius D20 of the cylindrical portion 282A is formed to be substantially the same as a radius D1 of the hole H1. Also, a radius D22 of the circular truncated conical portion 282B is formed to be smaller than a radius D2 of the inner wall surface 120B of the tube member 120 and larger than the radius D1 of the hole H1.

The shaft part 282 is configured to be movable in the direction of the central axis AX2 and to be rotatable about the central axis AX2 as a center in the tape magazine unit 280. For example, the shaft part 282 may be configured to be held in the tape magazine unit 280 with being urged downwardly in the direction of the central axis AX2 in FIG. 24A and the like by a coil spring (not shown), and to be manually movable upwardly in the direction of the central axis AX2 by pressing the bottom surface 282D. Also, the shaft part may be configured to be rotatable around the central axis AX2 by a bearing and the like (not shown).

FIGS. 24A to 24C are sectional views of the tape winding body 110 mounted in the tape magazine unit 280 and the shaft part 282 of the tape magazine unit 280, taken along a plane including the central axis AX2 of the shaft part 282. FIG. 24A depicts a state before the tape winding body 110 is mounted. The central axis AX of the tape winding body 110 is not required to coincide with the central axis AX2 of the shaft part 282. However, the tape winding body 110 is preferably mounted in the tape magazine unit 280 so that the central axis AX and the central axis AX2 come close to each other at a distance smaller than the amount of protrusion of the film 114 and are substantially parallel to each other.

Subsequently, as shown in FIG. 24B, the shaft part 282 is moved upwardly in the direction of the central axis AX2. Since the radius D22 of the circular truncated conical portion 282B is formed to be larger than the radius D1 of the hole H1, the inclined surface 282A2 contacts end portions of the film 114. Since the end portions of the film 114 are free ends, the film can be deformed along the inclined surface 282A2, as shown in FIG. 24B. When the shaft part 282 is further moved upwardly, the bottom surface part 182A1 of the circular truncated conical portion 282B passes through the film 114. For this reason, the circular truncated conical portion 282B is accommodated in a region surrounded by the film 14 and the inner wall surface 120B of the tube member 120.

Thereafter, when the upward pressing in the direction of the central axis AX2 of the shaft part 282 is stopped, the shaft part 282 is moved by the urging force of the coil spring. However, the bottom surface part 282A1 of the circular truncated conical portion 282B contacts an edge portion of the film 114 with the hole H1 and becomes a stopper. For this reason, as shown in FIG. 24C, the tape winding body 110 can be held in the state where the circular truncated conical portion 282B is accommodated in the region surrounded by the film 114 and the inner wall surface 120B of the tube member 120. At this time, the end portions of the film 114 are deformed downwardly in the direction of the central axis AX2 away from the tube member 120.

In this way, the film is formed with the hole so as to protrude toward the central axis AX, so that it is possible to provide the tape winding body capable of being stably held by the binding machine. Also, even a tape winding body whose inner diameter of the tube member is different can be held by forming the hole to have substantially the same diameter.

Note that, the hole H1 may not be circular. For example, the hole H1 may be formed so that two short sides are each present on the side surface 112D of the binding tape 112 and two long sides are each above the region S surrounded by the end face 120D of the tube member 120 and the inner wall surface 120B of the tube member 120. Also in this configuration, since a part of the film 114 protrudes beyond the inner wall surface 120B of the tube member 120, it is possible to hold the tape winding body by using the shaft part 282.

The shaft part 282 is not necessarily required to be rotatable. Even though the shaft part 282 does not rotate, since the shaft part 282 slides on the surface of the film 114, it is possible to rotate the tape winding body 110.

Modified Embodiment 4

As the binding tape 112 of the second embodiment or as the binding tapes described in the other embodiments and the modified embodiments, a binding tape that is similar to the binding tape 10 or the binding tape according to the modified embodiment may also be used.

In this case, the tape winding body includes a cylindrical tube member, a tape wound on the tube member, capable of binding a to-be-bound object, and having a structure similar to the binding tape 10 or the like, and a first member positioned on a side surface of the wound tape, wherein the first member and at least a part of the side surface of the tape are bonded. As described above, the first member may be flexible to be elastically deformable, for example. The binding tape wound on the tube member has an intermediate layer, and a first surface layer covering one surface of the intermediate layer. The intermediate layer has a plurality of first linear members arranged side by side at an angle with respect to a longitudinal direction of the binding tape.

The tape winding body has the intermediate layer, and the first surface layer covering one surface of the intermediate layer. The intermediate layer has the plurality of first linear members arranged side by side at an angle with respect to the longitudinal direction of the binding tape. Therefore, it is possible to make it difficult for the binding tape to tear. When the binding tape is used, it is possible to perform the binding operation by using the binding machine for gardening even in a guiding operation of crops having a high repulsive force.

Modified Embodiment 5

As the binding tape 112 of the second embodiment or as the binding tapes described in the other embodiments and the modified embodiments, a binding tape that is similar to the binding tape 10A shown in FIG. 14 and the like may also be used. In this case, one end portion of the intermediate layer of the binding tape in the width direction is formed with a plurality of first cuts spaced in the longitudinal direction of the binding tape. The other end portion of the intermediate layer of the binding tape in the width direction is also formed with a plurality of second cuts spaced in the longitudinal direction of the binding tape. At least one of the first cuts may cut at least a portion of the second linear member.

Modified Embodiment 6

In the below, a modified embodiment of the film 114 is described. Since the other configurations are similar to the second embodiment, the same or similar reference signs are used and the descriptions thereof are omitted or simplified.

Figure 25:
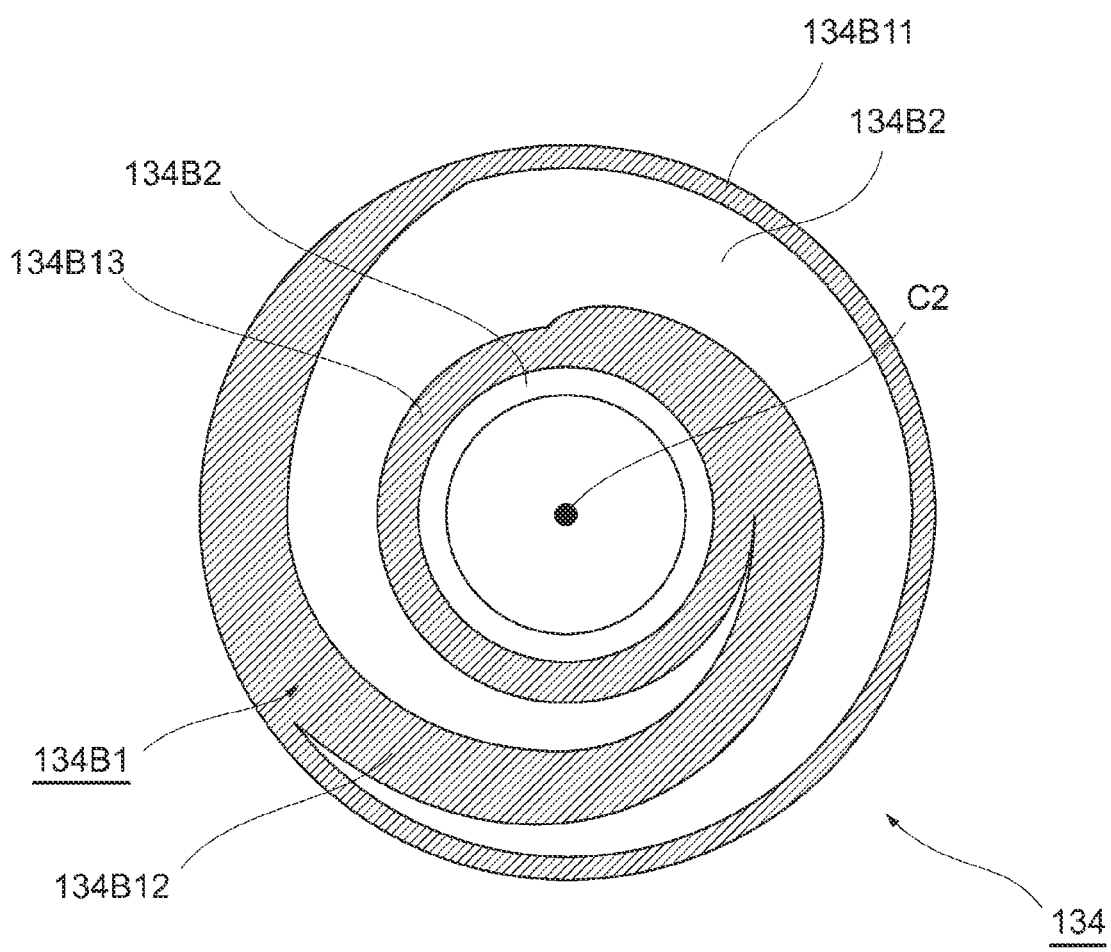
FIG. 25 is a plan view of a film 134.

FIG. 25 depicts a film 134 (an example of the "first member") in accordance with a modified embodiment of the film 114. A surface of the film 134 facing the side surface of the binding tape 112 is formed with a region 134B1 in which an adhesive including an acrylic-based gluing agent, for example, is applied to provide the adhesive layer 116 and a region 134B2 in which the adhesive is not applied.

Figure 26A:
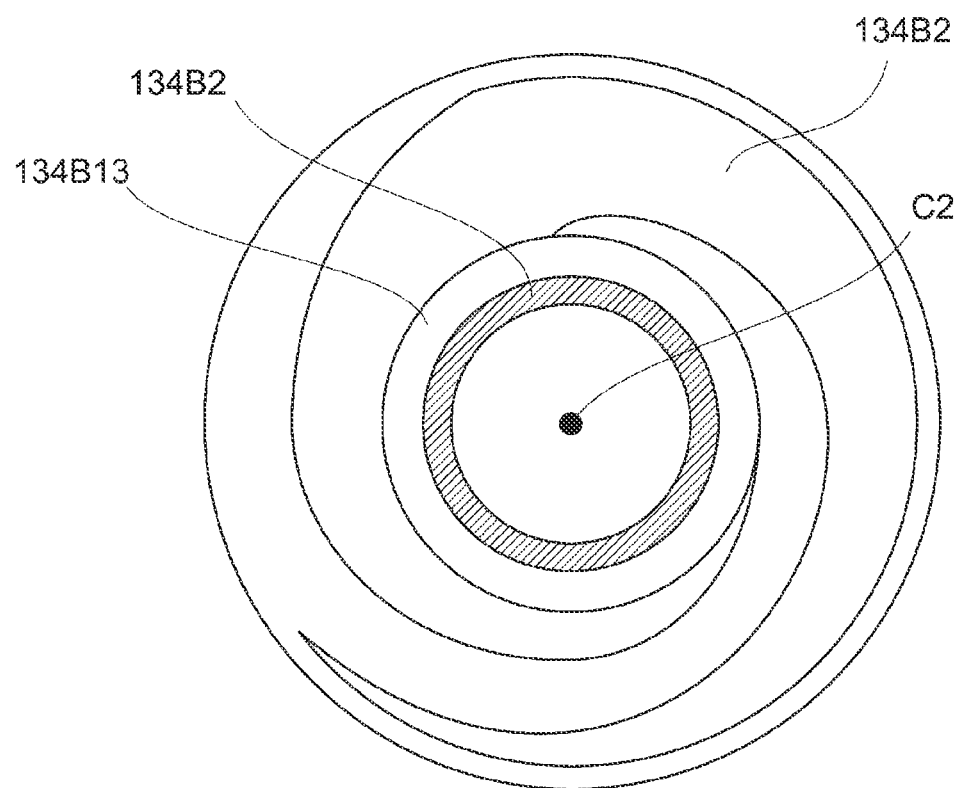
FIG. 26A is a pictorial view depicting an inner periphery region 134B13 of the film 134.
Figure 26B:
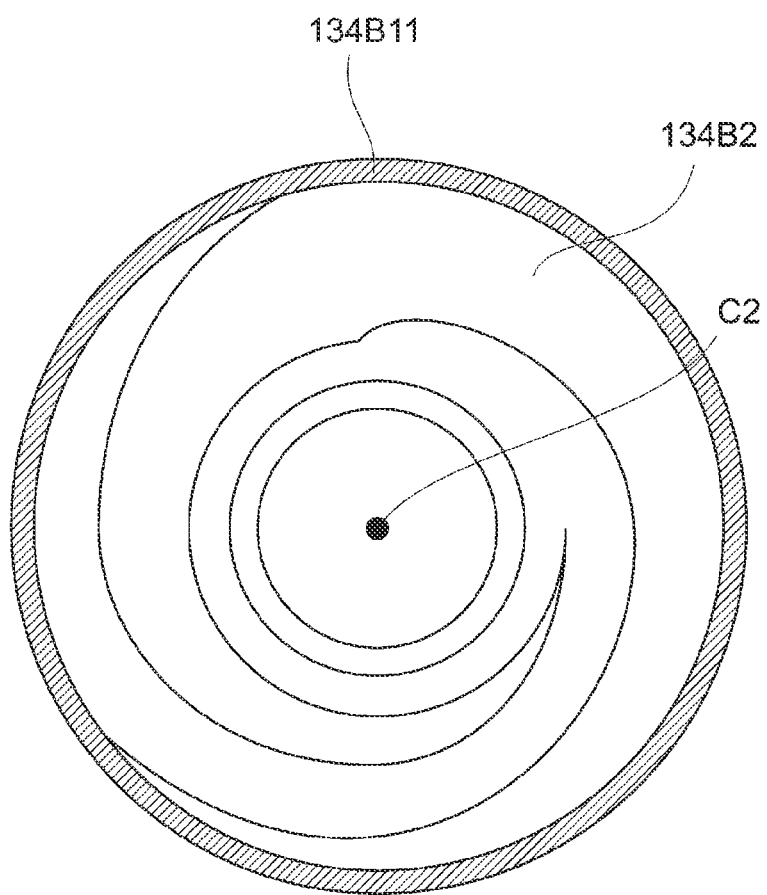
FIG. 26B is a pictorial view depicting an outer periphery region 134B11 of the film 134.
Figure 26C:
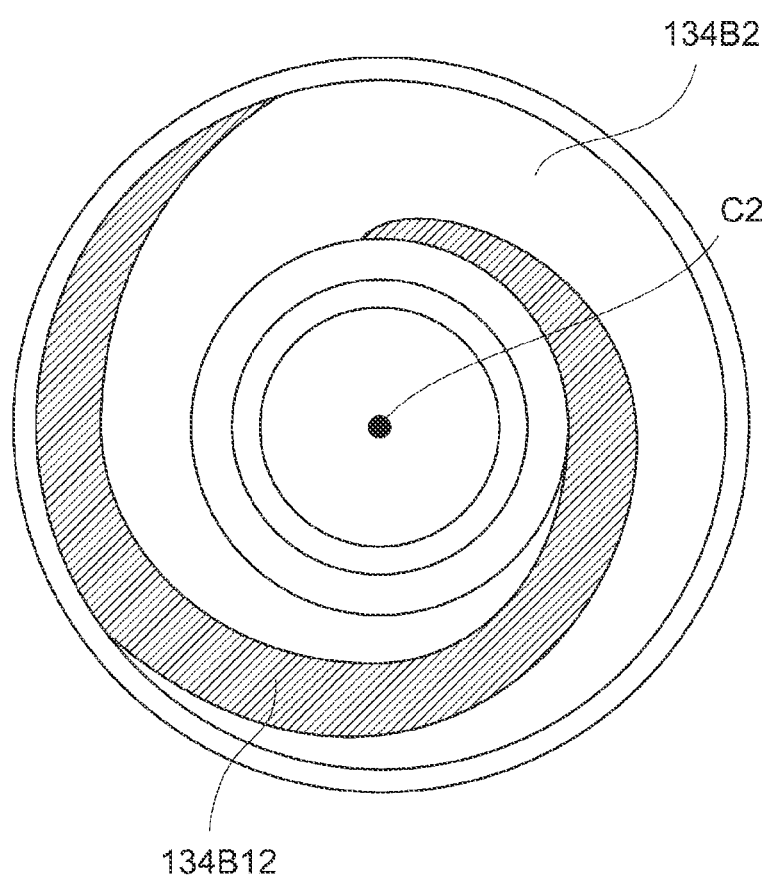
FIG. 26C is a pictorial view depicting an intermediate region 134B12 of the film 134.

FIGS. 26A to 26C are pictorial views in which the region 134B1 shown in FIG. 25 is separated into an outer periphery region 134B11, an intermediate region 134B12, and an inner periphery region 134B13.

As shown, the outer periphery region 134B11 is formed in a region on an outer periphery-side, which includes an outer edge or an outer periphery of the film 134 most distant from a center C2 of the film 134, of the region 134B1 having the adhesive layer 116. The outer periphery region 134B11 is provided and at least a part thereof is bonded to the side surface of the wound binding tape 112, so that it is possible to suppress the film 134 from being bent. The outer periphery region may not be formed over an entire circumference of the outer edge or outer periphery, and may be formed to include only a part of the outer edge, for example. A width of the outer periphery region 134B11 is determined based on a material of the binding tape 112, a surface state, adhesion strength of an adhesive to be applied, tack strength, a pressure bonding load upon seal adhesion, and the like.

The inner periphery region 134B13 is formed in a region, which is close to an inner edge or an inner periphery of the film 134, of the region 134B1 having the adhesive layer 116. As shown, in the present modified embodiment, the region including the inner edge or inner periphery is formed with the region 134B2 in which an adhesive is not applied. At least a part of the inner periphery region 134B13 is bonded in a region of the end face 120D of the tube member 120 on the outer diameter-side, so that even though the binding tape 112 is used and a side surface area thereof is thus reduced, the film 134 can be suppressed from being detached from the binding tape 112. Also, when discarding, it is possible to suppress a troublesome of picking up the tube member such as a paper tube, which has been separated from the film and has fallen, and to discard the film 134 and the tube member 120 together. It is not necessarily required to provide the region 134B2, which is surrounded by the inner periphery region 134B13 and on which the adhesive layer is not applied. However, since the inner periphery of the film 134 is smaller than the inner periphery of the tube member 120, in a case where the film 134 protrudes beyond the inner wall surface of the tube member 120, when the region such as the region 134B2 on which the adhesive is not applied is formed, it is possible to suppress attachment and deposition of the adhesive on a mounting part when mounted to the binding machine.

In a plan view of FIG. 25, the inner periphery region is preferably formed over the entire circumference so as to surround the center C2.

The intermediate region 134B12 is formed in a spiral shape extending in an outer diameter direction from the center C2 and also extending in the circumferential direction so as to connect the outer periphery of the inner periphery region 134B13 and the inner periphery of the outer periphery region 134B11. The intermediate region 134B12 connects to the outer periphery of the inner periphery region 134B13 and the inner periphery of the outer periphery region 134B11. For this reason, a virtual circle having the center C2 as a center and larger than the inner periphery region 134B13 and smaller than the outer periphery region 134B11 always passes through the region 134B1 in which the adhesive is applied and the region 134B2 in which the adhesive is not applied, irrespective of diameters. For this reason, a part of one round of the binding tape 112 can be theoretically bonded to the region 134B1 in which the adhesive is applied. For this reason, it is possible to suppress the binding tape 112 from loosening. However, this does not prevent a case where one round of the binding tape 112 is not bonded to the region 134B1 due to uneven heights of the side surface of the binding tape 112. Also, it is possible to suppress a situation where the adhesive is excessively bonded to the binding tape 112 and hinders binding of the to-be-bound object.

In the present modified embodiment, the intermediate region 134B12 is formed so that a length of a circular arc, which passes through the region 134B1 in which the adhesive is applied, of the virtual circle larger than the inner periphery region 134B13 and smaller than the outer periphery region 134B11 is smaller than a length of a circular arc passing through the region 134B2 in which the adhesive is not applied. For this reason, it is possible to suppress the pull-out resistance of the binding tape 112 from excessively increasing.

In the present modified embodiment, the intermediate region 134B12 is formed so that as a diameter of the virtual circle larger than the inner periphery region 134B13 and smaller than the outer periphery region 134B11 increases, a ratio of the length of the circular arc passing through the region 134B2 in which the adhesive is not applied to the length of the circular arc passing through the region 134B1 in which the adhesive is applied increases. For this reason, it is possible to suppress the pull-out resistance from increasing as the binding tape 112 is used and the distance to the center C2 thus decreases.

In a plan view of FIG. 25, the intermediate region 134B12 may be formed so that a line segment connecting the outer periphery region 134B11 and the inner periphery region 134B13 on a straight line passing through the center C2 includes the region in which the adhesive is applied, i.e., the intermediate region 134B12, irrespective of angles. According to this configuration, since the film 134 and the binding tape 112 can be bonded in all directions, the binding machine can stably grip the film 134. It is also possible to suppress the binding tape 112 from loosening.

Note that, the intermediate region 134B12 is preferably formed in one-third region, more preferably one-half region of a range from the inner periphery to the outer periphery of the film 134. The inner periphery region 134B13, the outer periphery region 134B11, the intermediate region 134B12 may also be separated from each other. The intermediate region 134B12 may also be formed by a plurality of regions separated from each other. For example, the intermediate region 134B12 may be formed by a plurality of circular regions separated from each other.

Note that, in the present modified embodiment, the inner periphery region 134B13 is an example of the first part of the first member. The outer periphery region 134B11 and the intermediate region 134B12 are examples of the second part of the first member. The region 134B2 in which the adhesive is not applied is an example of the non-adhesion part of the first member.

The intermediate region 134B12 includes an example of the first circular arc part. The region 134B2 in which the adhesive is not applied is an example of the second circular arc part. The intermediate region 134B12 includes a plurality of first circular arc parts because it includes circular arcs on the virtual circle including the first part therein for a plurality of virtual circles having different diameters. The region 134B2 in which the adhesive is not applied includes a plurality of second circular arc parts because it includes circular arcs on the virtual circle including the first part therein for a plurality of virtual circles having different diameters.

Figure 27:
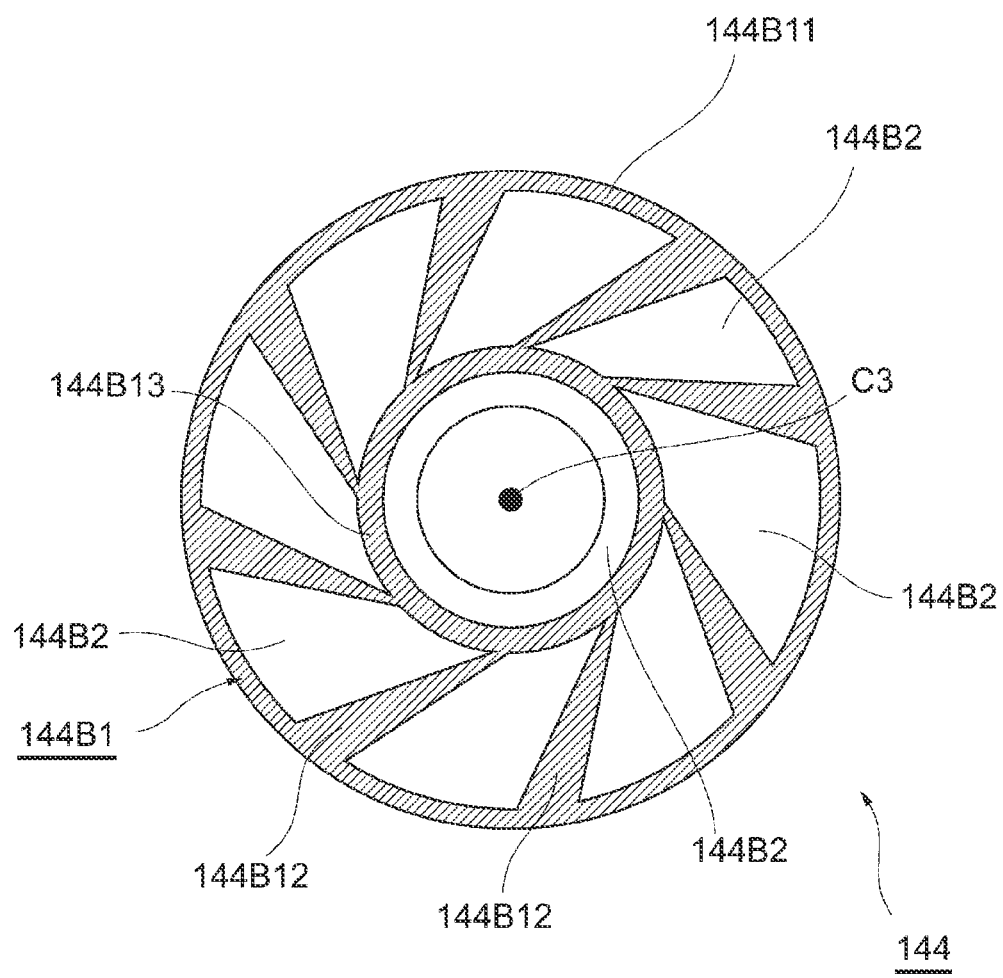
FIG. 27 is a plan view of a film 144.

FIG. 27 is a plan view of a film 144 (an example of the "first member") in accordance with a modified embodiment of the film 114. A surface of the film 144 facing the side surface of the binding tape 112 is formed with a region 144B1 in which an adhesive is applied to provide the adhesive layer 116, and a region 144B2 in which an adhesive is not applied.

As shown in FIG. 27, an outer periphery region 144B11 of the region 144B1 is formed similarly to the outer periphery region 134B11, and an inner periphery region 144B13 is formed similarly to the inner periphery region 134B13. Therefore, the detailed descriptions thereof are omitted.

An intermediate region 144B12 is formed to extend in the outer diameter direction from a center C3 and also extending in the circumferential direction so as to connect an outer periphery of the inner periphery region 144B13 and an inner periphery of the outer periphery region 144B11. Also, the intermediate region 144B12 is configured by seven separated small regions that are rotationally symmetric with respect to the center C3.

Also in this configuration, a virtual circle having the center C3 as a center and larger than the inner periphery region 144B13 and smaller than the outer periphery region 144B11 always passes through the region 144B1 in which the adhesive is applied and the region 144B2 in which the adhesive is not applied, irrespective of diameters. For this reason, it is possible to suppress the binding tape 112 from loosening.

The intermediate region 144B12 is formed so that a length of a circular arc, which passes through the region 144B1 in which the adhesive is applied, of the virtual circle larger than the inner periphery region 144B13 and smaller than the outer periphery region 144B11 is smaller than a length of a circular arc passing through the region 144B2 in which the adhesive is not applied. For this reason, it is possible to suppress the pull-out resistance of the binding tape 112 from excessively increasing. Preferably, 60% to 70% of a circumference of the virtual circle passes through the region 144B2 in which the adhesive is not applied and 30% to 40% passes through the intermediate region 144B12 in which the adhesive is applied.

In the present modified embodiment, as a diameter of the virtual circle larger than the inner periphery region 144B13 and smaller than the outer periphery region 144B11 increases, the length of the circular arc passing through the region 144B1 in which the adhesive is applied increases. For this reason, it is possible to suppress the pull-out resistance from increasing as the binding tape 112 is used and the distance to the center C3 thus decreases.

Note that, in the present modified embodiment, the intermediate region 144B12 is an example of the plurality of parts of the first member that are bonded to the side surface of the binding tape. The region 144B2 in which the adhesive is not applied is an example of the non-adhesion part of the first member.

Fourth Embodiment

Figure 28A:
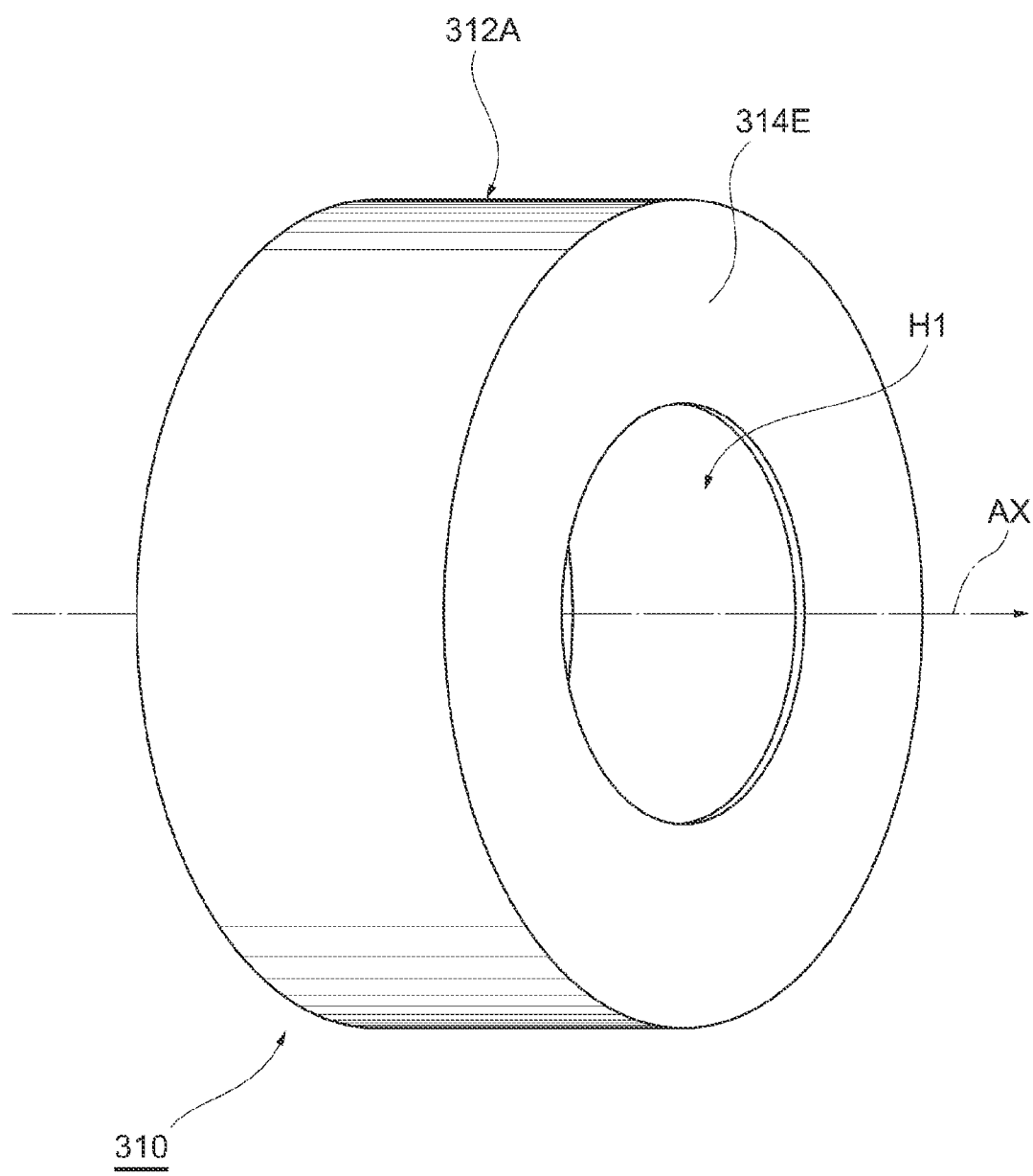
FIG. 28A is a perspective view of a reel 310.
Figure 28B:
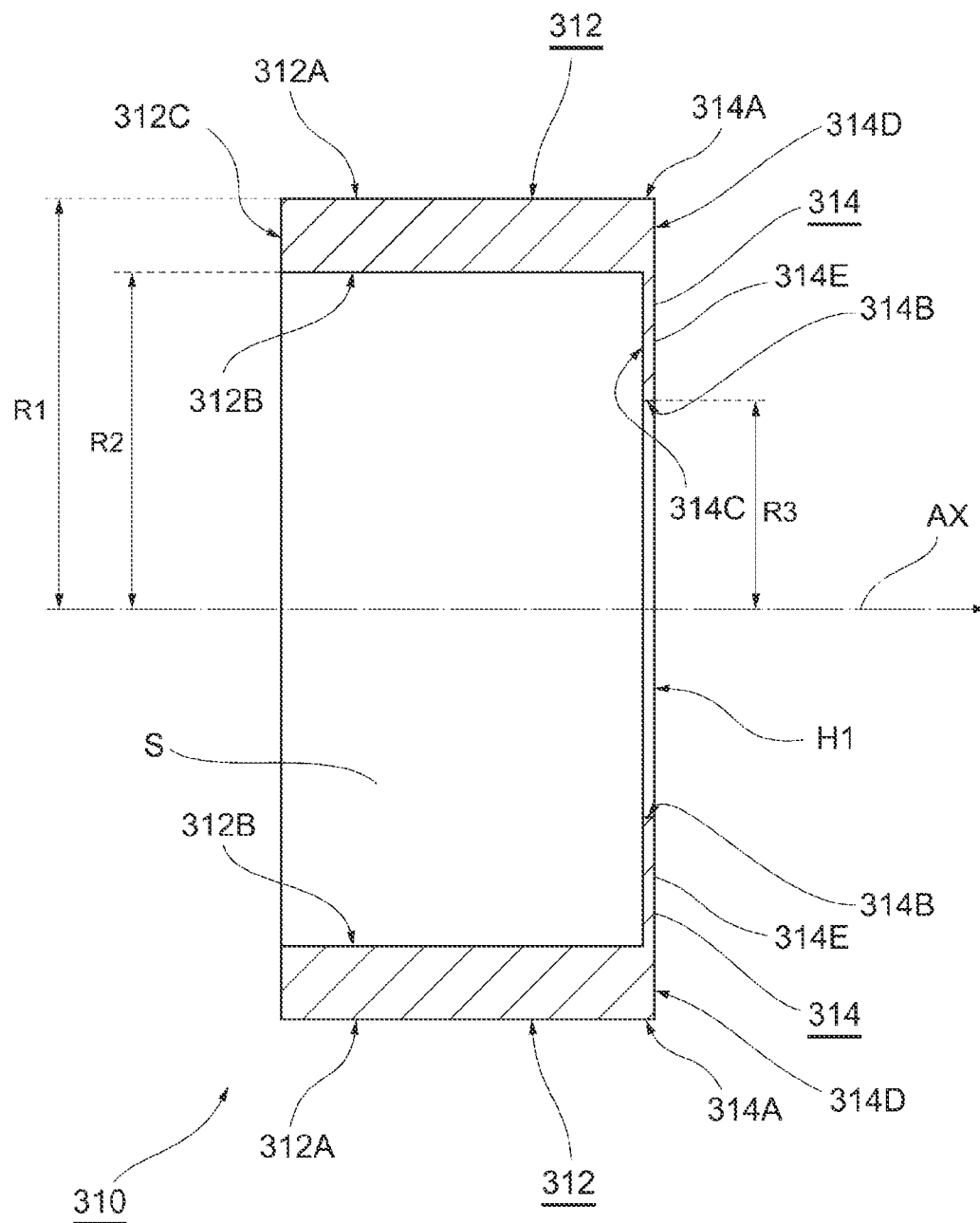
FIG. 28B is a sectional view of the reel 310.

FIG. 28A is a perspective view of a reel 310 in accordance with a fourth embodiment, and FIG. 28B is a sectional view taken along a plane including the axis center AX of the reel 310.

As shown in FIGS. 28A and 28B, the reel 310 includes a cylindrical tube member 312, and a protrusion 314 extending on one end face-side of the tube member 312 toward the axis center AX-side of the tube member 312. In the present embodiment, the tube member 312 and the protrusion 314 are integrally provided.

An outer peripheral surface 312A of the tube member 312 is formed as a cylindrical surface of a radius R1 having the axis center AX as a center. An inner wall surface 312B of the tube member 312 is formed as a cylindrical surface of a radius R2 having the axis center AX as a center. An end face 312C connecting the outer peripheral surface 312A and the inner wall surface 312B is formed at one end portion in the direction of the axis center AX. The other end portion in the direction of the axis center AX is formed with the protrusion 314. A space S is a hollow space surrounded by an inner wall surface 312B of the tube member 312. The tube member 312 is a winding core for winding a binding tape 420, and may be a paper tube formed of paper such as paper board or may also be formed of plastic such as resin.

The protrusion 314 extends on one end face-side of the tube member 312 toward the axis center AX of the tube member 312. The protrusion 314 is formed in a circular ring shape having an outer peripheral part 314A of the radius R1 having the axis center AX as a center, an inner peripheral part 314B of a radius R3 having the axis center AX as a center, an end face 314C facing toward the tube member 312-side, and an end face 314D facing toward the direction of the axis center AX in an opposite direction to the end face 312C. The outer peripheral part 314A is formed to be flush with the outer peripheral surface 312A of the tube member 312. On the other hand, the radius R3 of the inner peripheral part 314B is smaller than the radius R2 of the inner wall surface 312B of the tube member 312. For this reason, the protrusion 314 has a rib portion 314E protruding from the inner wall surface 312B of the tube member 312 toward the axis center AX. An amount of protrusion of the rib portion 314E from the inner wall surface 312B is indicated by a difference between the radius R2 and the radius R3. As shown, in the present embodiment, the rib portion 314E has a circular ring shape having the axis center AX as a center. At a central part through which the axis center AX passes, a circular hole H1 surrounded by the rib portion 314E and communicating with the space S is formed.

Figure 29A:
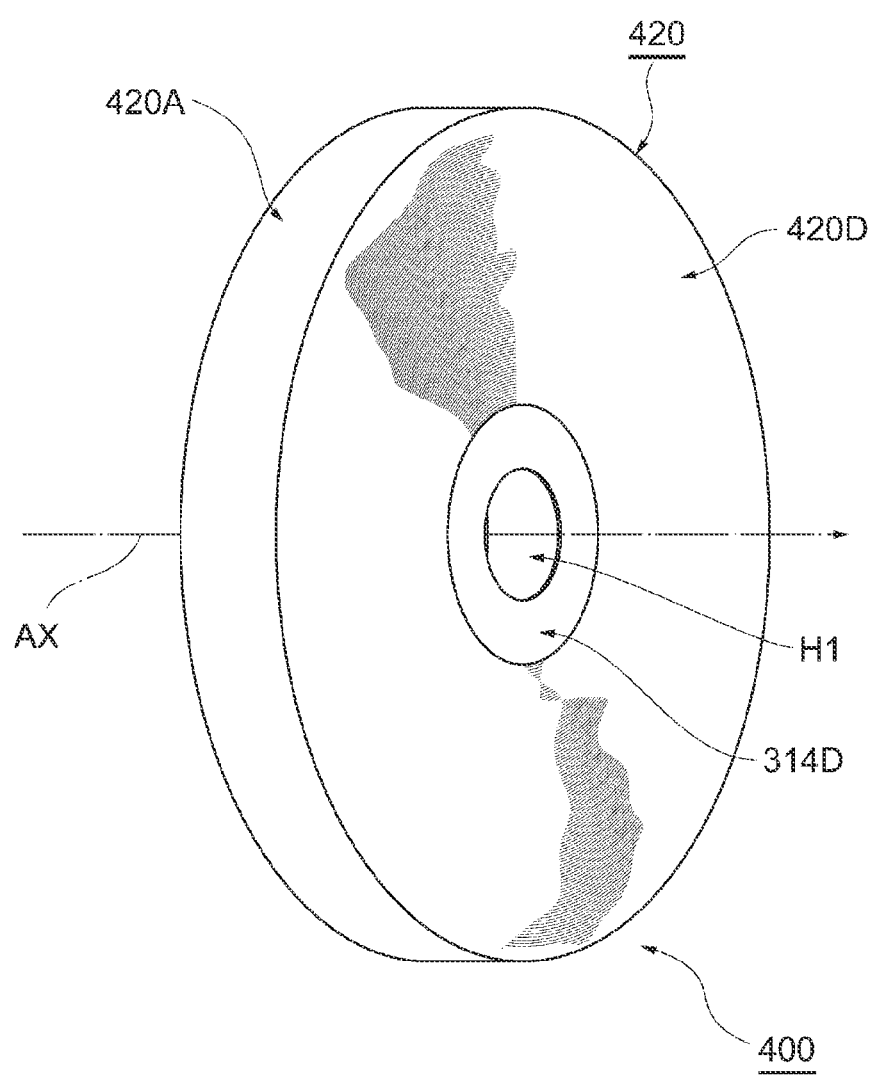
FIG. 29A is a perspective view of a reel 400.

FIG. 29A is a perspective view of a reel 400 where the binding tape 420 is wound on the reel 310, as seen from the end face 314D-side of the protrusion 314. Note that, in the below, a reel on which a binding tape is wound is referred to as a reel 400, a reel 400A and the like, and a reel on which a binding tape is not wound is referred to as a reel 310, a reel 310A and the like so as to identify both the reels.

Figure 29B:
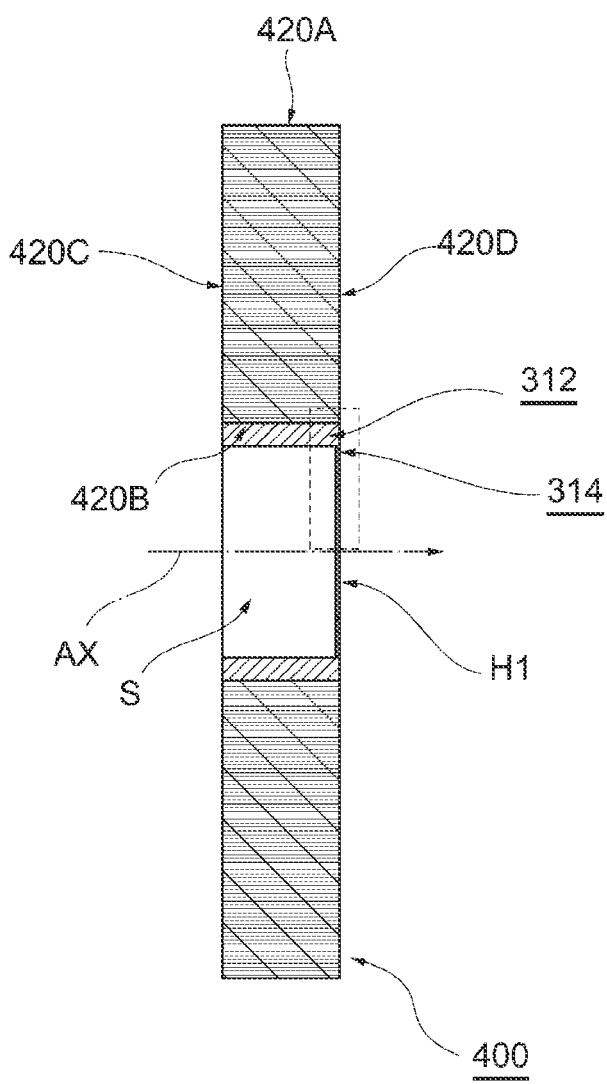
FIG. 29B is a sectional view of the reel 400.
Figure 29C:
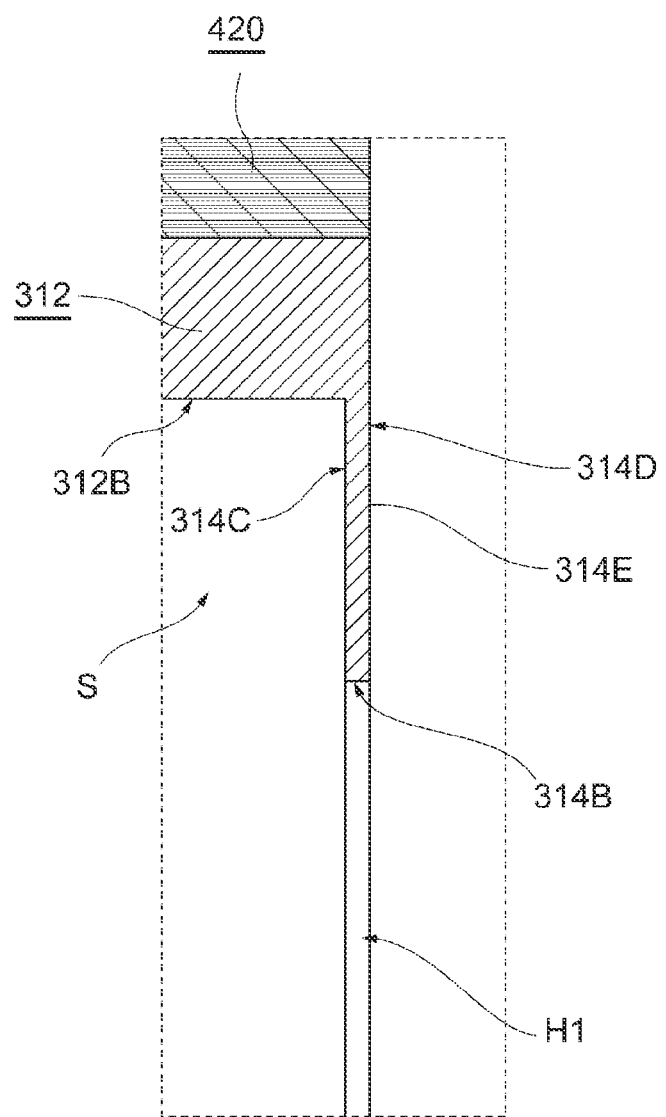
FIG. 29C is a partially enlarged view of the reel 400.

FIG. 29B is a sectional view of the reel 400 taken along a plane including the axis center AX. FIG. 29C is a partially enlarged view of the vicinity of the rib portion 314E. Note that, the reel 310 shown in FIG. 29A and the like is different from the reel 310 shown in FIG. 28A and the like, in that the size and the like of the rib portion 314E are different, but have the same functions, so that the same reference signs are denoted and the descriptions thereof are omitted. In the other drawings, even for the constitutional elements having a different size and the like, those having the same functions are denoted with the same reference signs and the descriptions thereof are omitted.

The binding tape 420 is wound on the outer peripheral surface 312A of the tube member 312 so that a surface 420B faces toward the axis center AX and a surface 420A on an opposite side faces toward the outer diameter direction. The binding tape 420 is wound, so that one side surface 420C facing toward the direction of the axis center AX and the other side surface 420D facing toward the direction of the axis center AX on an opposite side are formed. As shown in FIG. 29B, in the present embodiment, since a length of the reel 310 in the direction of the axis center AX and a width of the binding tape 420 are substantially the same, the side surface 420C and the end face 312C are substantially flush with each other. Similarly, the side surface 420D and the end face 314D of the protrusion 314 are substantially flush with each other.

The sizes of the constitutional components of the reel 400 can be designed as appropriate according to uses. For example, the length of the tube member 312 in the direction of the axis center AX may be set to 5 to 15 mm, the radius R2 of the inner wall surface 312B may be set to 5 to 15 mm, and a radius of the outer peripheral surface 312A may be set to 7.5 to 20 mm. Also, the width of the binding tape 420 may be set to 5 to 15 mm, a thickness may be set to 0.05 to 0.4 mm, a length may be set to 10 to 40 m, and a radius may be set to 50 to 60 mm, for example, when wound. A thickness of the protrusion 314 in the direction of the axis center AX may be set to 1 mm or smaller, for example. The amount of protrusion of the rib portion 314E from the inner wall surface 312B toward the axis center AX, i.e., a difference between the radius R2 and the radius R3 may be set to 1 mm or larger, for example. The protrusion 314 is preferably flexible.

Figure 30:
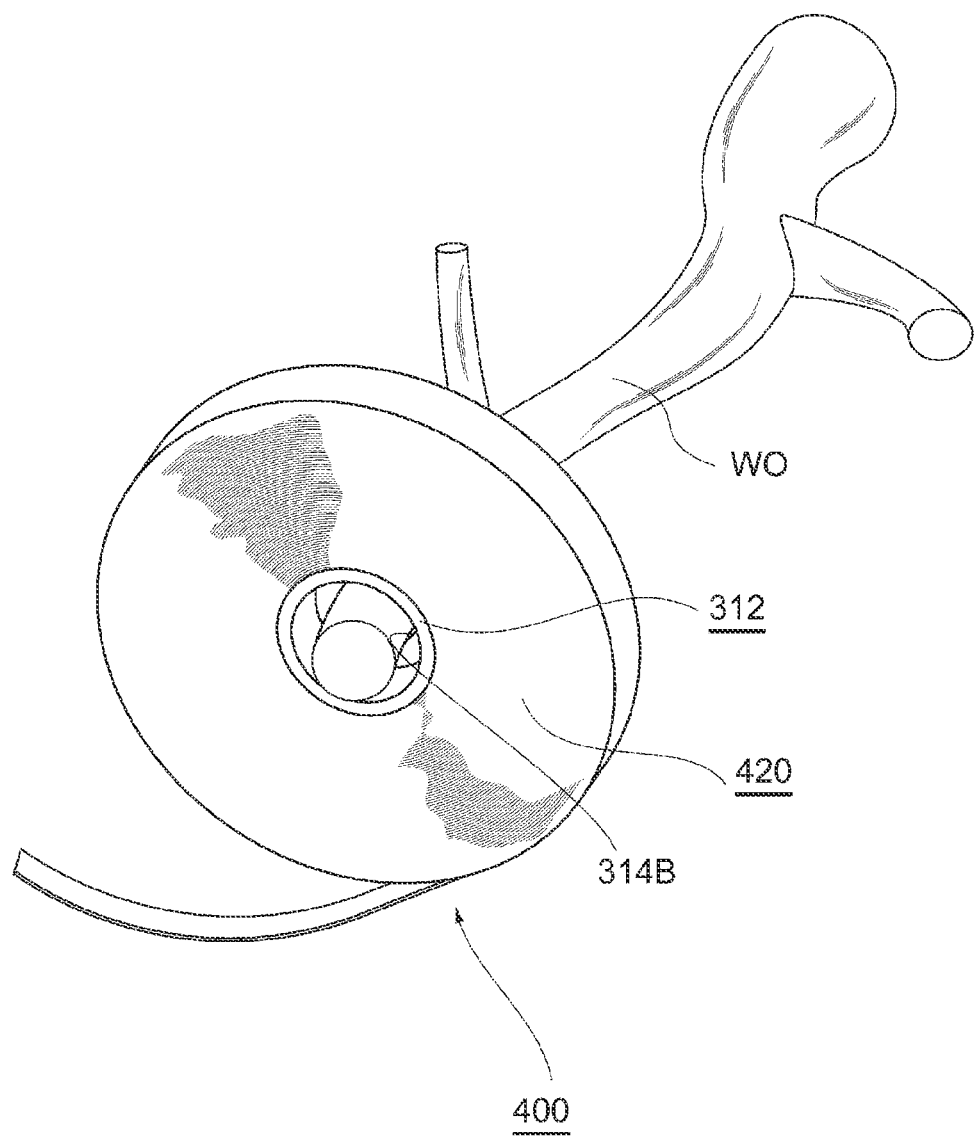
FIG. 30 is a pictorial view depicting a using aspect of the reel 400.

FIG. 30 depicts an aspect where a to-be-bound object is bound using the reel 400 with a hand. As shown in FIG. 30, it is possible to pull out the binding tape 420 while rotating the reel 400 about the axis center AX by supporting the reel 400 with a tree branch WD, which is a core rod, a stanchion or the like so as to penetrate the region S surrounded by the inner wall surface 312B of the tube member 312 and the hole H1.

Figure 31A:
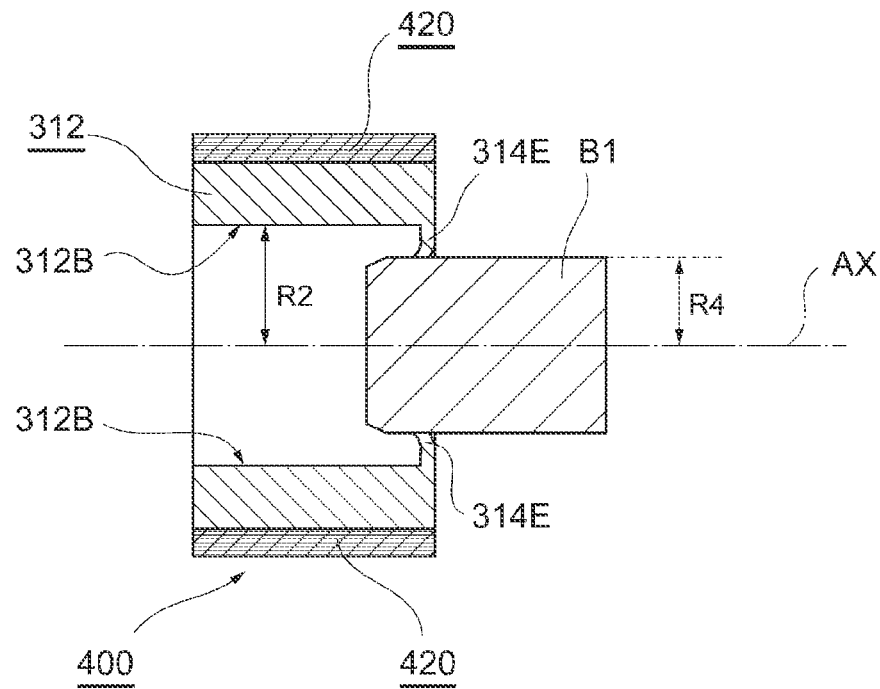
FIG. 31A is a sectional view depicting an aspect where the reel 400 is supported.
Figure 31B:
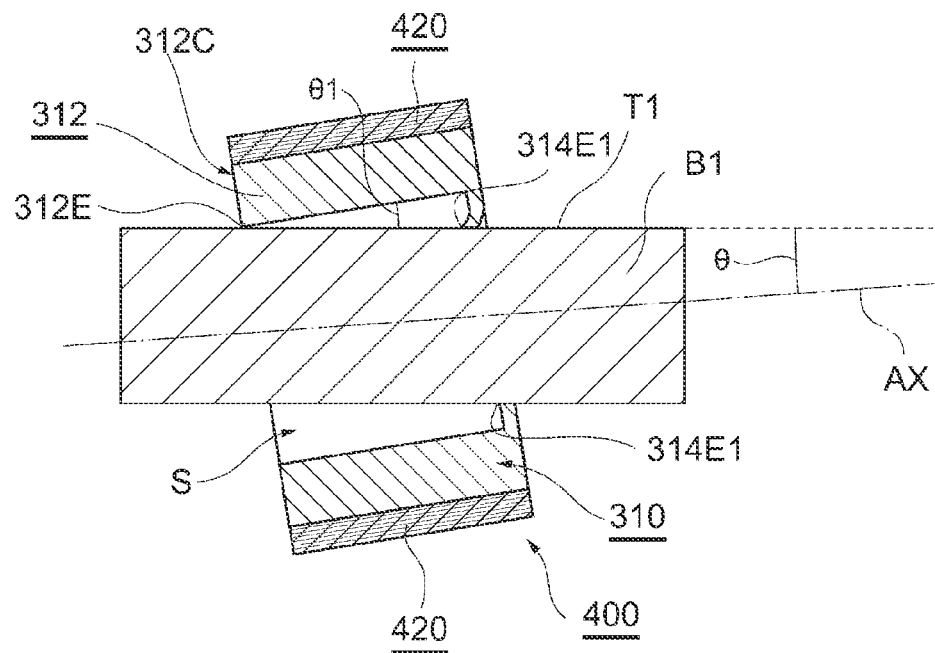
FIG. 31B is a sectional view depicting an aspect where the reel 400 is supported.

FIGS. 31A and 31B are pictorial views depicting a use aspect where the reel 400 is supported by the cylindrical core rod B1 to penetrate the region S surrounded by the inner wall surface 312B of the tube member 312 and the hole H1. FIG. 31A is a sectional view taken along a plane including the axis center AX while the reel 400 is moved rightward in FIG. 31A with respect to the core rod B1 so that the core rod B1 penetrates the region S and the hole H1. FIG. 31B is a sectional view taken along a plane including the axis center AX, depicting a state where the core rod B1 penetrating the region S and the hole H1 supports the reel 400.

As shown in FIG. 31A, in a case where a radius R4 of the core rod B1 is larger than the radius R3 of the inner peripheral part 314B, the core rod B1 is contacted to a tip end of the rib portion 314E. Even in a case where the radius R4 of the core rod B1 is equal to or smaller than the radius R3 of the inner peripheral part 314B, when moving relatively the core rod so that an axis center of the core rod B1 is not concentric with the axis center AX, the core rod B1 may contact the tip end of the rib portion 314E. However, since the tip end of the rib portion 314E is a free end, it can be deformed as shown in FIG. 31A. For this reason, the core rod B1 penetrate the region S and the hole H1. In a state where the reel 400 is supported by the core rod B1 penetrating the region S and the hole H1, the tube member 312 is tilted due to own weights of the binding tape 420 and the tube member 312, as shown in FIG. 31B. For this reason, in a cross section taken along a plane including the axis center AX, a tangential line T1 (FIG. 31B) that penetrates the region S and the hole H1 and is in contact with both end portions of the reel 310 in the direction of the axis center AX is tilted with respect to the axis center AX. Specifically, the tangential line T1 is in contact with the reel 310 at two points of a tip end point 314E1 of the rib portion 314E that is one tip end and an end point 312E of the inner wall surface 312B that is an end portion on the end face 312C-side. Since the reel 400 can be supported at the two points spaced in the direction of the axis center AX by the core rod B1 in this way, it is possible to stably support the reel, as compared to a case where the rib portion 314E is not provided and a contact place with the core rod B1 is not constant. In particular, since the reel 400 is tilted with respect to the core rod B1 and large moment is thus applied from the tip end point 314E1 toward the core rod B1 by a weight of the binding tape 420 on the lower side in FIG. 31B, the reel 400 can be suppressed from moving in the axis center direction of the core rod B1. Also, the rib portion 314E having a free end is slightly bent to press the core rod B1, so that the reel 400 is suppressed from moving in the direction of the axis center AX. Since the rib portion 314E is bent in the insertion direction of the core rod B1, the check effect of making it difficult for the core rod B1 to detach is exhibited, so that the reel 400 is difficult to separate from the core rod B1.

Note that, in a case where the width of the tube member 312 in the direction of the axis center AX is 5 to 15 mm, an amount of protrusion of the rib portion 314E is preferably 1 mm or greater, i.e., 6.6% or greater of the width. At this time, in a cross section including the axis center AX, an angle θ between the tangential line T1 and a straight line including the axis center AX is 3.8° or greater. Note that, in a case where the inner wall surface 312B of the tube member 312 and the axis center AX are provided parallel to each other in the cross section, an angle θ1 between the tangential line T1 and the inner wall surface 312B is the same as the angle θ. If the protruding amount of the rib portion 314E is smaller than the above, it may be difficult to support the reel at the two support points spaced in the direction of the axis center AX when a surface of the core rod B1 has an unevenness of about 1 mm or when the unevenness of the surface has an inclination of about 3°. Also, when the width of the tube member 312 in the direction of the axis center AX is 5 to 15 mm, the protruding amount of the rib portion 314E is preferably 50% or less of the width. In this case, the angle θ is 26.5° or smaller. If the protruding amount becomes larger, the reel 400 may fall down due to a weight of the binding tape 420, in some cases.

A direction in which the rib portion 314E is bent may be different depending on the penetration method of the core rod B1. For example, when inserting the core rod B1 from the end face 312C-side for penetration, the rib portion 314E is highly likely to be bent outwardly. Even in this case, the reel 400 can be stably supported in a similar manner. When the rib portion 314E is bent outwardly, the check effect of making it difficult for the core rod B1 to detach from the end face 312C-side is exhibited, so that the reel 400 is difficult to separate from the core rod B1.

As described above, according to the reel 310 of the present embodiment, since the reel can be supported at the two points of the rib portion 314E formed on one end-side in the direction of the axis center AX and the tube member 312 formed on the other end-side by the core rods of diverse diameters, the reel can be stably supported, as compared to a case where the rib portion 314E is not provided and the contact place with the core rod is not thus constant.

Note that, in a case where the radius R4 of the core rod B1 is larger than the radius R3 of the inner peripheral part 314B (FIG. 28B), since the entire circumference of the inner peripheral part 314B is contacted to the core rod B1, the reel 400 can be more stably supported. For the more stable support, the amount of protrusion of the rib portion 314E is preferably set to 1 mm or greater.

Note that, the outer peripheral surface 312A is not necessarily required to have the cylindrical surface as long as it has a surface on which the binding tape can be wound. Also, the inner wall surface 312B may not be the cylindrical surface. For example, an unevenness may be formed on the surface. Therefore, the tube member 312 may be formed to have a tubular shape.

Modified Embodiment 7

FIGS. 32A to 32D depict a modified embodiment of the reel 400 of the fourth embodiment, and are all sectional views including the axis center AX of the tube member 312. Note that, the overlapping descriptions of the constitutional elements that perform the similar functions are omitted by using the similar reference signs, even when the sizes and the like are different.

Figure 32A:
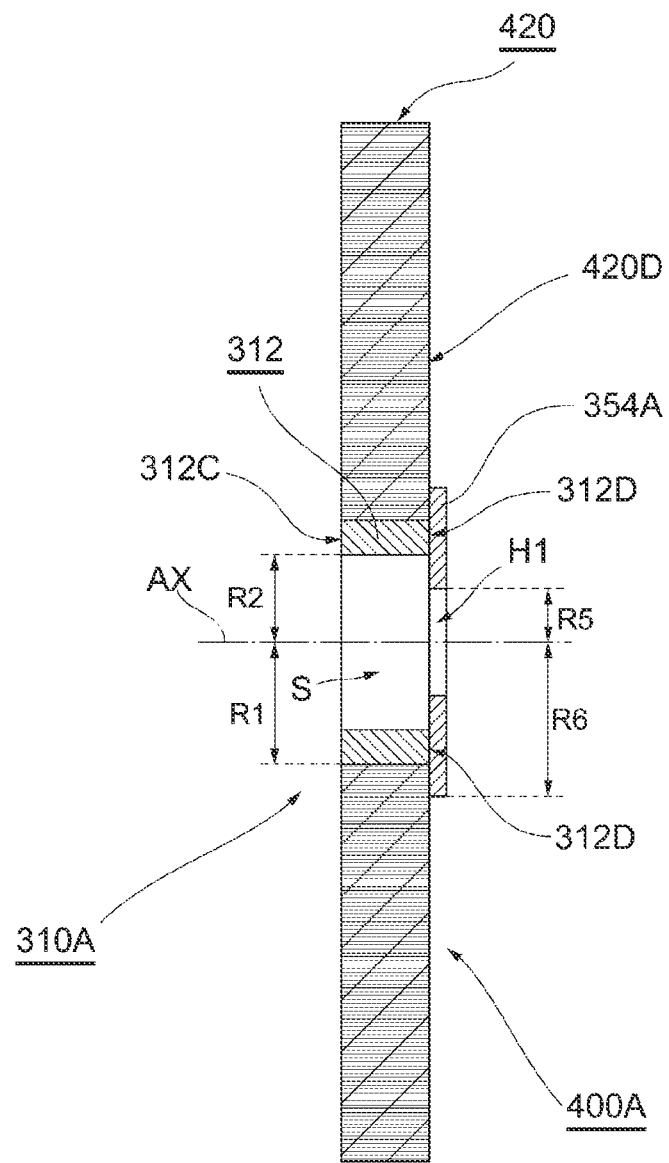
FIG. 32A depicts a first modified embodiment of the reel 400.

FIG. 32A depicts a reel 400A in accordance with a first modified embodiment. The reel 400A includes a tube member 312, and a film 354A (an example of the "first member") as a protrusion extending on one end face-side of the tube member 312 toward the axis center AX of the tube member 312.

The film 354A has a circular ring shape where an inner periphery has a radius R5 and an outer periphery has a radius R6, and is arranged concentrically with the axis center AX of the tube member 312. The radius R5 of the inner periphery of the film 354A is smaller than the radius R2 of the inner periphery of the tube member 312. For this reason, the inner periphery part of the film 354A has a portion protruding from the inner wall surface 312B of the tube member 312 toward the axis center AX. The radius R6 of the outer periphery of the film 354A is larger than the radius R1 of the outer periphery of the tube member 312. A surface of the film 354A is bonded to parts of the circular ring-shaped end face 312D of the tube member 312 and the side surface 420D of the binding tape 420 by an adhesive layer having an adhesive as a main component.

Even for a reel 310A, the film 354A has the portion protruding from the inner wall surface 312B of the tube member 312 toward the axis center AX. Therefore, the reel can be supported with being tilted by core rods of diverse diameters at two points of one end portion and the other end portion in the direction of the axis center AX. Also, since the surface of the film 354A is bonded to the side surface 420D of the binding tape 420, the binding tape 420 can be suppressed from loosening when pulled out. Also, the tube member 312 and the film 354A can be formed of different materials. For example, when the film 354A is formed of plastic and the tube member 312 is formed of paper, the protruding portion required to have durability can be formed of plastic.

Figure 33A:
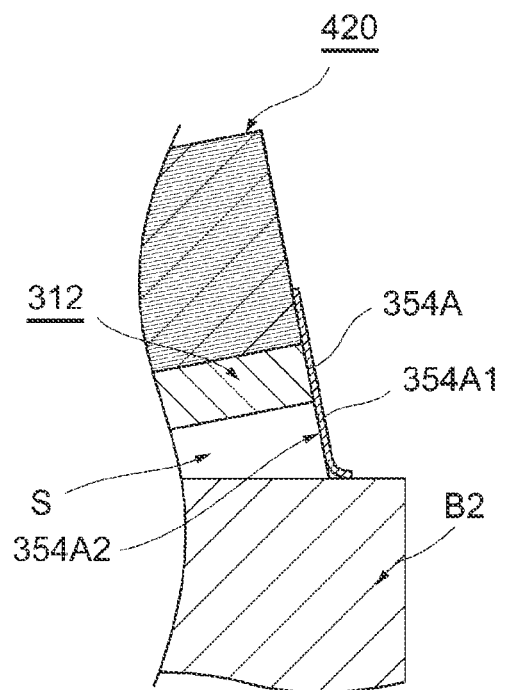
FIG. 33A is a sectional view depicting an aspect where a reel of a modified embodiment is supported.

An effect that is realized when an adhesive is applied on a surface 354A2, which faces toward the tube member 312, of a protruding rib portion 354A1 of the film 354A is described with reference to FIG. 33A. When the core rod B2 is inserted from the end face 312C-side, the rib portion 354A1 of the film 354A is bent outwardly. Here, the surface 354A2 of the rib portion 354A1 on the tube member 312-side is enabled to face the core rod B2 due to the bending. For this reason, it is possible to stably support the reel 400A. Since the tube member 312 is rotated as the binding tape 420 is pulled out, the adhesive applied on the surface 354A2 of the rib portion 354A1 on the space S-side is gradually worn, the reel 400A can be more stably supported. Note that, the adhesive may be stacked on the film 354A or may be sprayed on the surface 354A2 of the film 354A, for example.

Figure 32B:
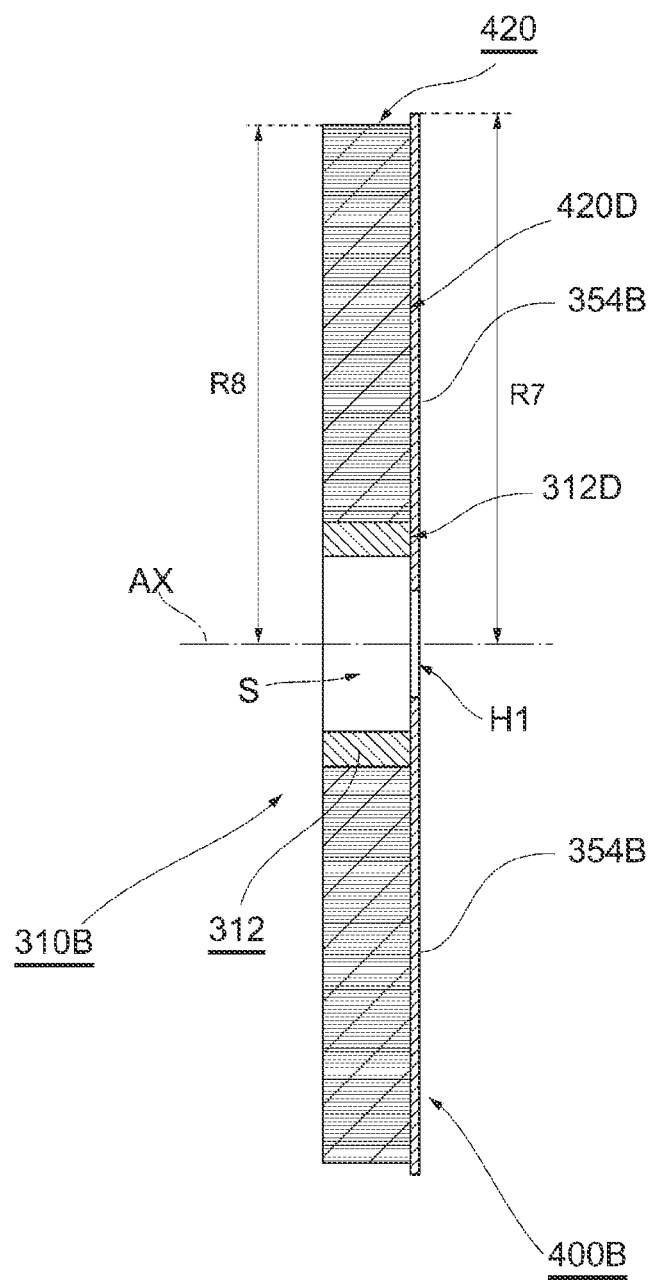
FIG. 32B depicts a second modified embodiment of the reel 400.

FIG. 32B depicts a reel 400B in accordance with a second modified embodiment. The reel 400B is different from the reel 400A of the first modified embodiment, in that a film 354B (an example of the "first member") is formed to have a circular shape where a radius R7 of an outer periphery is larger than a radius R8 of an outer periphery of the binding tape 420, so as to face the entire side surface 420D of the binding tape 420.

The reel 400B can also be supported with being tilted at two points spaced in the direction of the axis center AX by the core rod because a rib portion 354E protruding toward the axis center AX is formed. Also, since the surface of the film 354B is bonded to the entire side surface 420D of the binding tape 420, the binding tape 420 can be suppressed from loosening when pulled out. Also, in a case when the reel 400B is kept during use, the outer peripheral end portion of the binding tape 420 can be bonded and fixed to the surface of the exposed film 354B. Note that, the film 354B may also be formed to have a polygonal shape such as a rectangular shape, other than the circular ring shape. In this case, a distance between an apex of a polygon and the axis center AX is preferably at least a half or greater of the radius R8, and is more preferably the radius R8 or greater.

Figure 32C:
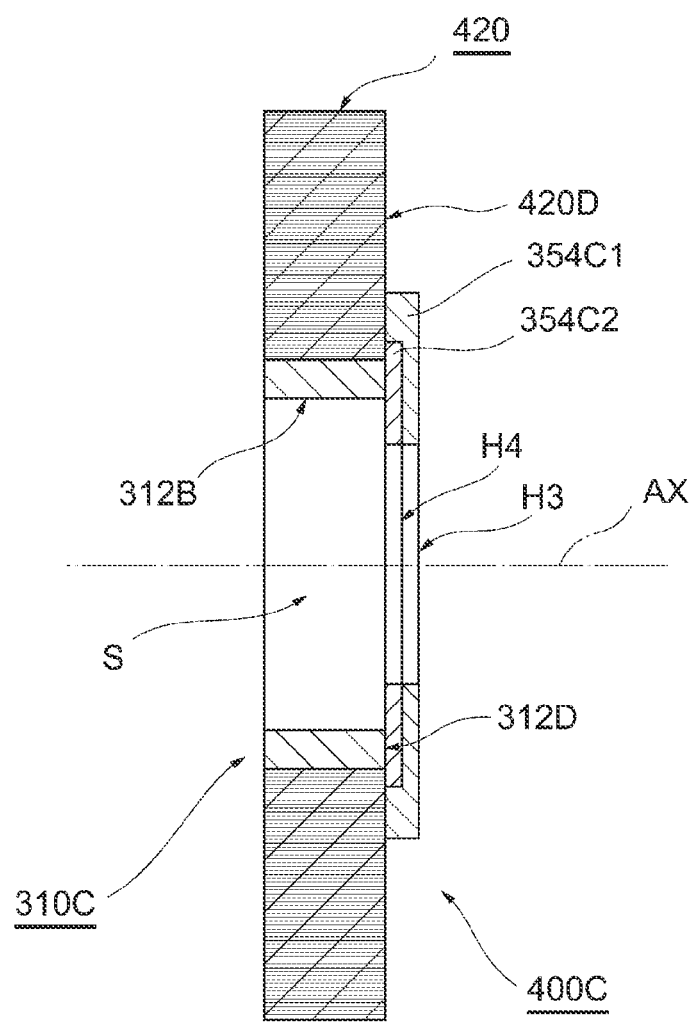
FIG. 32C depicts a third modified embodiment of the reel 400.

FIG. 32C depicts a reel 400C in accordance with a third modified embodiment. The reel 400C is different from the reel 400A of the first modified embodiment, in that two films of a film 354C1 (an example of the "first member") and a film 354C2 (an example of the "second member") protrude from the inner wall surface 312B of the tube member 312. The film 354C1 is an annular film body, and an adhesive (not shown) is applied on one surface thereof. A part of the surface facing the side surface 420D of the binding tape 420 is bonded to the side surface 420D of the binding tape 420 by the adhesive, and the other part is bonded to the surface facing the film 354C2. A central part of the film 354C1 is formed with a circular hole H3 having a radius smaller than the radius of the inner wall surface 312B of the tube member 312.

The film 354C2 is sandwiched between the film 354C1 and the side surface 420D of the binding tape 420. In the present modified embodiment, the film 354C2 is a substantially annular film body, and has an outer diameter larger than the outer diameter of the tube member 312. A central part of the film 354C2, including a center, is formed with a substantially circular hole H4. A radius of the hole H4 of the film 354C2 is formed to be smaller than the radius of the inner wall surface 312B of the tube member 312, and is substantially the same as the radius of the hole H3 of the film 354C1. For this reason, in a cross section including the axis center AX, the hole H3 and the hole H4 communicate with the region S surrounded by the inner wall surface of the tube member 312. Also, an end portion of the film 354C1 on an inner diameter-side and an end portion of the film 354C2 on an inner diameter-side become protrusions protruding from the inner wall surface 312B of the tube member 312. Note that, the film 354C2 is formed of a non-adhesive paper material or plastic, and is bonded to the film 354C1 whose surface is applied with the adhesive, but is not bonded to the binding tape 420 and the tube member 312.

The reel 400C can also be supported at two spaced points by the core rods of diverse diameters. Since the adhesive on the film 354C1 is not exposed by the film 354C2, it is possible to smoothly rotate the reel 400C without attaching an adhesive on the core rod, when using the reel for winding the binding tape 420 at high speed, for example. Also, when the film 354C2 is formed of plastic that is expensive but is hard and the film 354C1 is formed of inexpensive paper on which an adhesive is applied, it is possible to improve durability of the protrusion and to save the cost.

Figure 32D:
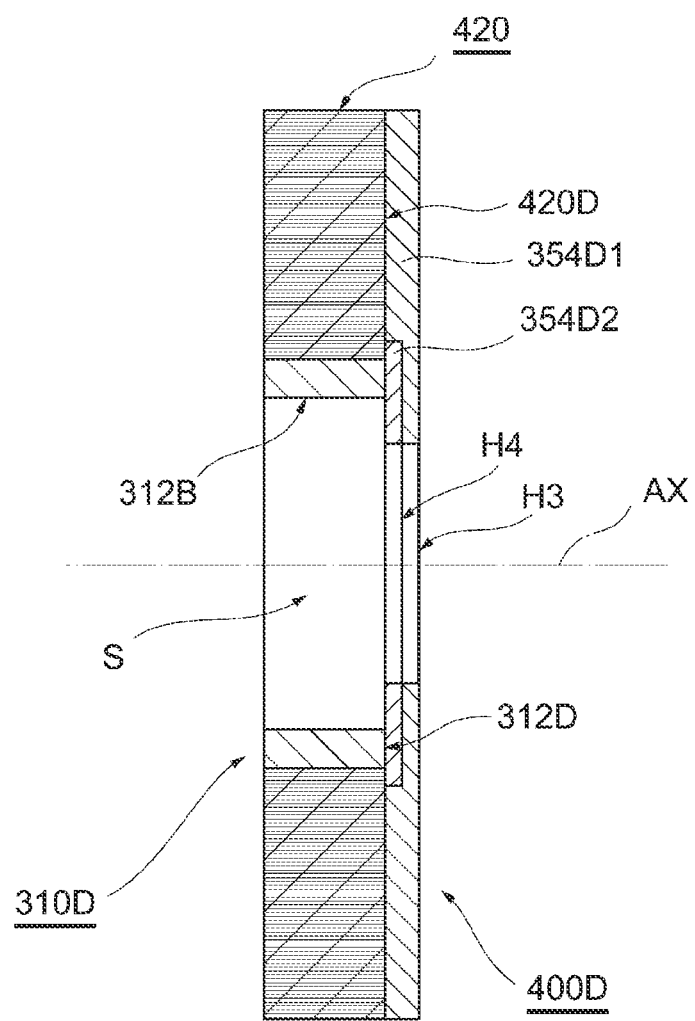
FIG. 32D depicts a fourth modified embodiment of the reel 400.

FIG. 32D depicts a reel 400D in accordance with a fourth modified embodiment. The reel 400D is different from the reel 400C of the modified embodiment, in that a film 354D1 (an example of the "first member") is formed in an annular shape so as to face the entire side surface 420D of the binding tape 420. The reel 400D can also be supported with being tilted by the core rod at the two points spaced in the direction of the axis center AX. Since a surface of the film 354D1 is also bonded to the outer periphery-side of the side surface 420D of the binding tape 420, the binding tape 420 can be suppressed from loosening when pulled out. Note that, at least one of the film 354D1 and the film 354D2 (an example of the "second member") may also be formed to have a polygonal shape such as a rectangular shape. The descriptions of the other overlapping effects are omitted.

Figure 33B:
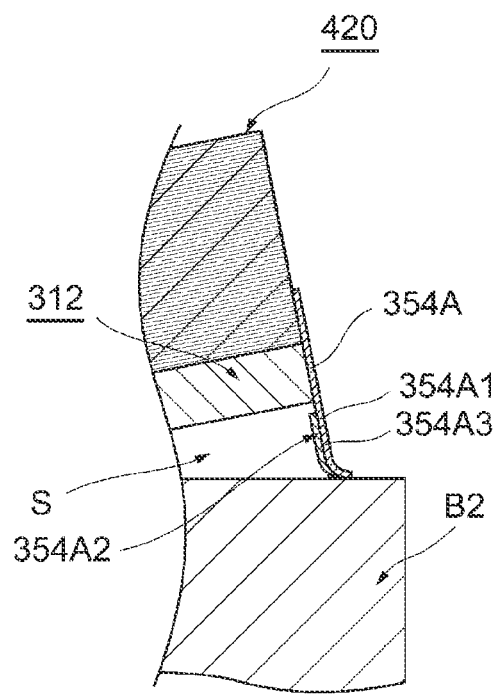
FIG. 33B is a sectional view depicting an aspect where a reel of a modified embodiment is supported.

Note that, when forming a protrusion from films of two or more layers, as shown in FIG. 33B, the surface 354A2 of the film 354A facing toward the tube member 312 may be applied with an adhesive and bonded to an end face of the tube member 312 and to a different film 354A3. Also in this aspect, the film 354A3 that is likely to wear can be formed of a material having high durability such as plastic, thereby reinforcing the protrusion. Since the film 354A3 is provided in the space S surrounded by the inner wall surface 312B of the tube member 312, it is possible to reduce a size of the reel in the direction of the axis center AX.

Figure 32E:
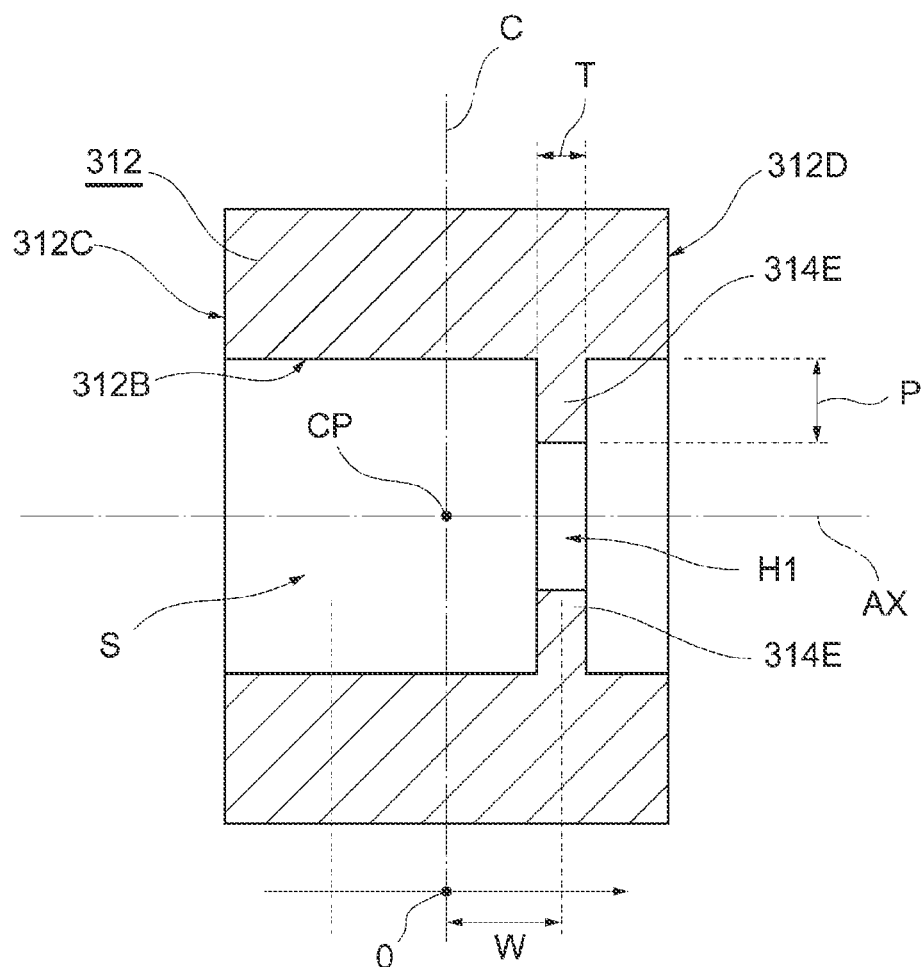
FIG. 32E is a pictorial view depicting an aspect and each size of the reel.
Figure 32F:
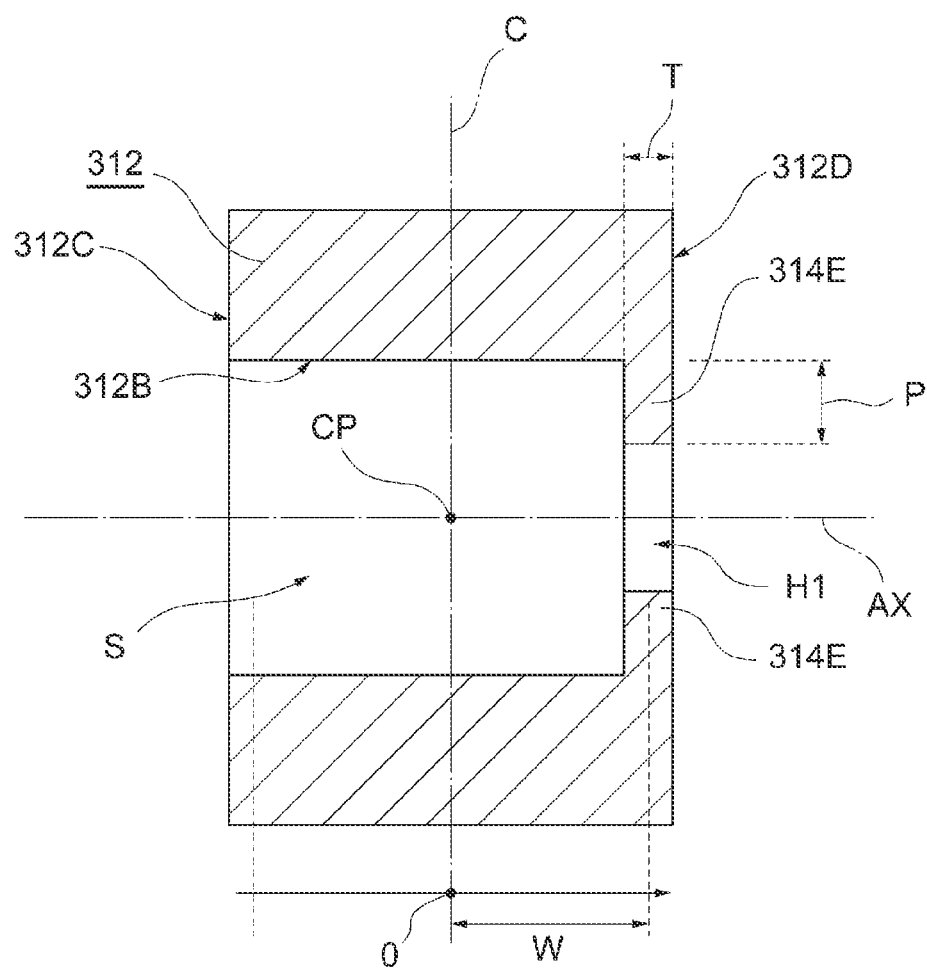
FIG. 32F is a pictorial view depicting an aspect and each size of the reel.

FIGS. 32E to 32F are all sectional views including the axis center AX of the tube member 312, depicting additional aspects of the reel 400. Note that, the overlapping descriptions of the constitutional elements that perform the similar functions are omitted by using the similar reference signs, even when the sizes and the like are different.

FIG. 32E depicts an aspect of a reel where a forming position of the rib portion 314E is different from the above aspects in a case where the tube member 312 and the rib portion 314E are integrally formed. A length of the reel and the tube member 312 in the direction of the axis center AX, i.e., a distance between the end face 312C and the end face 12D is, for example, 15 mm.

In the sectional view, a central line C is a straight line that passes a center position CP on the axis center AX of the tube member 312 in the direction of the axis center AX and is perpendicular to the axis center AX. A thickness T is a maximum thickness of the rib portion 314E in the direction of the axis center AX. The rib portion 314E is formed so that the thickness in the direction of the axis center AX is constant irrespective of a distance from the axis center AX, for example. A region W is a region where the center position CP is an origin point O, a direction facing toward the end face 312D is a positive direction, a direction facing toward the end face 312C is a negative direction and the axis center AX is shown as an axis. The thickness T is, for example, 2 mm. A protruding amount P of the rib portion 314E from the inner wall surface 312B is, for example, 1 mm.

A center position of the rib portion 314E in the direction of the axis center AX is formed within a range of ±5.5 mm. In the case of the rib portion 314E shown in FIG. 32E, the center position in the direction of the axis center AX is formed within the region W of +5 mm, i.e., the region W distant from the center position CP by 5 mm in a direction facing toward the end face 312D in the direction of the axis center AX. Since the thickness T of the rib portion 314E is 2 mm, a surface of the rib portion 314E facing toward the center position CP is distant from the center position CP by 4 mm (=W−(T/2)). A surface of the rib portion 314E facing toward an outer side that is an opposite side is formed in a position spaced from the end face 312D by 1.5 mm (=7.5−(W+T/2)) and closer to the central line C than the end face 312D. Note that, for reference, FIG. 32E also shows a case where the center position in the direction of the axis center AX is within the region W of −5 mm. For example, the rib portion may also be formed in the region.

By the above configuration, when the rod-shaped member such as a tree branch is inserted into the tube member 312, the rib portion 314E that is a protrusion is favorably bent by engagement between the rod-shaped member and the tube member 312, so that the reel is stably supported without being excessively tilted.

In order to favorably bend the rib portion 314E, preferably, the thickness T is set to equal to or greater than 0.05 mm and equal to or smaller than 2 mm, and the protruding amount P of the rib portion 314E from the inner wall surface 312B is equal to or greater than 1 mm.

By the above configuration, when inserting the rod-shaped member such as a tree branch into the tube member and pulling out the tape, the protrusion is bent, so that a favorable braking force is obtained.

Note that, at least some of the respective sizes and structures (the protruding amount P, the thickness T, and the rib portion 314E that is a protrusion is formed in the region W) may also be applied to the other reels described in the present disclosure, such as the reel 310 shown in FIG. 28B.

FIG. 32F depicts a structure where a protrusion is provided at an end portion of a reel in a case where the tube member and the protrusion are integrally provided. A length of the reel in the direction of the axis center AX, i.e., a distance between the end face 312C and the end face 314D is, for example, 9 mm.

A center position of the rib portion 314E in the direction of the axis center AX is formed within a region of ±5.5 mm. In the case of the rib portion 314E shown in FIG. 32F, the center position in the direction of the axis center AX is formed within the region W of +4 mm, i.e., the region W distant from the center position CP by 4 mm in a direction facing toward the end face 314D in the direction of the axis center AX.

By the above configuration, when the rod-shaped member such as a tree branch is inserted into the tube member 312, the rib portion 314E that is a protrusion is favorably bent by engagement between the rod-shaped member and the tube member 312, so that the reel is stably supported without being excessively tilted.

In order to favorably bend the rib portion 314E, preferably, the thickness T is set to equal to or greater than 0.05 mm and equal to or smaller than 2 mm, and the protruding amount P of the rib portion 314E from the inner wall surface 312B is equal to or greater than 1 mm.

By the above configuration, when inserting the rod-shaped member such as a tree branch into the tube member and pulling out the tape, the protrusion is bent, so that a favorable braking force is obtained.

Figure 32G:
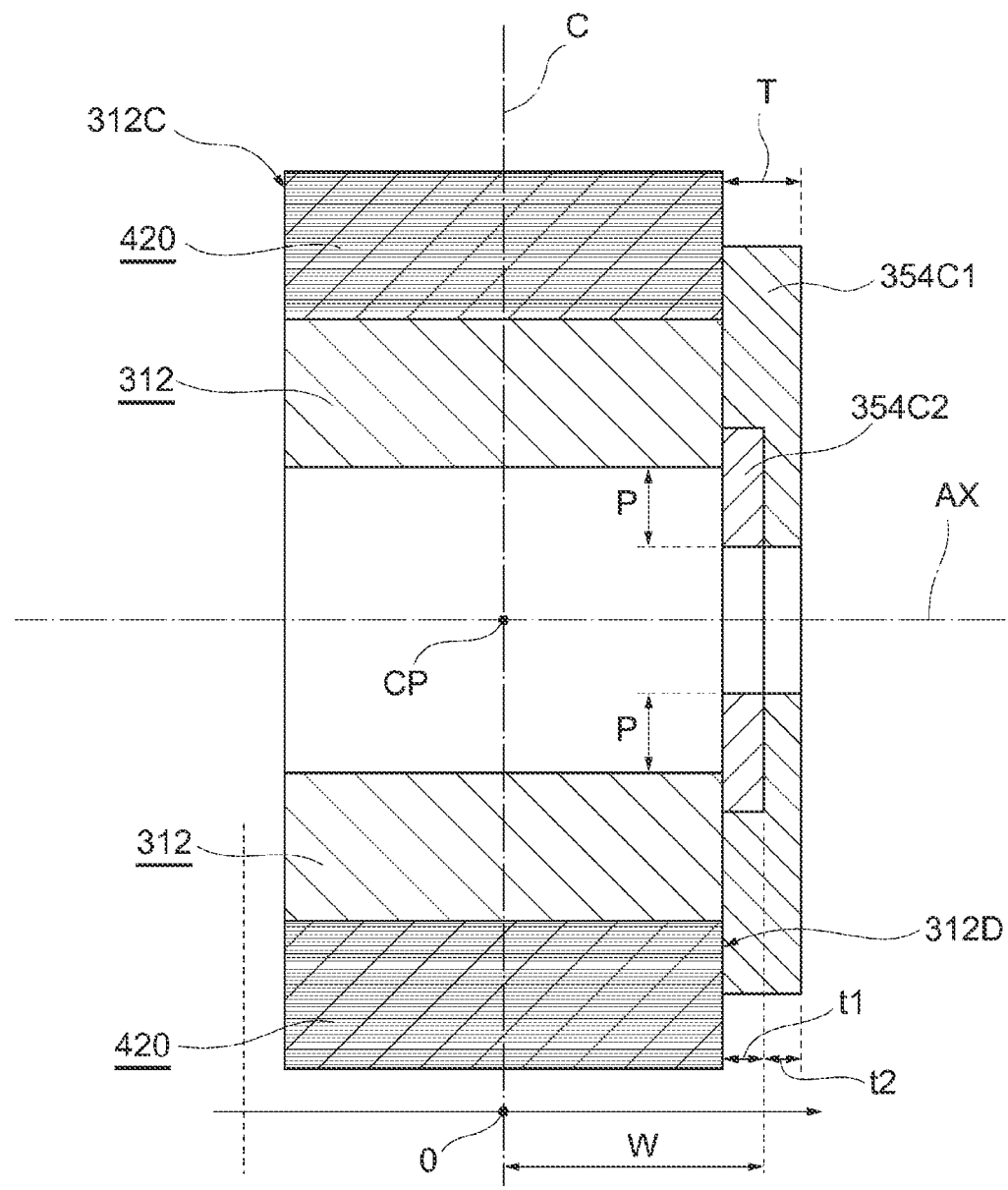
FIG. 32G is a pictorial view depicting an aspect and each size of the reel.

FIG. 32G depicts an aspect where a protrusion is formed from two layers of a film 354C1 and a film 354C2, similarly to the reel 400D of the fourth modified embodiment. A length of the tube member 312 in the direction of the axis center AX, i.e., a distance between the end face 312C and the end face 312D is, for example, 9 mm. A thickness T1 and a thickness T2 of the film 354C1 and the film 354C2 in the direction of the axis center AX are, for example, 0.5 mm, respectively. Therefore, the thickness T, in the direction of the axis center AX, of the protrusion having the two-layered structure of the film 354C1 and the film 354C2 is, for example, 1.0 mm.

A center position of the rib portion 314E in the direction of the axis center AX is formed within a region of ±5.5 mm. In the case of the rib portion 314E shown in FIG. 32G, the center position in the direction of the axis center AX is formed within the region W of +5 mm, i.e., the region W distant from the center position CP by 5 mm in a direction facing toward the end face 314D in the direction of the axis center AX.

By the above configuration, when the rod-shaped member such as a tree branch is inserted into the tube member 312, the rib portion 314E that is a protrusion is favorably bent by engagement between the rod-shaped member and the tube member 312, so that the reel is stably supported without being excessively tilted.

In order to favorably bend the rib portion 314E, preferably, the thickness T is set to equal to or greater than 0.05 mm and equal to or smaller than 2 mm, and the protruding amount P of the rib portion 314E from the inner wall surface 312B is equal to or greater than 1 mm.

Figure 34:
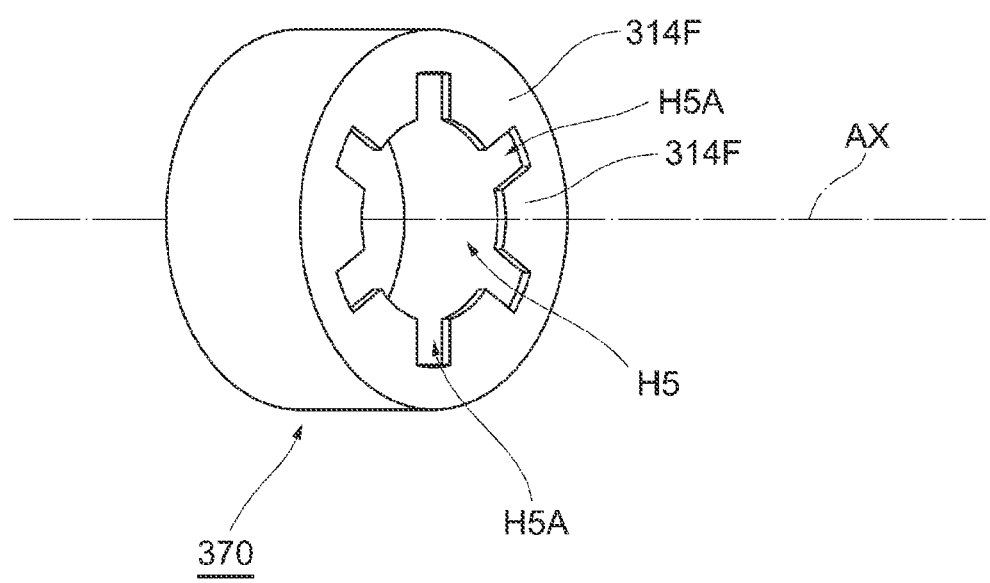
FIG. 34 is a perspective view of a reel 70 of a modified embodiment.

By the above configuration, when inserting the rod-shaped member such as a tree branch into the tube member and pulling out the tape, the protrusion is bent, so that a favorable braking force is obtained. Note that, the hole H1 to the hole H4 may be formed to have diverse shapes, in addition to the circular shape. For example, a polygonal shape such as a rectangular shape and a hexagonal shape is also possible, a hole of a notch or a slit is also possible. In addition, for example, the hole may be formed with a protrusion having a rotationally symmetrical shape such as a star shape whose distance to the axis center AX changes. FIG. 34 depicts a reel 370 formed with a hole H5 having a plurality of slits H5A. The plurality of slits H5A communicates with a central circular portion of the hole H5, and extends from the axis center AX in an outer diameter direction. Therefore, the reel 370 has a plurality of rotationally symmetrical protrusions 314F protruding toward the axis center AX and spaced from each other in the circumferential direction.

Since the reel 370 is provided with the slits H5A, the core rod can be enabled to easily penetrate the same. Tip ends of the protrusion 314F close to the axis center AX can be contacted to the core rod to support the reel 370 and the binding tape 420 wound on the reel. At this time, since the slits H5A are provided, the protrusions 314F are bent. As a result, a contact area with the core rod increases, so that the stability can be improved.

Also, the film may not be formed with the hole. For example, the film may be configured as a film body having a circular shape, a polygonal shape or the like with no hole. Even for the tape winding body configured in this way, it is possible to form a hole through which a core rod or the like can penetrate a central part of the film, by tearing the film at the time of use.

Also, the central part of the film may be formed with a cut. Even for the tape winding body configured in this way, it is possible to form a hole through which a core rod or the like can penetrate a central part of the film, by pushing and expanding the film with the cut at the time of use.

Note that, the film may also be replaced with another member having a thickness in the axis center direction as long as it is provided at one end portion in the axis center direction with a portion protruding toward the axis center.

Fifth Embodiment

A fifth embodiment where the reel is used loaded on the binding machine is described. By using the binding machine, it is possible to bind branches and vines of fruit trees and vegetables to stanchions, and to bundle vegetables and bags together.

Figure 35:
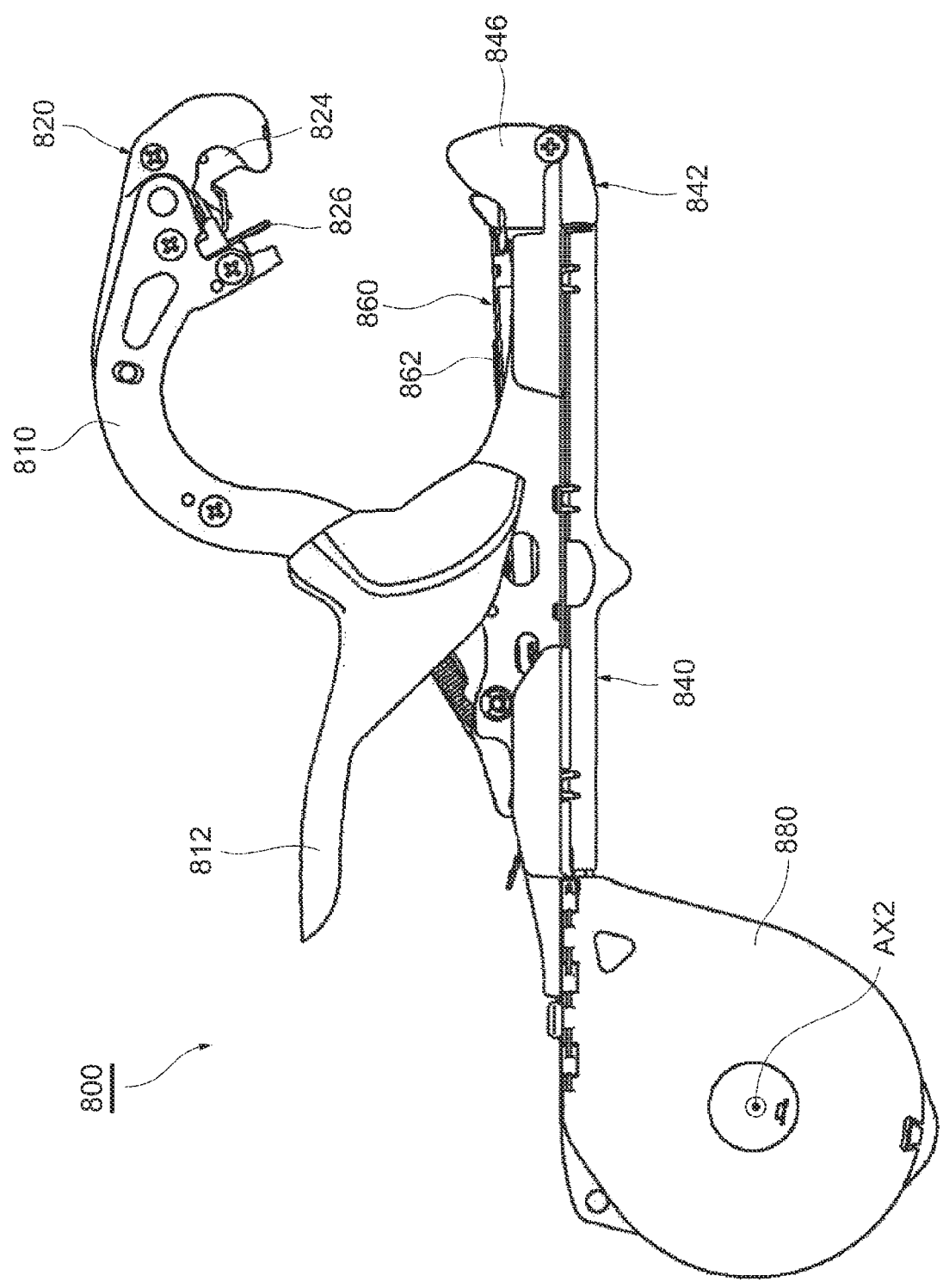
FIG. 35 is a front view of a binding machine 800.

FIG. 35 is a front view of a binding machine 800. The binding machine 800 as a hand-held tool includes a clincher arm 810, a binding machine main body 840, a handle 812, a tape pulling-out unit 820, a tape conveying unit 842, a staple magazine unit 860, and a tape magazine unit 880. In the tape magazine unit 880, a reel is loaded. An end portion of a binding tape of the reel is held pulled out upwardly from a tape guide 846 of the tape conveying unit 842, in FIG. 35.

When the user grips the handle 812 and brings the same close to the binding machine main body 840, the clincher arm 810 comes close to the binding machine main body 840 according to the principle of a lever, thereby sandwiching the binding tape by a tape catcher 824 and a tape plate 826 of the tape pulling-out unit 820. When the user loosens the gripped state of the handle 812, the clincher arm 810 separates from the binding machine main body 840 in the state where the binding tape is sandwiched, so that the binding tape is pulled out upwardly from the tape guide 846. In this state, when the user pushes the binding machine 800 to the right in FIG. 35 so that a plurality of to-be-bound objects such as branches of vegetables and stanchions are present in a space between the clincher arm 810 and the tape conveying unit 842, the to-be-bound objects and the binding tape are contacted to each other, so that the binding tape is further pulled out from the tape guide 846. When the user again grips the handle 812, the clincher arm 810 again comes close to the binding machine main body 840, so that the binding tape is wrapped around the to-be-bound objects. Also, as the clincher arm 810 moves downwardly, when the tape guide 846 moves along an inclined surface facing the tape catcher 824 and reaches a position in which the movement is restrained, the tape catcher 824 rotates in a direction (toward the front part-side) away from the tape plate 826. The tape guide 846 is also correspondingly rotated toward the front part-side. As the tape guide 846 is rotated, a cutting blade provided at a tip end of the tape guide 846 cuts the binding tape. Also, the staple loaded in the staple magazine main body 862 is struck out to stitch overlapped parts of the binding tape. By the series of processes, the to-be-bound objects are bound.

The reel is required to be rotatably held in the tape magazine unit 880 so that it can be favorably used for the binding machine 800. In a case where a reel configured only by a tube member and a binding tape wound on the tube member is used, the tape magazine unit 880 is provided with a shaft part penetrating a region surrounded by an inner wall of the tube member, so that the reel can be rotatably held.

However, when it is intended to hold a reel whose inner diameter of the tube member is large, a gap from the shaft part increases, so that it is difficult to rotatably hold the reel in a stable manner.

The present inventors conceived a configuration where the reel of the present disclosure is used and is stably rotatably held on the binding machine 800.

Figure 36A:
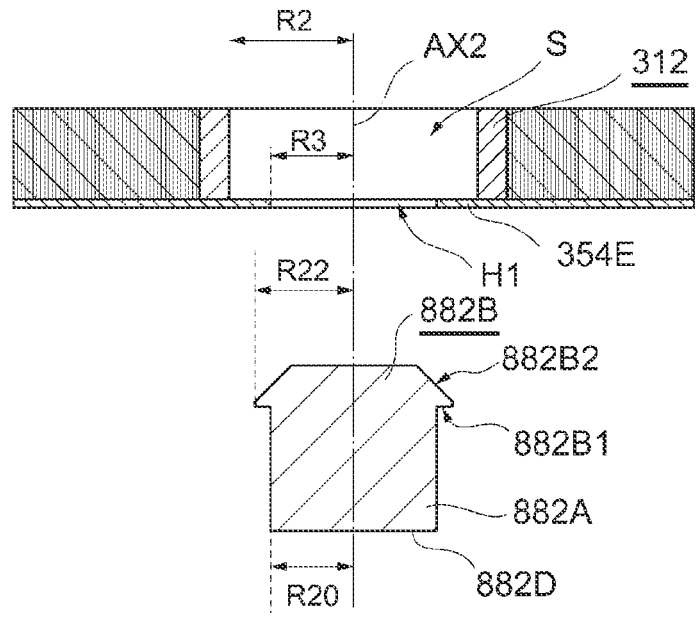
FIG. 36A is a pictorial view depicting an aspect where a reel 400B is held.
Figure 36B:
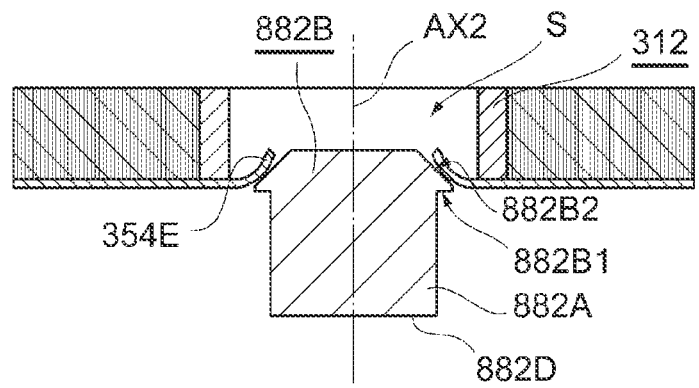
FIG. 36B is a pictorial view depicting an aspect where the reel 400B is held.
Figure 36C:
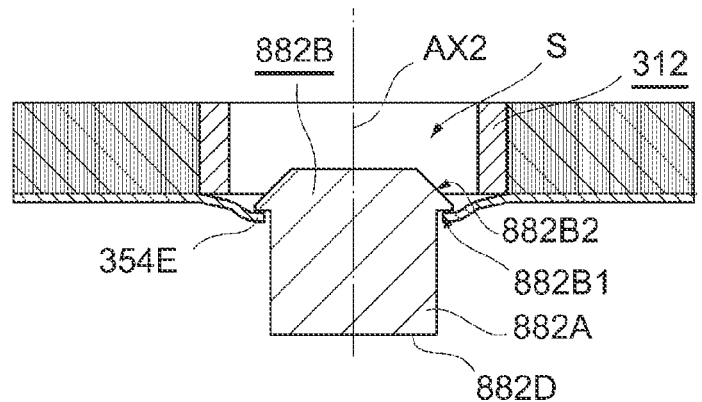
FIG. 36C is a pictorial view depicting an aspect where the reel 400B is held.

FIGS. 36A to 36C are pictorial views depicting a method of holding the reel 400B. Note that, the reel including the reel of the other embodiments or the modified embodiments can also be similarly held.

The tape magazine unit 880 has a shaft part 882 having a central axis AX2. The shaft part 882 has a cylindrical portion 882A having a cylindrical shape, and a circular truncated conical portion 882B having a circular truncated conical shape and formed on a tip end of the cylindrical portion 882A. A radius of a bottom surface of the circular truncated conical portion 882B is formed to be larger than a radius of the cylindrical portion 882A. For this reason, the shaft part 882 has an annular bottom surface part 882B1 protruding from the cylindrical portion 882A, and an inclined surface 882B2 that is a conical surface. Here, a radius R20 of the cylindrical portion 882A is formed to be substantially the same as a radius R3 of the hole H1. Also, a radius R22 of the circular truncated conical portion 882B is formed to be smaller than a radius R2 of the inner wall surface 312B of the tube member 312 and larger than the radius D1 of the hole H1.

The shaft part 882 is configured to be movable in the direction of the central axis AX2 and to be rotatable about the central axis AX2 as a center in the tape magazine unit 880. For example, the shaft part 882 may be configured to be held in the tape magazine unit 880 with being urged downwardly in the direction of the central axis AX2 in FIG. 36A and the like by a coil spring (not shown), and to be manually movable upwardly in the direction of the central axis AX2 by pressing the bottom surface 882D. Also, the shaft part may be configured to be rotatable around the central axis AX2 by a bearing and the like (not shown).

FIGS. 36A to 36C are sectional views of the reel 400B mounted in the tape magazine unit 880 and the shaft part 882 of the tape magazine unit 880, taken along a plane including the central axis AX2 of the shaft part 882. FIG. 36A depicts a state before the reel 400B is mounted. The central axis AX of the reel 400B is not required to coincide with the central axis AX2 of the shaft part 882. However, the reel 400B is preferably mounted in the tape magazine unit 880 so that the central axis AX and the central axis AX2 come close to each other at a distance smaller than the amount of protrusion of the rib potion 354E and are substantially parallel to each other.

Subsequently, as shown in FIG. 36B, the shaft part 882 is moved upwardly in the direction of the central axis AX2. Since the radius R22 of the circular truncated conical portion 882B is formed to be larger than the radius R3 of the hole H1, the inclined surface 882A2 contacts end portions of the rib portions 354E. Since the end portions of the rib portions 354E are free ends, the rib portions can be deformed along the inclined surface 882A2, as shown in FIG. 36B. When the shaft part 882 is further moved upwardly, the bottom surface part 882A1 of the circular truncated conical portion 882B passes the rib portions 354E. For this reason, the circular truncated conical portion 882B is accommodated in a region S surrounded by the rib portions 354E and the inner wall surface 312B of the tube member 312.

Thereafter, when the upward pressing in the direction of the central axis AX2 of the shaft part 882 is stopped, the shaft part 882 is moved by the urging force of the coil spring. However, the bottom surface part 882A1 of the circular truncated conical portion 882B contacts edge portions of the rib portions 354E with the hole H1 and becomes a stopper. For this reason, as shown in FIG. 36C, the reel 400B can be held in the state where the circular truncated conical portion 882B is accommodated in the region surrounded by the rib portions 354E and the inner wall surface 312B of the tube member 312. At this time, the end portions of the rib portions 354E are deformed downwardly in the direction of the central axis AX2 away from the tube member 312.

In this way, the hole is formed so as for the rib portions 354E to protrude toward the axis center AX, so that it is possible to provide the reel capable of being stably held by the binding machine. Also, even a reel whose inner diameter of the tube member is different can be held by forming the hole to have substantially the same diameter. Note that, as described above, a film body with no hole may be provided, and a central part of the film body may be torn to form a hole at the time of use. Also, the cut may be formed at an end, and the film may be pushed and expanded using the cut by the shaft part 882 at the time of use, so that a hole penetrating a central part of the film may be formed.

The above embodiments are just exemplary so as to describe the present invention, and the present invention is not limited to the embodiments. When the tube member 312, the protrusion 314, the rib portion 314E, the film 354A, the rib portion 354A1, the film 354B, the rib portion 354E, the film 354C1, the film 354C2, the film 354D1, the film 354D2, and the protrusion 314F are formed of a material having water resistance and ductility, for example, a material such as resin and rubber or synthetic paper in which a resin material and a pulp material are mixed, the reel 310, the reel 310A-310D, the reel 370, the reel 400 and the reels 400A-400D can be favorably used even though they are used in environments exposed to wind and rain, such as an environment where it is used outdoors.

The present invention can also be diversely modified without departing from the gist thereof. For example, some of the constitutional elements in any of the embodiments or modified embodiments can be added to the other embodiments or modified embodiments within the usual conceivable abilities of one skilled in the art. Also, some of the constitutional elements in any of the embodiments or modified embodiments can be replaced with the corresponding constitutional elements in the other embodiments or modified embodiments.

Modified Embodiment 8

As the binding tape 420 of the fourth embodiment or the binding tape described in the other embodiments, modified embodiments and the like, a binding tape having a similar structure to the binding tape 10 or the binding tape of the modified embodiments thereof may also be used.

In this case, the reel (in the below, the "reel" may also be referred to as the "tape winding body") includes the binding tape capable of binding the to-be-bound object. The reel includes a tube member, a binding tape wound on the tube member, and a protrusion extending on one end face-side of the tube member toward the axis center of the tube member, wherein in a cross section including the axis center, a tangential line that contacts the protrusion at a first contact point at a tip end of the protrusion and contacts the tube member at a second contact point on the other end face-side of the tube member is formed so as to be inclined with respect to a straight line including the axis center. An angle of inclination is preferably 3° or greater, for example. The binding tape wound on the tube member has an intermediate layer, and a first surface layer covering one surface of the intermediate layer. The intermediate layer has a plurality of first linear members arranged side by side at an angle with respect to a longitudinal direction of the binding tape. According to the tape winding body, it is possible to make it more difficult for the binding tape to tear. When the binding tape is used, it is possible to perform the binding operation by using the binding machine for gardening even in a guiding operation of crops having a high repulsive force.

Modified Embodiment 9

As the binding tape 420 of the fourth embodiment or the binding tape described in the other embodiments, modified embodiments and the like, a binding tape having a similar structure to the binding tape 10A shown in FIG. 14 and the like or the binding tape according to the variations thereof may also be used. In this case, one end portion of the intermediate layer of the binding tape in the width direction is formed with a plurality of first cuts spaced in the longitudinal direction of the binding tape. The other end portion of the intermediate layer of the binding tape in the width direction may also be formed with a plurality of second cuts spaced in the longitudinal direction of the binding tape. At least one of the first cuts may also cut at least a portion of the second linear member. According to the tape winding body, it is possible to make it more difficult for the binding tape to tear. When the binding tape is used, it is possible to perform the binding operation by using the binding machine for gardening even in a guiding operation of crops having a high repulsive force.

Modified Embodiment 10

As the film 354A provided to the reel 400A and the film 354B provided to the reel 400B in accordance with the modified embodiments of the fourth embodiment or the film described in the other embodiments, modified embodiments and the like, the film 134, the film 144, or the films described in the modified embodiments thereof and the like may also be used.

According to the reel or the tape winding body having the film, it is possible to further suppress the binding tape from loosening, and the like. The present invention can also be diversely modified without departing from the gist thereof. For example, some of the constitutional elements in any embodiment can be added to the other embodiments within the usual conceivable abilities of one skilled in the art. Also, some of the constitutional elements in any embodiment can be replaced with the corresponding constitutional elements in the other embodiments. For example, as the binding tape that is wound on the tape winding body of Modified Embodiment 10, the binding tape 10A can be used.

The subject application is based on Japanese Patent Application No. 2018-134750 filed on Jul. 18, 2018, Japanese Patent Application No. 2019-37192 filed on Mar. 1, 2019, Japanese Patent Application No. 2019-37411 filed on Mar. 1, 2019, and Japanese Patent Application No. 2019-112599 filed on Jun. 18, 2019, the contents of which are incorporated herein by reference.

REFERENCE SIGNS LIST

10: binding tape
10': conventional binding tape
11: intermediate layer
12: first linear member
13: second linear member
16: first surface layer
17: second surface layer
19: winding core
20: binding machine
21: main handle
21a: tip end portion
22: staple magazine
23: clincher arm
23a: tip end portion
24: tape gripping part
25: operating handle
26: tape magazine
30: staple
31: leg portion
32: crown portion
40: to-be-bound object
D1: longitudinal direction of binding tape
D2: width direction of binding tape
W1: interval of first linear members

What is claimed is:

1. A binding tape to be wound around a to-be-bound object and configured to bind the to-be-bound object by stitching overlapped portions of the binding tape by a staple, the binding tape comprising:
   an intermediate layer having a plurality of first linear members and a plurality of second linear members intersecting with the plurality of first linear members, wherein one end portion of the intermediate layer in a width direction is formed with a plurality of first cuts spaced in a longitudinal direction of the binding tape, the other end portion of the intermediate layer in the width direction is formed with a plurality of second cuts spaced in the longitudinal direction of the binding tape, and wherein at least one of the first cuts cuts 60% or more of a width of one of the second linear members which is arranged at an outermost side close to the one end portion of the intermediate layer in the width direction;
   a first surface layer covering one surface of the intermediate layer and formed of a resin material; and
   a second surface layer covering the other surface of the intermediate layer and formed of a resin material,
   wherein an interval of adjacent two of the first linear members is equal to or smaller than 5 mm.

2. The binding tape according to claim 1, wherein the interval of the adjacent two of the first linear members is equal to or smaller than 3 mm.

3. The binding tape according to claim 1, wherein the first linear members are arranged orthogonal to a longitudinal direction of the binding tape.

4. The binding tape according to claim 1, wherein the second linear members extend in a longitudinal direction of the binding tape.

5. The binding tape according to claim 1, wherein a length of at least one of the first cuts in the width direction with respect to a width of the binding tape is 15% or less.

* * * * *